(12) United States Patent
Dong et al.

(10) Patent No.: US 12,122,008 B1
(45) Date of Patent: Oct. 22, 2024

(54) POINT LAYOUT OPTIMIZATION METHOD FOR FOLLOW-UP SUPPORT HEAD IN MIRROR MILLING AND FOLLOW-UP SUPPORT HEAD

(71) Applicant: HEFEI UNIVERSITY OF TECHNOLOGY, Hefei (CN)

(72) Inventors: Fangfang Dong, Hefei (CN); Zhao Liu, Hefei (CN); Xiaomin Zhao, Hefei (CN); Jiang Han, Hefei (CN); Xiaoyong Huang, Hefei (CN)

(73) Assignee: HEFEI UNIVERSITY OF TECHNOLOGY (CN)

( * ) Notice: Subject to any disclaimer, the term of this patent is extended or adjusted under 35 U.S.C. 154(b) by 0 days.

(21) Appl. No.: 18/677,961

(22) Filed: May 30, 2024

(30) Foreign Application Priority Data

Dec. 19, 2023 (CN) .......................... 202311746369.2

(51) Int. Cl.
  *B23Q 15/12* (2006.01)
  *B23Q 3/10* (2006.01)
  *G05B 19/418* (2006.01)

(52) U.S. Cl.
  CPC ............. *B23Q 15/12* (2013.01); *B23Q 3/105* (2013.01); *G05B 19/41825* (2013.01); *G05B 19/41885* (2013.01)

(58) Field of Classification Search
None
See application file for complete search history.

(56) References Cited

U.S. PATENT DOCUMENTS

2019/0184515 A1* 6/2019 Diehl ..................... B24B 41/04

FOREIGN PATENT DOCUMENTS

CN         104002161 A       8/2014

* cited by examiner

*Primary Examiner* — Ryan A Jarrett

(57) ABSTRACT

The invention relates to the field of milling, specifically a point position layout optimization method and a follow-up support head in mirror milling. It features an annular and linear sliding module to design a support head with adjustable support points. A corresponding layout optimization method is developed, starting with a coupled vibration model of the machining process. A layout optimization model is then created, with the quantity of support points and the support radius as decision variables. The goal is to minimize vibration amplitude and root mean square, constrained by structural interference and boundary conditions. The solution is achieved using a particle swarm optimization algorithm, supplemented by parameter scanning and a penalty function strategy. This invention addresses the limitations of existing single support point layouts for the mirror milling of various large thin-walled workpieces.

10 Claims, 49 Drawing Sheets

POINT LAYOUT OPTIMIZATION METHOD FOR FOLLOW-UP SUPPORT HEAD IN MIRROR MILLING AND FOLLOW-UP SUPPORT HEAD

TECHNICAL FIELD

The invention belongs to the field of milling processing, which specifically relates to a point layout optimization method and a device of a follow-up support head in mirror milling, and a corresponding follow-up support head with an adjustable point layout.

BACKGROUND ART

In the field of aviation, aerospace, and navigation, the fuselage structure of aircraft, ships, and spacecraft often requires many large thin-walled structural parts. In order to meet the requirements of lightweight and high specific strength, engineers need to carry out complex machining of large thin-walled parts, milling is a common metal processing method, which can be processed by milling machine in conventional size parts. However, in large thin-walled parts, it is easy to produce deformation and tremor in the milling process due to the weak rigidity of the workpiece, which seriously affects the machining accuracy and surface quality. In response to this problem, a mirror processing method with follow-up support is gradually attracting the attention and research of the industry. As shown in FIG. 1, the core idea of the new machining method is to set the support heads with a synergistic motion with the tool on the opposite sides of the workpiece surface, the support head and the tool move on the workpiece surface, which can effectively suppress the machining chatter and reduce the workpiece deformation and improve the machining quality of the workpiece by offsetting the axial force of the tool and improving the local stiffness of the workpiece.

In the servo support machining system in FIG. 1, the structural design of the support head used will affect the force distribution of the workpiece during the machining process, and thus will also affect the machining quality of the workpiece. For example, the traditional surface contact design is usually not suitable for the processing of complex surfaces. In this regard, technicians provide a single-point high-rigidity rolling support head to solve the problem of poor adaptability of traditional sliding support heads to complex surfaces. However, in actual processing, the synergy of both sides of the actuator is difficult to guarantee in real-time. At this time, the vibration suppression effect of single-point support will be greatly reduced. In this regard, the Chinese invention with a patent number of CN104002161 A discloses a multi-point flexible rolling support head, which is configured with a roller that can effectively fit a cylindrical-like surface and is connected to a spring to absorb the vibration of the workpiece more flexibly. Furthermore, some technicians adopt the structure of universal balls in the head of the multi-point support device, which can fit more complex surfaces while reducing the volume of the structure. At the same time, the needle cylinder introduced by the device makes the stiffness change of the mechanism more controllable and flexible. The subsequent multi-point support head design mainly focuses on functional integration and structural simplification based on the above.

However, although the multi-point support scheme provided by the existing technology effectively solves the follow-up support problem of complex thin-walled parts, there are few studies in the field of structural parameter optimization. In fact, under different working conditions and requirements, the optimal position layout of the support head is often different, and the single fixed structure design makes it difficult to meet the diversified processing requirements. Therefore, how to provide the optimal support scheme for mirror milling of different types of workpieces is becoming a technical problem to be solved urgently by technicians in this field.

SUMMARY OF THE INVENTION

In order to solve the problem that the existing single support point layout scheme cannot be applied to the mirror milling of different types of large thin-walled parts, the invention discloses a point layout optimization method and device of a follow-up support head in mirror milling, and a follow-up support head with adjustable point layout.

The invention is realized by the following technical solution:

A point layout optimization method for a follow-up support head in mirror milling, the method is used to optimize and adjust the point layout of the follow-up support head in mirror milling in combination with specific working conditions, support points in the follow-up support head comprise a central support point and peripheral support points arranged circularly around the central support point.

The point layout optimization method comprises the following steps:

S1: Establishing a coupling vibration model of cutter, workpiece, and support head in mirror milling, comprising the following process:

S11: Defining a milling force acting on an axial direction of the workpiece as Fm(t), moving paths of a center point of a milling cutter are xm(t)、ym(t), and generating a milling excitation qm(x,y,t) by combining a Dirac function δ.

S12: Defining a total quantity of support points of the support head as n, where 1 support point is located at a center of the support head, and remaining n−1 support points are evenly distributed on a circle with a radius of r; n and r are characteristic parameters that characterize the point layout of the follow-up support head.

S13: Defining moving paths of the central support point as xs1($t$), ys1($t$), and generating moving paths of each peripheral support point as xsi(t)、ysi($t$), where i=2, 3 . . . n.

S14: Defining a total support force provided by the support head as Fs(t), and generating a support excitation qs(x,y,t) by combining the moving paths of each peripheral support point xsi(t)、ysi($t$) and the Dirac function δ.

S15: Defining a transverse deflection perpendicular to a machining surface in mirror milling as w(x,y,t), based on a Kirchhoff-Love hypothesis, establishing a coupled vibration model of an equal-thickness plate component under external excitation as follows:

$$D\left(\frac{\partial^4 w}{\partial x^4} + 2\frac{\partial^4 w}{\partial x^2 \partial y^2} + \frac{\partial^4 w}{\partial y^4}\right) + \rho h \frac{\partial^2 w}{\partial t^2} = q(x, y, t)$$

where q(x,y,t) denotes an additional excitation on a unit area of the workpiece, the additional excitation is composed of the milling excitation qm(x,y,t) and the support excitation qs(x,y,t); D denotes a bending stiffness of the workpiece, h denotes the wall thickness of the workpiece; ρ denotes a density of the workpiece.

S2: Weighting a vibration peak f1 of points at different positions on a coupling contact area at different times and a root mean square f2 of a vibration of each point in an investigation period as an objective function f to evaluate a vibration of a machining process, an optimization goal is as follows:

$$\min f = \alpha_1 f_1 + \alpha_2 f_2$$

where $\alpha_1$ and $\alpha_2$ are weight coefficients of the vibration peak f1 and the root mean square f2 of each point vibration, and satisfy $\alpha_1 + \alpha_2 = 1$.

S3: Combining spatial layouts and moving paths of the center support point and the peripheral support points of the follow-up support head, establishing a spatial constraint equation and a quantity constraint equation of the support points in the follow-up support head.

S4: Taking n and r as design variables, establishing a single-objective optimization model representing a current optimization problem combined with the coupled vibration model, objective function, and constraint equation.

S5: Solving the single-objective optimization model by a swarm intelligence optimization algorithm to obtain a globally optimal quantity of support points n and a radius of the distribution circle r. A solution strategy is as follows:
  (1) Choosing any one of the swarm intelligence optimization algorithms as a dominant algorithm of the solution process.
  (2) According to the constraint equation established in S3, calculating an upper limit the quantity of support points n, and then determining m candidate values of discrete design variable n. Then transforming a bivariate optimization process of an iterative optimization process into an optimization process of a parallel processing of a single variable r in m different populations.
  (3) Introducing a penalty function F to modify a fitness function fit of the swarm intelligence optimization algorithm when it is updated iteratively: fit=f+F;

S6: According to preferred values of n and r, adjusting the quantity of support points in the follow-up support head and a distribution radius of the peripheral support points.

The invention also comprises a point layout optimization device for the follow-up support head in mirror milling, comprising a memory, a processor, and a computer program stored on the memory and running on the processor. When the processor executes the computer program, performing steps of the point layout optimization method for the follow-up support head in mirror milling by the processor as mentioned above; then according to workpiece attribute parameters D、h、$\rho$、E、$\mu$; processing parameters Fm(t)、xm(t)、ym(t)、Fs(t); structural parameters of support head r1, r0; and the weight coefficients $\alpha_1$、$\alpha_2$; generating the characteristic parameters n and r of the point layout of the follow-up support head satisfying a minimum machining process vibration f.

The invention also comprises a follow-up support head with an adjustable point layout, the follow-up support head has a Whiffletree structure, comprising a central support point and peripheral support points distributed in a ring. In particular, the follow-up support head with the adjustable point layout provided in this invention supports that the point layout of each support module in the Whiffletree structure can be adjusted according to actual working conditions.

The follow-up support head with the adjustable point layout provided in the invention comprises a base, an annular sliding module, linear sliding modules, support modules, and several sets of locking devices.

Where a back of the base is provided with an installation flange for fixed connection with a manipulator, a center position of a front of the base is provided with a convex platform.

The annular sliding module comprises an annular guide rail and first sliders clamped on the annular guide rail. The annular guide rail is installed at the outer edge of the front side of the base and is concentric with the convex platform. The first sliders can slide freely along a circumferential direction of the annular guide rail.

A quantity of linear sliding modules is not less than that of the first sliders, and each linear sliding module is fixedly connected to the corresponding first slider through a first adapter plate. Each linear sliding module comprises a linear sliding platform and a second slider; the linear sliding platform is used to drive the second slider to move bi-directionally along a radial direction of the annular guide rail.

The quantity of support modules is one more than the quantity of linear sliding modules. One of the support modules is fixedly connected to the convex platform, and the remaining support modules are fixedly connected to each second slider through a second adapter plate. Each support module comprises a needle cylinder, a stud, and a universal ball. One end of the stud is fixedly connected to the needle cylinder, and the other end of the stud is fixedly connected to the universal ball; the needle cylinder is used to drive the universal ball to move up and down in a direction perpendicular to a base plane through the stud.

The sets of locking devices are used to fix each first slider on the annular guide rail.

The technical solution provided by the invention has the following beneficial effects:

The invention first creates a coupled vibration model that characterizes the vibration state of the cutter-workpiece-support structure in the machining process, then, based on the support point layout of the Whiffletree structure, a layout optimization model with the quantity of support points and the support radius as decision variables is established. The optimization index is the amplitude and root mean square of the vibration, and the variable range is established through the interference and boundary conditions of the structure. By solving the layout optimization model, the optimal point layout of the support points can be obtained.

The layout optimization model established by the invention is a complex mathematical model comprising partial differential formula constraints, inequality constraints, and mixed integer problems. In order to solve the layout optimization model quickly and accurately, the invention formulates a composite solution strategy dominated by the particle swarm optimization algorithm, supplemented by parameter scanning and penalty function. Finally, the solution process of the optimal bit layout is realized.

The point layout optimization result obtained by the invention can be applied to a new type of follow-up support head with the adjustable point layout as the state parameter of the follow-up support head. Therefore, the point layout optimization method and the corresponding follow-up support head structure provided by the invention can be applied to diversified working conditions and processing requirements to provide a better support effect in mirror milling.

The invention also provides a follow-up support head with an adjustable point layout. This type of follow-up support head contains a linear sliding module and an annular sliding module. With the cooperation of the two modules, the quantity, angle, and spacing of the peripheral support points in the support module can be dynamically adjusted to ensure that the final support point distribution is in the state of Whiffletree structure and to adapt to the diverse support requirements of different types of workpieces in mirror milling.

BRIEF DESCRIPTION OF DRAWINGS

FIG. 18l is a vibration distribution of the workpiece in the unsupported milling process in the simulation experiment when time=0.0055 s;

FIG. 19*l* is a vibration distribution of the workpiece in mirror milling of the follow-up support in the simulation experiment when time=0.0055 s;

Figure 1:
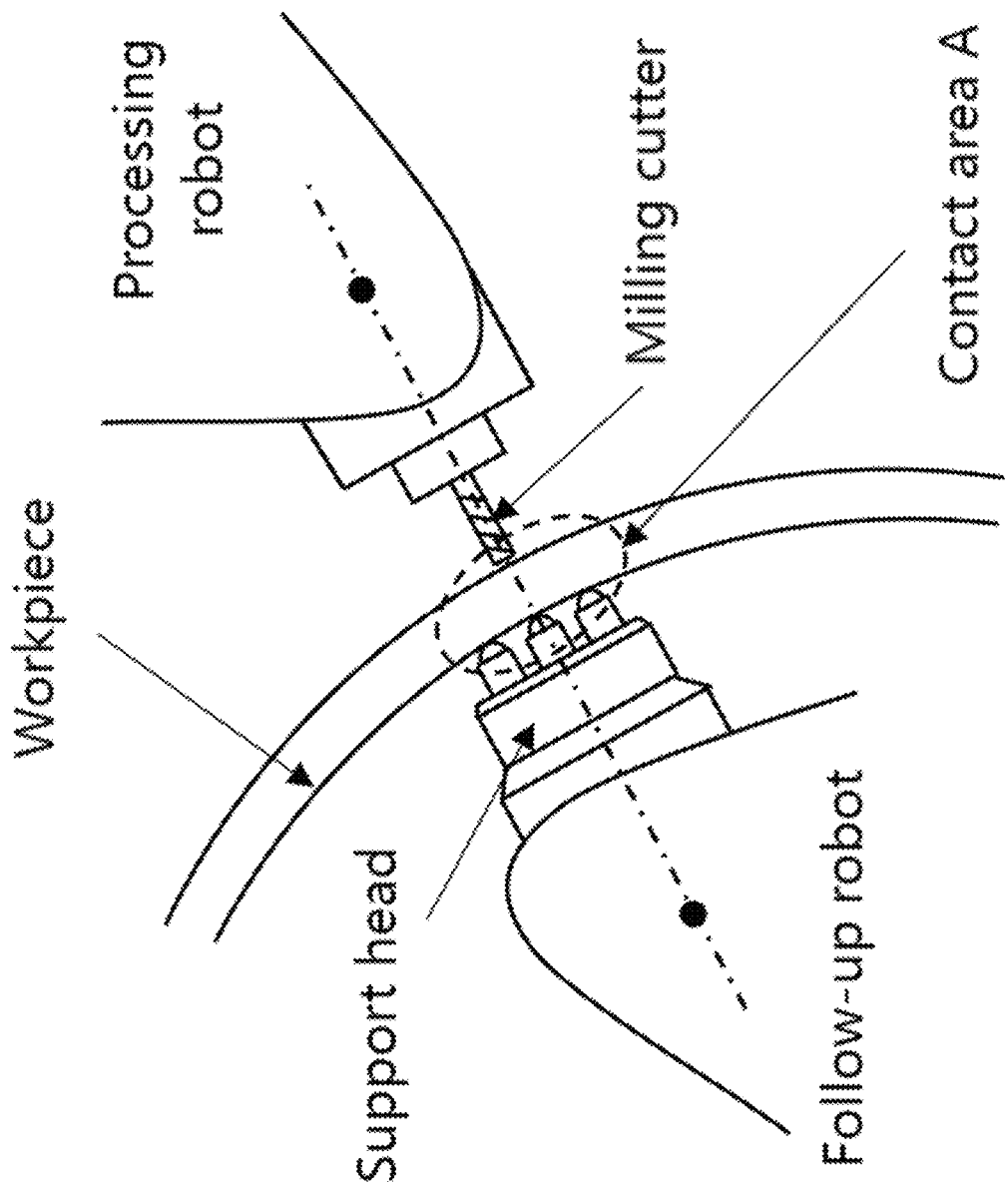
FIG. 1 is a structural diagram of the principle of mirror milling introduced in the background technology.

MARKS IN THE FIGURES 1, base; 2, annular sliding module; 3, linear sliding module; 4, support module; 6, the first adapter plate; 7, the second adapter plate; 11, installation flange; 12, convex platform; 21, annular guide rail; 22, the first slider; 31, linear sliding platform; 32, the second slider; 33, manual knob; 41, needle cylinder; 42, stud; 43, universal ball; 98, manipulator; 99, follow-up support head; 100, follow-up robot; 101, milling robot; 102, clamping machine

DETAILED DESCRIPTION OF THE EMBODIMENTS

In order to make the purpose, technical solution, and advantages of the invention more clear, the invention is further described in detail in combination with the attached figures and embodiments. It should be understood that the specific embodiments described here are only used to explain the invention and are not used to limit the invention.

Embodiment 1

Figure 2:
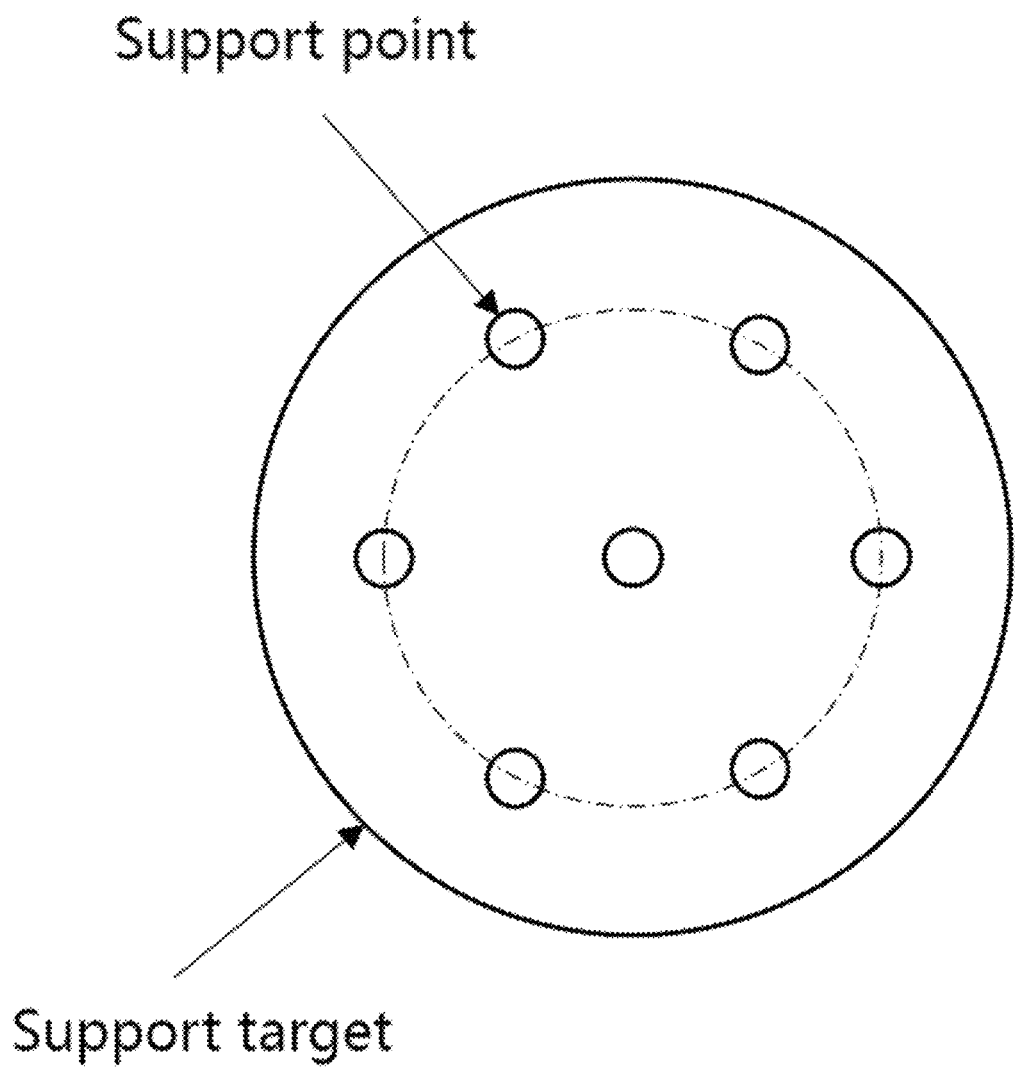
FIG. 2 is a spatial distribution of the support points in the Whiffletree structure adopted by the follow-up support head in Embodiment 1 of the invention.

This embodiment discloses a follow-up support head 99 with the adjustable point layout, which is a Whiffletree structure as shown in FIG. 2, specifically comprising a central support point and multiple peripheral support points in a circular distribution. In the mechanical model of the Whiffletree support system, the central support point and the peripheral support points constitute the central symmetric structure, so that the load on it can be evenly distributed, thereby ensuring the stability of the overall structure. In fact, in the existing classical fixed support structures, the point layout of polygonal support heads such as regular triangles and regular hexagons is essentially a special case under this idea.

In particular, based on this single-center, multi-point ring-distributed general support architecture, the follow-up support head with the adjustable point layout provided in this embodiment supports further adaptive adjustment of the point layout of each support module 4 in the Whiffletree structure according to the actual working conditions.

Figure 3:
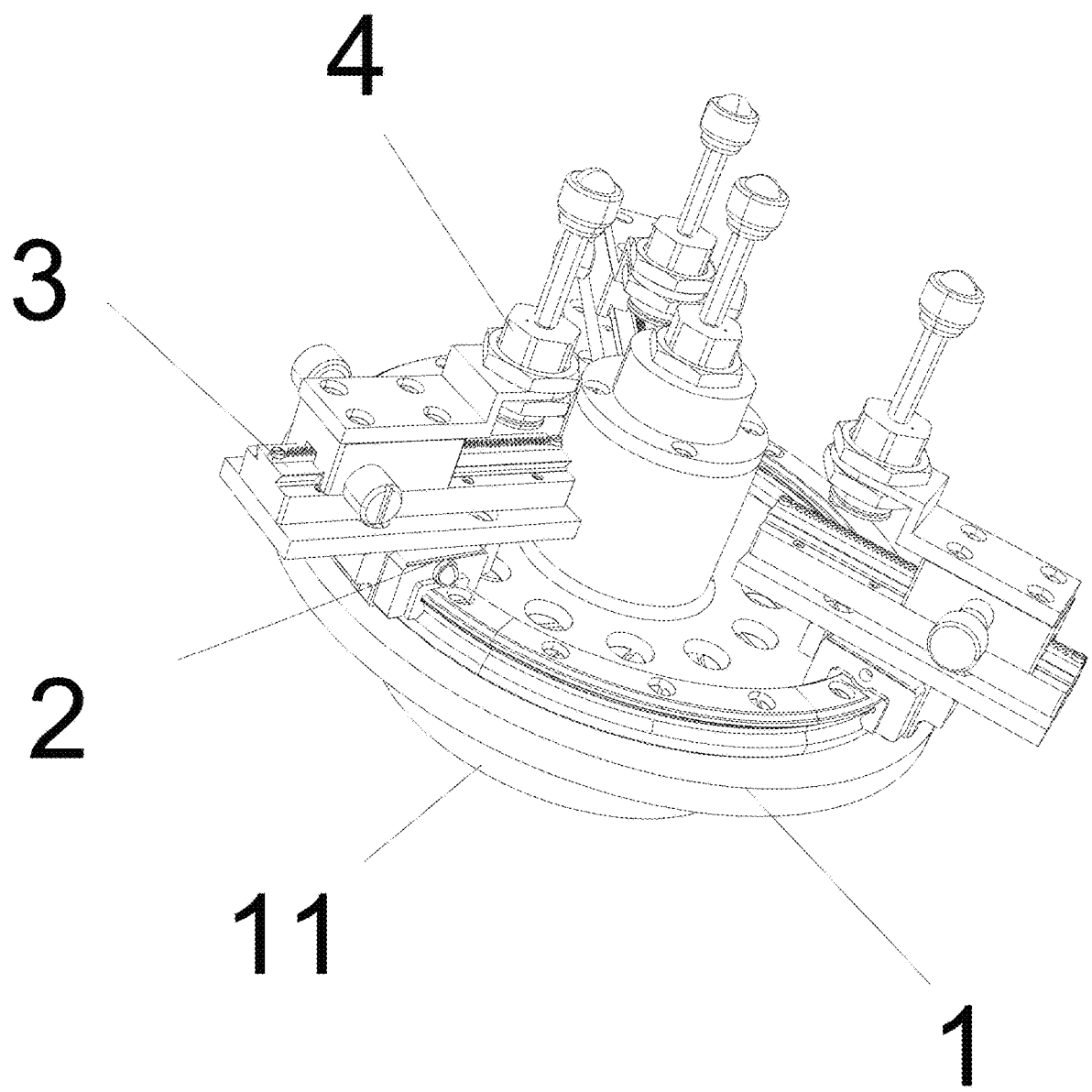
FIG. 3 is a structural diagram of the follow-up support head with an adjustable point layout comprising three support points provided in Embodiment 1 of the invention.
Figure 4:
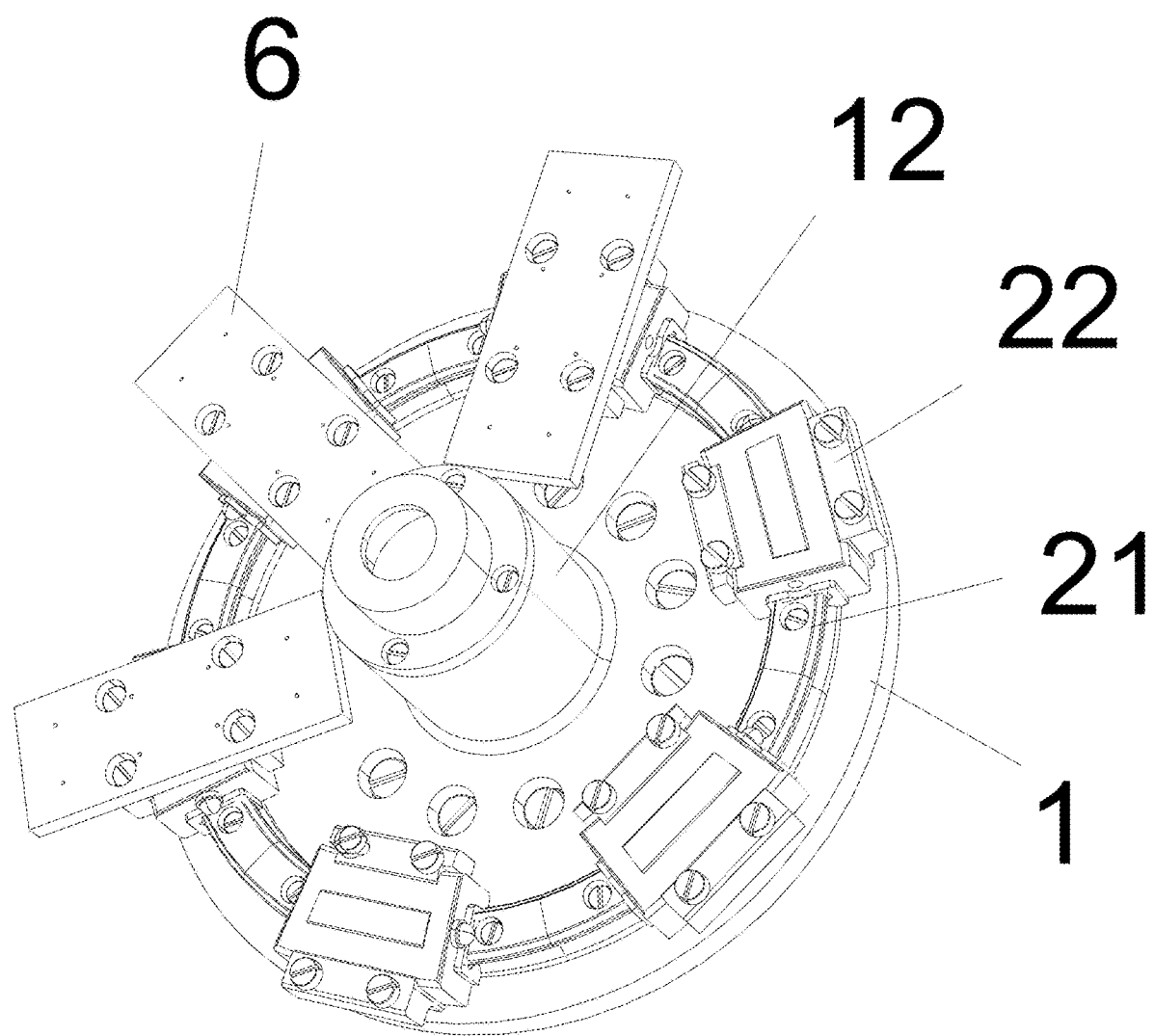
FIG. 4 is a result diagram of the base and the annular sliding module of the follow-up support head of in Embodiment 1 of the invention.

Specifically, as shown in FIG. 3, the follow-up support head 99 with the adjustable point layout provided in this Embodiment comprises a base 1, an annular sliding module 2, linear sliding modules 3, support modules 4, and several sets of locking devices. Where the base 1 of the figure adopts a disc-type structure, the back of the base 1 is provided with an installation flange 11 for a fixed connection with the manipulator 98. By installing the installation flange 11, the entire follow-up support head 99 can be fixedly connected to the front end of the manipulator 98, and the multi-degree-of-freedom manipulator 98 is used to drive the follow-up support head 99 to move in accordance with the required arbitrary attitude in the processing space. Among them, as shown in FIG. 4, the center position of the front of the base 1 is provided with a convex platform 12 and an annular sliding module 2. The convex platform 12 in this embodiment adopts a cylindrical convex platform 12, and the annular sliding module 2 comprises an annular guide rail 21 and first sliders 22 clamped on the annular guide rail 21. The annular guide rail 21 is installed at the outer edge of the front of the base 1 and is concentric with the convex platform 12. The annular guide rail 21 is composed of arc-shaped rails in turn, and the annular guide rail 21 can be disassembled and fixedly connected to the front of the base 1; there are also preset points as peripheral support points in the annular guide rail 21. For example, when the quantity of preset points is 12, a maximum of 12 peripheral support points can be distributed on the annular guide rail 21, and the quantity of peripheral support points can be adjusted between 2 and 12 as needed.

Each set of the locking devices in this embodiment is used to fix each first slider 22 at any preset point in the annular guide rail 21. In the annular sliding module 2, when the locking device is unlocked, each first slider 22 can slide freely along the circumferential direction of the annular guide rail 21. When the locking device is locked, the corresponding first slider 22 is fixed at the position of the annular guide rail 21 and cannot be moved.

Figure 5:
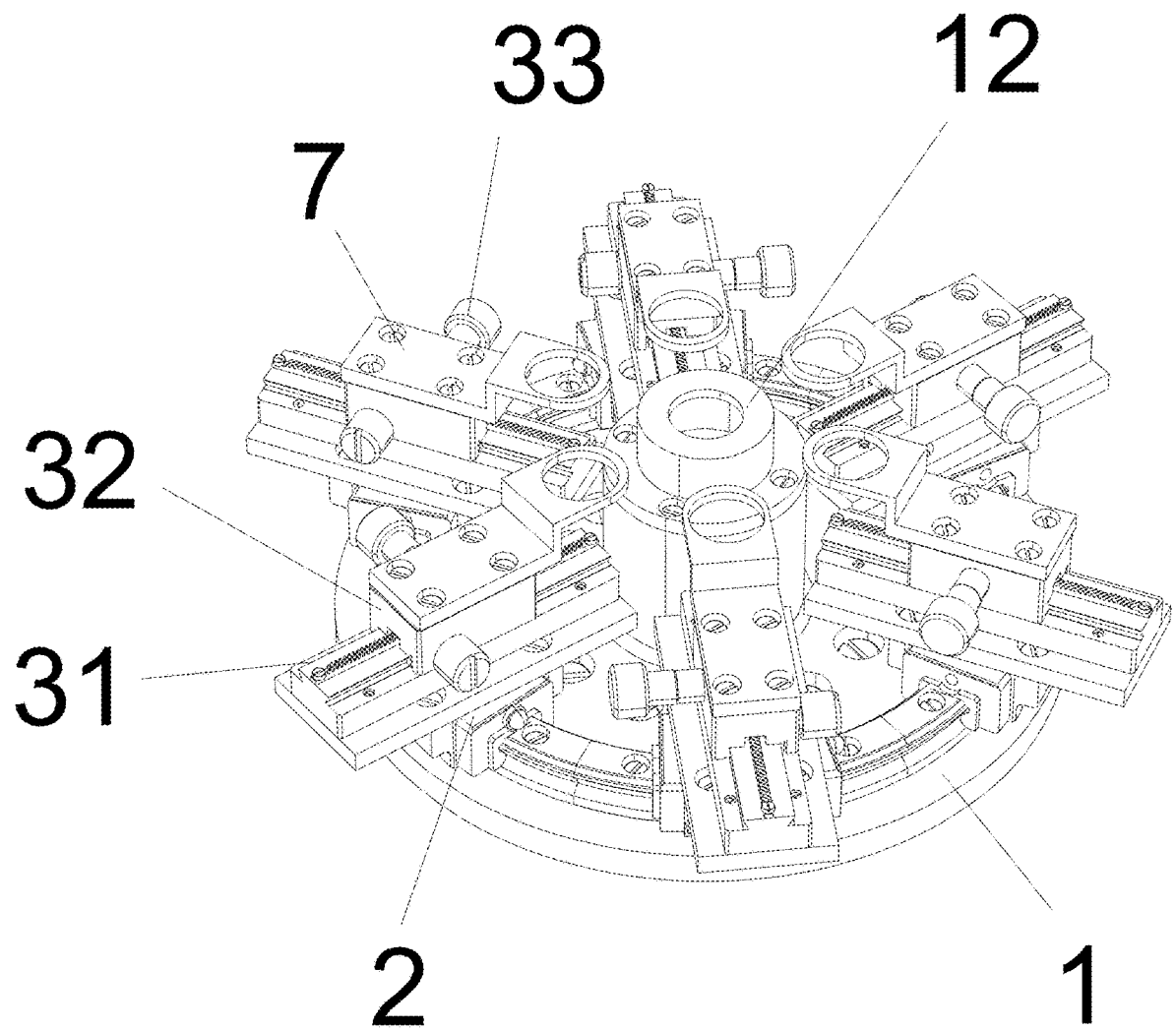
FIG. 5 is an assembly structural diagram of the annular sliding module and the linear sliding module in the follow-up support head in Embodiment 1 of the invention.

As shown in FIG. 5, each linear sliding module 3 in this embodiment is installed on each first slider 22, so the quantity of linear sliding modules is not less than that of the first slider 22. Specifically, each linear sliding module 3 is fixedly connected to the corresponding first slider 22 through the first adapter plate 6. In this embodiment, the first adapter plate 6 is a long strip and extends along the radial direction of the annular slide rail. The connection between each first adapter plate 6 of the first slider 22 can be a disassembled fixed connection by nuts, or a non-disassembled connection by welding, the first adapter plate 6 provides a reliable installation platform for the above linear sliding module 3.

Each linear sliding module 3 provided in this embodiment mainly comprises a linear sliding platform 31 and a second slider 32. The linear sliding platform 31 is used to drive the second slider 32 to move in both directions along the radial direction of the annular guide rail 21, thus driving the support module 4 loaded on the second slider 32 to be far away from or close to the convex platform 12 in the radial direction, so as to adjust the distance between the peripheral support point and the central support point in the support structure and change the support range.

Figure 6:
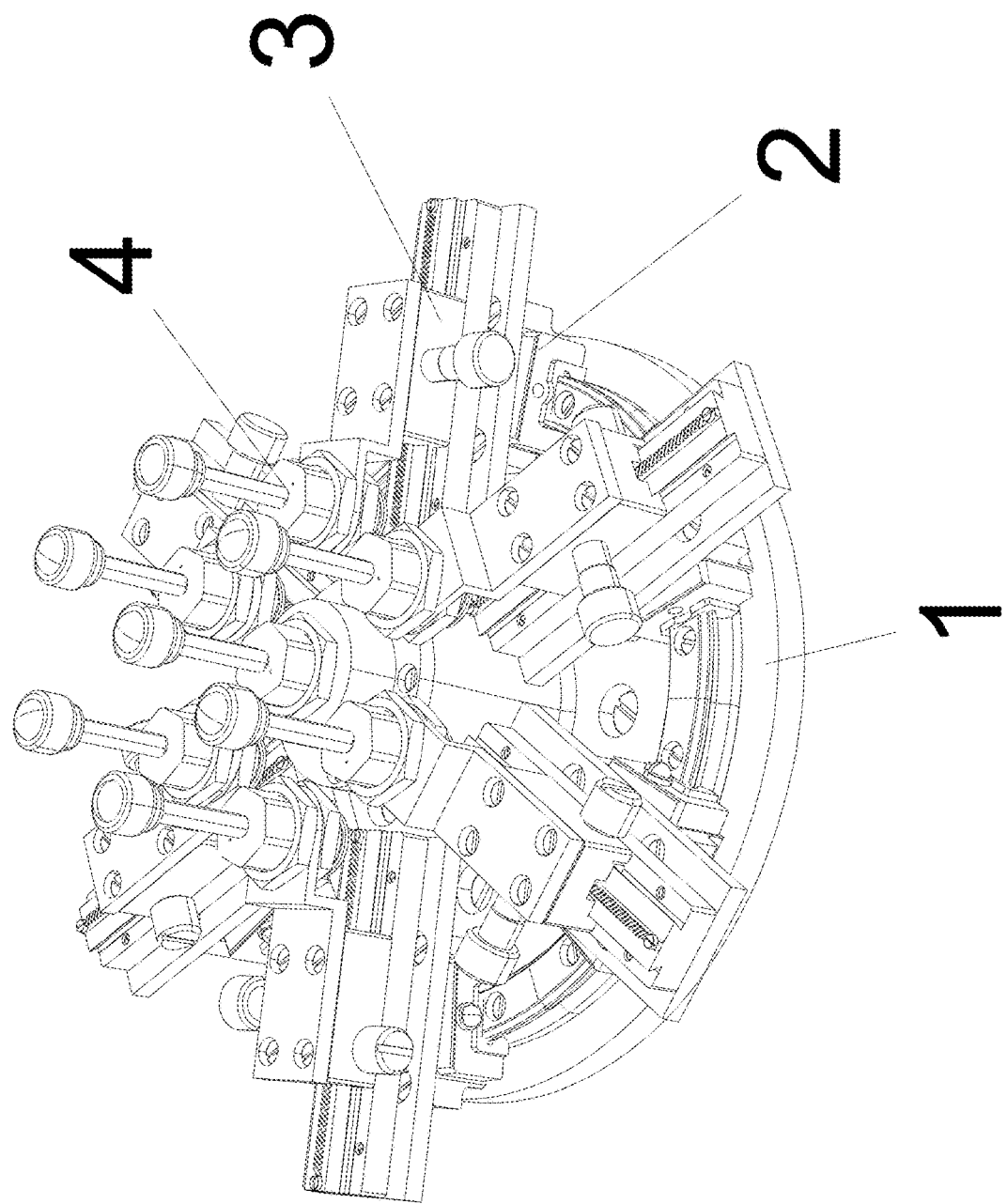
FIG. 6 is a structural diagram of the follow-up support head with the adjustable point layout containing six support points in Embodiment 1 of the invention.

As shown in FIG. 6, the support modules 4 are used to tighten the workpiece to be processed above, and each support module 4 forms a support point that bears the load during use. Considering that the support points in the follow-up support head 99 of this embodiment adopt a spatial distribution similar to the Whiffletree structure. Therefore, the quantity of support modules 4 in the follow-up support head 99 of this embodiment is one more than the quantity of linear sliding module 3. Specifically, one of the support modules 4 is fixedly connected to the convex platform 12, and the remaining support modules 4 are fixedly connected to each second slider 32 through the second adapter plate 7. Specifically, combined with FIG. 5, it can also be seen that the second adapter plate 7 in this embodiment adopts a special bending plate, the bending plate comprises two parallel step surfaces. One of the step surfaces is in a disassembled fixed connection to the second slider 32 by a nut, and the other step surface is provided with a through hole, which is used to install the support modules 4. In each support module 4 of the follow-up support head 99 in this embodiment, the spatial position of the support module 4 located in the middle is fixed on the base 1, while the position of each support module located in the periphery of the base 1 can be freely adjusted by the annular sliding module 2 and the linear sliding module 3. Specifically, the distribution radius of the peripheral support points can be adjusted by the linear sliding module 3, and the angle between the peripheral support points can be adjusted by the annular sliding module 2, each peripheral support point can be controlled to be distributed at any position on the base 1 combined with the two adjustments.

Figure 7:
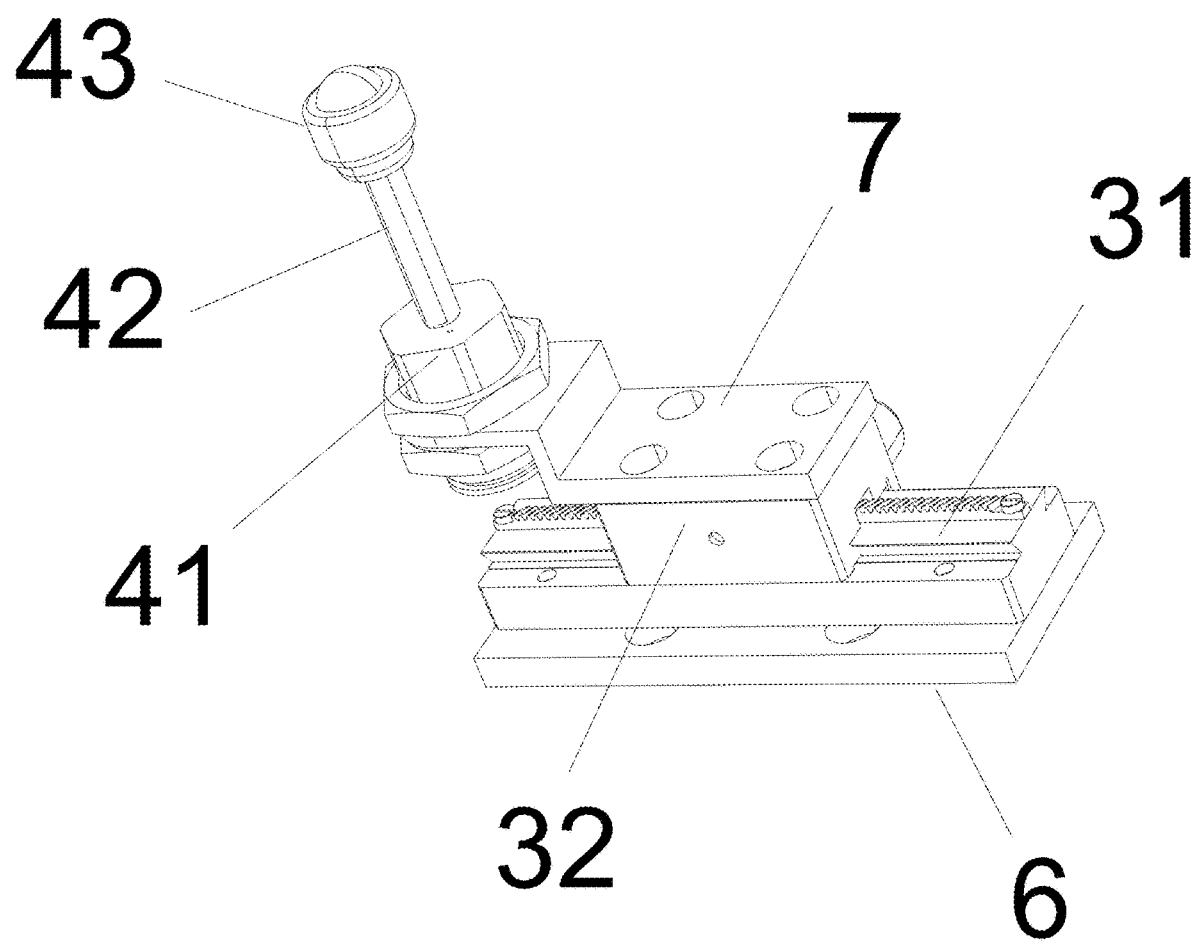
FIG. 7 is an assembly diagram of the support module and the linear sliding module in Embodiment 1 of the invention.

As shown in FIG. 7, each support module 4 provided in this embodiment comprises a needle cylinder 41, a stud 42, and a universal ball 43. One end of the bolt 42 is fixedly connected to the needle cylinder 41, and the other end is fixedly connected to the universal ball 43; the needle cylinder 41 is used to drive the universal ball 43 to move up and down in the direction perpendicular to the base 1 plane through the stud 42. In this embodiment, the height of each universal ball 43 is adjusted by the needle cylinder 41, which can meet the needs of the support point height of different positions in the mirror milling process of thin-walled workpieces containing complex surfaces.

In the product scheme of the follow-up support head 99 with the adjustable point layout provided in this embodiment, the annular sliding module 2 adopts a THK arc guide rail module, and the circular guide rail 21 adopts a V-shaped slide rail. The first slider 22 is equipped with a matching center roller and an eccentric roller for easy adjustment and pre-tightening. The linear sliding platform 31 in the linear sliding module 3 adopts a sliding platform with a LWX type hand-shaking dovetail groove; it is meshed and driven by rack and pinion, which can have the characteristics of long stroke and precision fine adjustment. The slider is clamped in the sliding platform with the LWX type hand-shaking dovetail groove, and the manual knob 33 for locking is set on the side of the slider.

Combined with FIG. 2, it can be seen that in the support head with the Whiffletree structure, the adjustment of the point layout of the support points essentially adjusts the quantity of peripheral support points and the distance between the peripheral support points and the central support points. As shown in FIG. 6, in the follow-up support head 99 with the adjustable point layout provided in this embodiment, on the one hand, the quantity of peripheral support points can be adjusted and the quantity of total support points can be changed in disguise by manually disassembling and assembling part or all of the combination of the first sliders 22, the first adapter plate 6, the linear sliding module 3 and the support modules 4 installed on the annular guide rail 21.

For example, in a task, when it is necessary to adjust the four peripheral support points to three points, it is only necessary to remove the single body of the redundant support module 4 or the linear slide module combination connected to the support modules 4 from the follow-up support head 99, and adjust the position of the remaining first slider 22 on the annular guide rail 21. Correspondingly, when it is necessary to increase the quantity of peripheral support points, it is only necessary to install a corresponding quantity of support modules 4 and other components on the idle first slider 22 and adjust the angle between each first slider 22 to make it evenly distributed on the annular guide rail 21.

On the other hand, by adjusting the position of the second slider 32 participating in the support on the sliding platform with the LWX hand-shaking dovetail groove, the spacing between each support module 4 on the annular guide rail 21 and the support module 4 on the convex platform 12 can be adjusted, and then the spacing between the peripheral support point and the central support point can be changed, and the distribution range of each support point in the follow-up support head 99 can be adjusted. In this embodiment, the position of the second slider 32 on the sliding platform with the LWX type hand-shaking dovetail groove is adjusted manually. The technical personnel loosens the biting state of the second slider 32 and the sliding platform with the LWX type hand-shaking dovetail groove through the manual knob 33 on the side of the second slider 32, and then manually change the position of the second slider 32, and finally re-tighten the manual knob 33.

Figure 8:
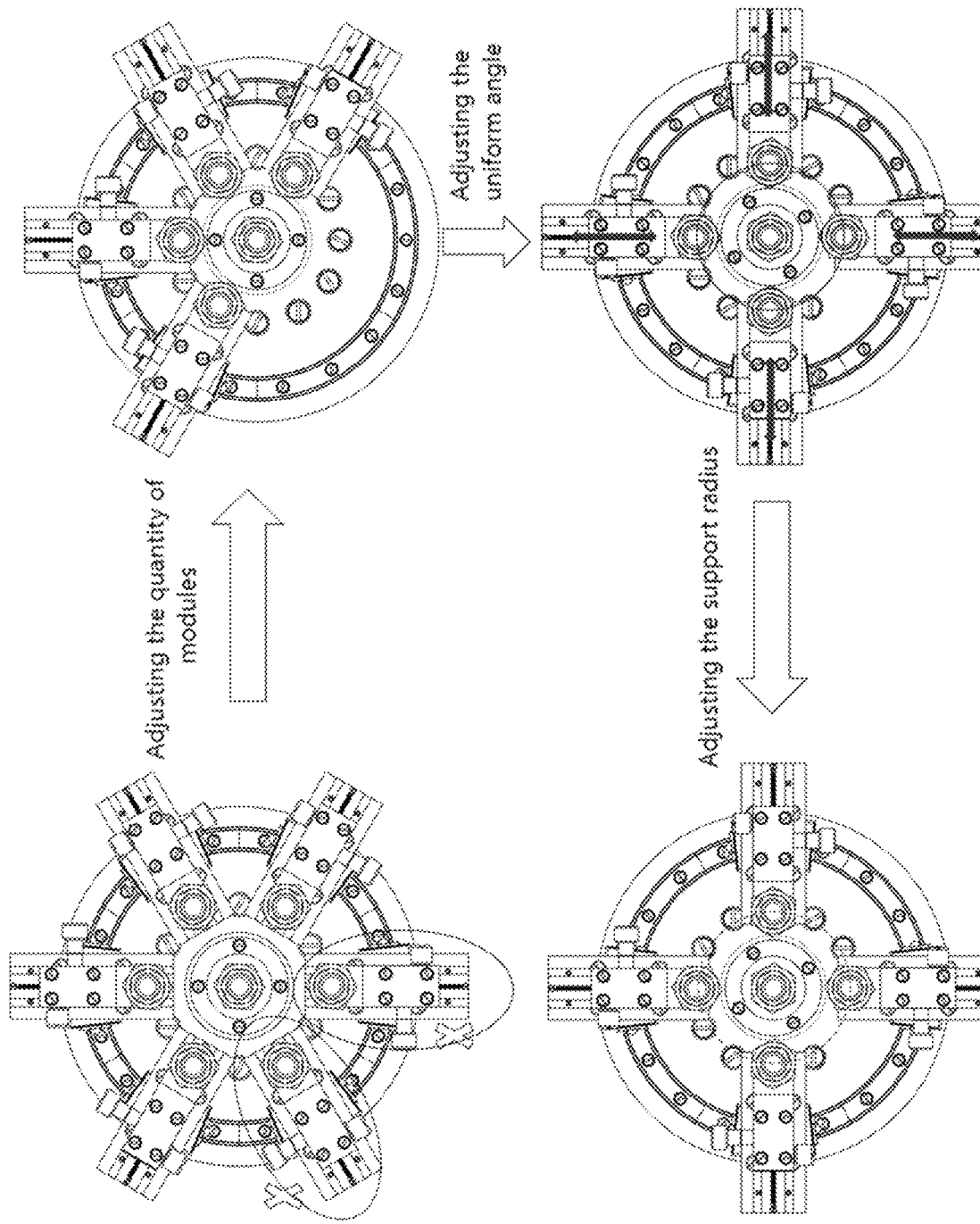
FIG. 8 is a process of realizing the point layout adjustment of the support points in the follow-up support head.

FIG. 8 is a typical case of adjusting seven support points in the point layout to five support points in this embodiment. In the adjustment process, the two sets of redundant functional modules on the annular guide rail 21 are first removed, and then the remaining four functional modules are evenly arranged on the annular guide rail 21. Finally, the distance between the support module 4 on the annular guide rail 21 and the support module 4 on the convex platform 12 is adjusted by the linear guide rail module. Finally, the overall adjustment of the quantity of support points and the support radius is achieved.

Embodiment 2

Figure 9:
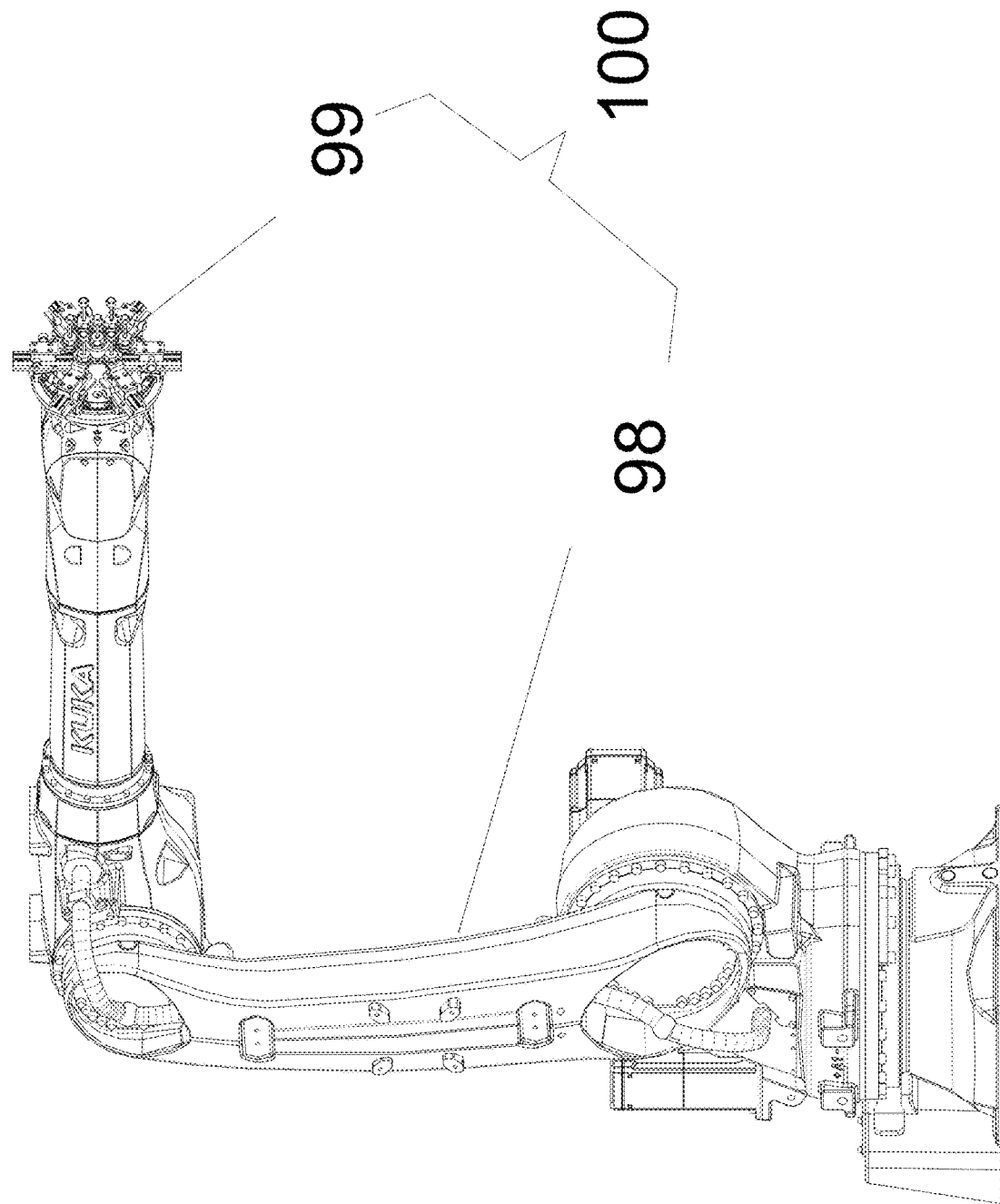
FIG. 9 is a structural diagram of a follow-up robot provided in Embodiment 2 of the invention.

This embodiment provides a follow-up robot 100, as shown in FIG. 9, which comprises at least one multi-degree-of-freedom manipulator 98, and the end of each manipulator 98 is connected to a follow-up support head 99 with the adjustable point layout as shown in Embodiment 1. Since the follow-up robot 100 of this embodiment adopts the follow-up support head 99 with the adjustable point layout in Embodiment 1, the follow-up manipulator 98 supports the adaptive adjustment of the point layout of the support points in the support head at the end of the mechanical wall according to different working conditions. Furthermore, according to the processing tasks of thin-walled workpieces of different specifications, the quantity and radius of peripheral support points in the support head can be flexibly adjusted to ensure that the best support effect can be achieved under different working conditions, so as to improve the milling quality of the workpiece.

The traditional follow-up robot 100 needs to replace the follow-up support head 99 of the mechanical front end according to different processing tasks. However, this embodiment only needs to adjust the point layout of the support points in the follow-up support head 99, and use a follow-up support head 99 to meet the processing requirements of different specifications of workpieces. Therefore, the follow-up robot 100 of this embodiment can effectively reduce the equipment cost of mirror milling in practical application.

Embodiment 3

Figure 10:
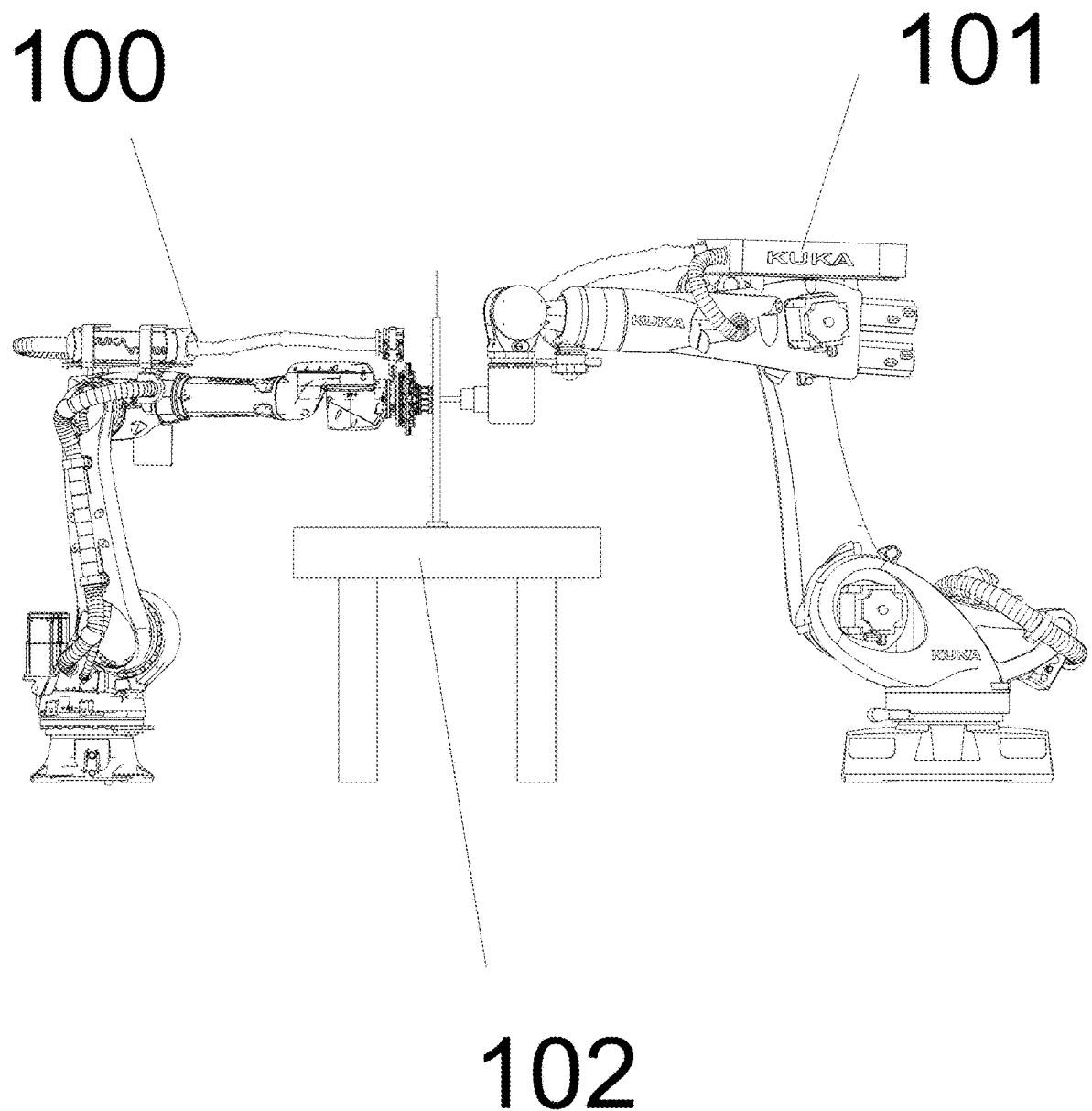
FIG. 10 is a structural diagram of the mirror milling system provided in Embodiment 3 of the invention.

This embodiment proposes a mirror milling system, as shown in FIG. 10, which comprises: a milling robot 101, a follow-up robot 100, a clamping machine 102, and a host computer.

Among them, the milling robot 101 comprises a manipulator 98 and a milling tool at the end of the manipulator, the follow-up robot 100 is in a mirror installation on the opposite side of the milling robot 101, the follow-up robot 100 adopts the product of Embodiment 2 and is used to follow the movement of the milling robot 101 in the machining space to provide the support force required for the milling process on the back of the machining contact area in the workpiece to be machined. The clamping machine 102 is used to clamp and adjust the spatial position of the thin-walled workpiece between the milling robot 101 and the follow-up robot 100. The host computer communicates with the milling robot 101, the follow-up robot 100, and the clamping machine 102, and then coordinates the running states of the three machines to complete the mirror milling task of the thin-walled workpiece.

Embodiment 4

This embodiment provides a point layout optimization method for the follow-up support head in mirror milling, which is used to optimize and adjust the point layout of the follow-up support head in mirror milling used in Embodiments 1-3 in combination with specific working conditions. The support points in the follow-up support head of the optimized layout of this embodiment comprise the central support point and the peripheral support points arranged in a ring around the central support point.

Figure 11:
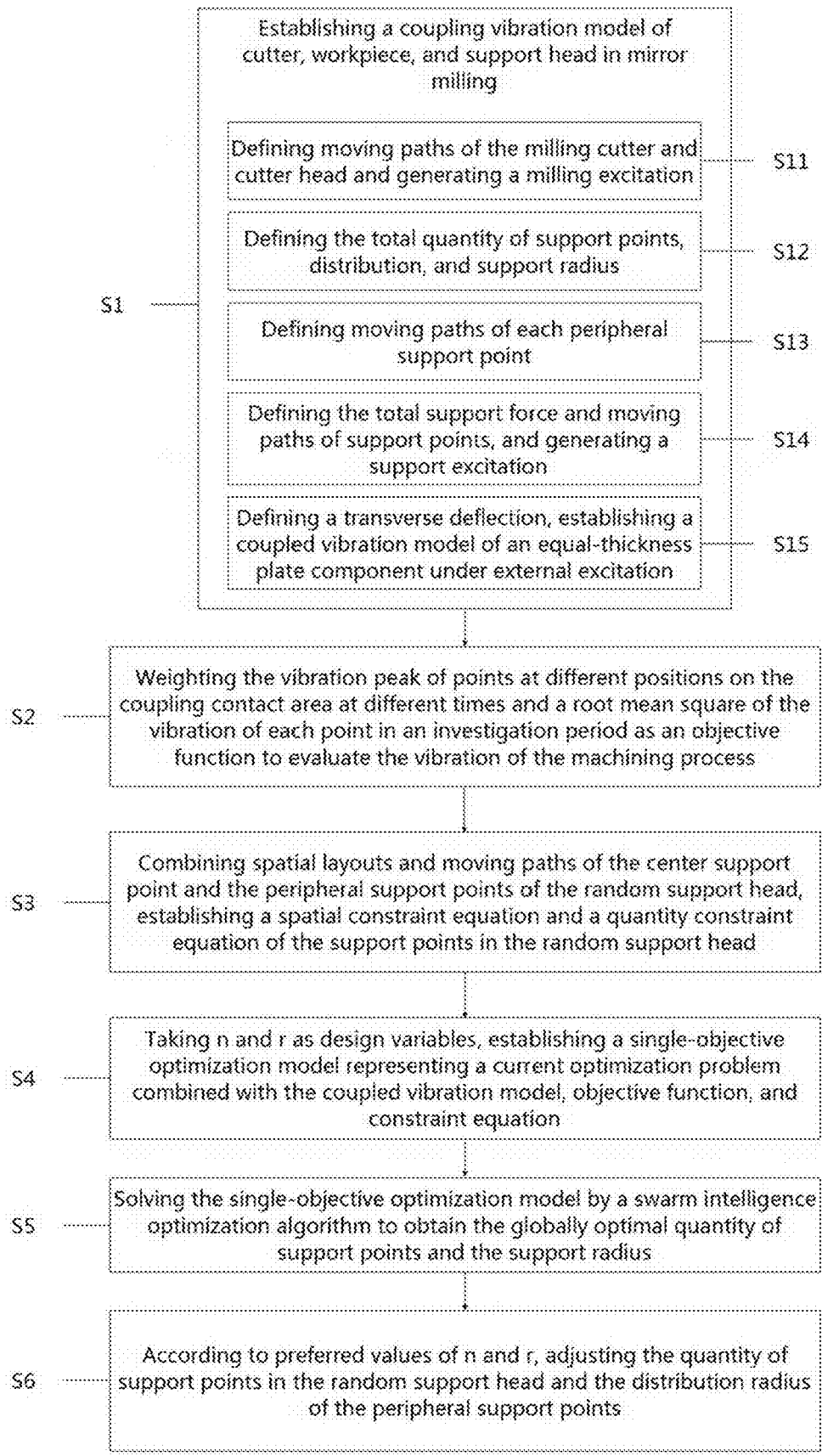
FIG. 11 is a step flow chart of the point layout optimization method for the follow-up support head in mirror milling provided in Embodiment 4 of the invention.

Specifically, as shown in FIG. 11, the point layout optimization method comprises the following steps:

S1: The coupled vibration model of the cutter, workpiece, and support head in mirror milling is established. In the cutter-workpiece-support coupled vibration system studied in this embodiment, the end-milling cutter and the multi-point support head move cooperatively on both sides of the component while maintaining the vertical thin-walled plate surface and the coaxial line. The above Whiffletree strategy is now used to provide a stable and uniform support effect through uniformly distributed annular support points. Considering the small coupling contact area of the follow-up support and the need to reduce the design cost, the method of center point+single ring support is selected. On this basis, the construction process of the coupled vibration model is as follows:

S11: The milling force acting on the axial direction of the workpiece is defined as Fm(t), moving paths of the center point of the milling cutter are xm(t)、ym(t), and a milling excitation qm(x,y,t) is generated by combining the Dirac function δ, in this embodiment, the expression of the milling excitation qm(x,y,t) is as follows:

$$q_m(x,y,t) = F_m(t)\, \delta(x - x_m(t))\, \delta(y - y_m(t))$$

S12: For the support side, considering the connection of the air pressure of all cylinders can better balance the load distribution and improve the robustness of the system. In this example, the total quantity of support points of the support head is defined as n, where 1 support point is located at the center of the support head, and remaining n−1 support points are evenly distributed on a circle with a radius of r; n and r are characteristic parameters that characterize the point layout of the follow-up support head.

S13: The moving paths of the central support point are defined as xsl(t)、ysl(t), and the moving paths of each peripheral support point are generated as xsi(t)、ysi(t), where i=2, 3 . . . n. The moving paths xsi(t)、ysi(t) of the peripheral support point satisfy the following formula:

$$\begin{cases} x_{si}(t) = x_{s1}(t) + r\cos\dfrac{2\pi(i-1)}{n-1} \\ y_{si}(t) = y_{s1}(t) + r\sin\dfrac{2\pi(i-1)}{n-1} \end{cases} \quad i = 2, 3\ \dots\ n$$

S14: The total support force provided by the support head is defined as Fs(t), and a support excitation qs(x,y,t) is generated by combining the moving paths of each peripheral support point xsi(t)、ysi(t) and the Dirac function δ In this embodiment, the expression of the support excitation qs(x,y,t) is as follows:

$$q_s(x,y,t) = \sum_{i=1}^{n} \dfrac{F_s(t)}{n} \delta(x - x_{si}(t)) \cdot \delta(y - y_{si}(t))$$

S15: the transverse deflection perpendicular to the machining surface in mirror milling is defined as w(x,y,t), the coupled vibration model created in this embodiment can start from the forced vibration formula of the thin plate, because the thickness of the thin-walled part is much smaller than the size of the other two dimensions, the vibration formula mainly considers the transverse deflection w(x,y,t) perpendicular to the middle surface. Therefore, based on the Kirchhoff-Love hypothesis, establishing a coupled vibration model of the equal-thickness plate component under external excitation as follows:

$$D\left(\dfrac{\partial^4 w}{\partial x^4} + 2\dfrac{\partial^4 w}{\partial x^2 \partial y^2} + \dfrac{\partial^4 w}{\partial y^4}\right) + \rho h \dfrac{\partial^2 w}{\partial t^2} = q(x, y, t)$$

where q(x,y,t) denotes the additional excitation on the unit area of the workpiece, the additional excitation is composed of the milling excitation qm(x,y,t) and the support excitation qs(x,y,t); D denotes the bending stiffness of the workpiece, h denotes the wall thickness of the workpiece; ρ denotes the density of the workpiece.

The bending stiffness D of the workpiece satisfies the following formula:

$$D = Eh^3/[12(1-\mu^2)].$$

where E and μ denote the elastic modulus and the Poisson's ratio of the workpiece, respectively.

S2: The solution of the coupled vibration model created in this embodiment describes the vibration of points at different positions in the coupled contact area at different times, it is a dynamic model, so it needs to be considered comprehensively from different perspectives as far as possible. In this embodiment, the most intuitive optimization index is to reduce the maximum vibration value, so as to avoid excessive vibration peak value, which helps to prevent the system from being impacted or damaged too much.

Based on this purpose, in this example, the vibration peak f1 of points at different positions on the coupling contact area at different times and the root mean square f2 of the vibration of each point in the investigation period is weighted as the objective function f to evaluate a vibration of the machining process, the optimization goal is as follows:

$$\min f = \alpha_1 f_1 + \alpha_2 f_2$$

where $\alpha_1$ and $\alpha_2$ are weight coefficients of the vibration peak f1 and the root mean square f2 of each point vibration, and satisfy $\alpha_1 + \alpha_2 = 1$.

Where the vibration peak f1 is the peak value of the transverse deflection w(x,y,t) of the workpiece during the machining process, the calculation formula is as follows:

$$f_1 = w(x,y,t)_{max};$$

the root mean square f2 of the vibration at each point is the square root of the average value of the sum of squares of the vibration signal in the specified time and space range, the calculation formula is as follows:

$$f_2 = \sqrt{\frac{\int_{t_0}^{t_1} \int_{y_0}^{y_1} \int_{x_0}^{x_1} w^2(x, y, t) dx dy dt}{(x_1 - x_0)(y_1 - y_0)(t_1 - t_0)}} ;$$

where x0 and y0 are the lower limits of the movement range of the center point of the milling cutter; x1 and y1 are the upper limits of the movement range of the center point of the milling cutter; t0 and t1 are the start time and end time of milling.

S3: Combining the spatial layouts and moving paths of the center support point and the peripheral support points of the follow-up support head, establishing the spatial constraint equation and the quantity constraint equation of the support points in the follow-up support head are constructed. In this embodiment, the spatial constraints that each support point in the follow-up support head needs to satisfy comprise: (1) the center support point does not interfere with the peripheral support points; (2) the outer contour of the peripheral support point does not exceed the outer diameter of the follow-up support head; (3) no interference between the peripheral support points.

Figure 12:
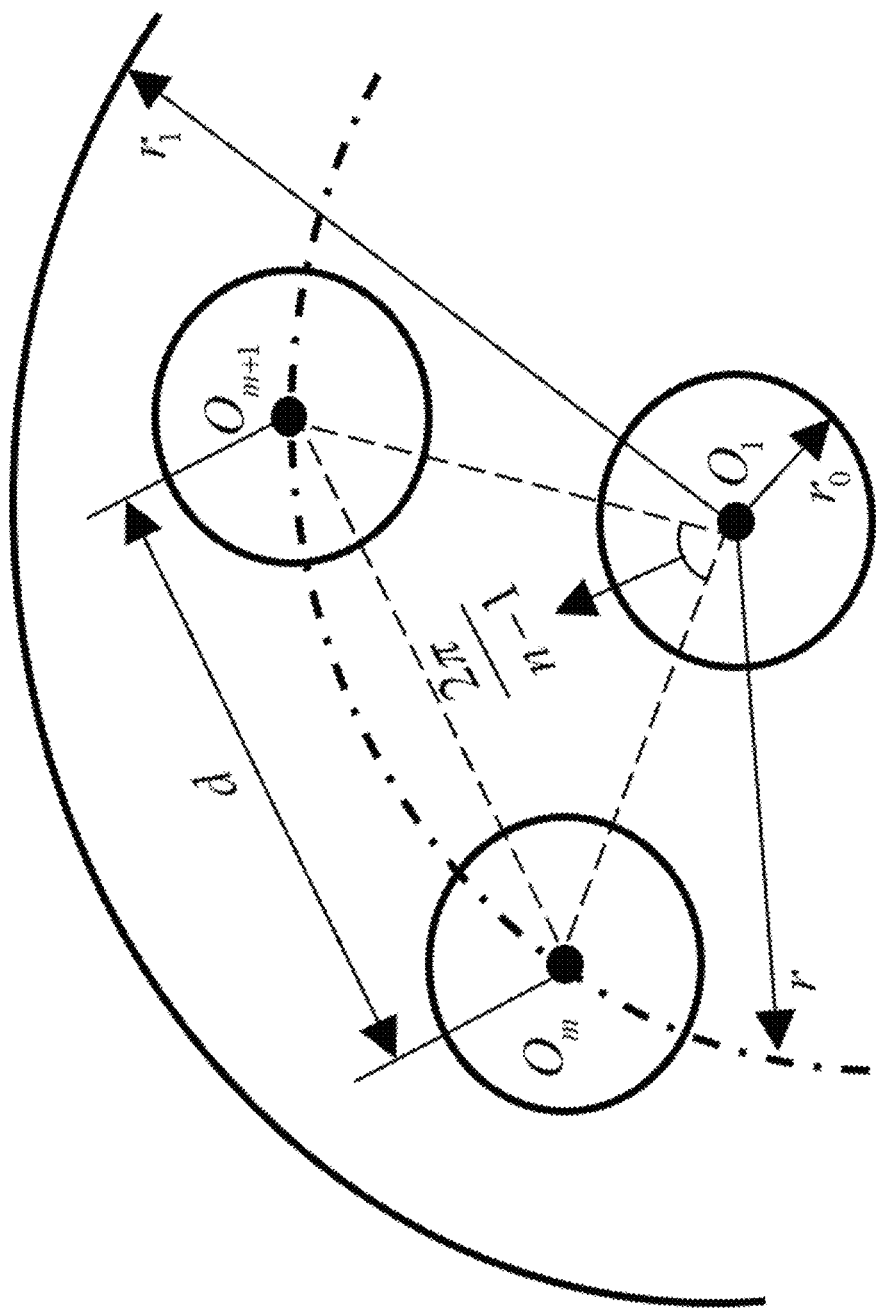
FIG. 12 is a simplified diagram of a positional relationship between each support point in the follow-up support head.

Combined with FIG. 12, the constraints that the point layout design of the support points in the follow-up support head needs to meet are analyzed in the following:

In the case of determining the force of the system, the effect of the external excitation is mainly affected by the quantity of support points n and the support radius r. However, the values of these two parameters are not arbitrary, and they are also limited by structural constraints. It is assumed that the interference radius of a single support structure is r0, and the outermost radius of the support head is r1, the spatial position relationship between the central support point and any two adjacent peripheral support points is shown in FIG. 12.

(1) No interference between the center support point and the peripheral support point is required, then the following is satisfied:

$$r > 2r_0$$

(2) It is required that the outer contour of the peripheral support point does not exceed the outer diameter of the follow-up support head, then the following is satisfied:

$$r < r_1 - r_0$$

(3) It is required that the peripheral support points do not interfere with each other, so the center of the central support point can be set as O1, and the centers of any two adjacent peripheral support points are Om and Om+1, respectively, the three centers form an isosceles triangle, where the angle $\angle O_m O_1 O_{m+1}$ between the two peripheral support points is as follows:

$$\angle O_m O_1 O_{m+1} = 2\pi/(n-1)$$

According to the cosine theorem, the distance d between Om and Om+1 is as follows:

$$d = \sqrt{2r^2 \left(1 - \cos\left(\frac{2\pi}{n-1}\right)\right)}$$

In order to satisfy the spatial constraint of non-interference between the peripheral support points, it is necessary to ensure d>2r0, that is:

$$r > \sqrt{\frac{2r_0^2}{1 - \cos\left(\frac{2\pi}{n-1}\right)}}$$

The above formulas comprise the lower bounds of the two characterization variables r, and the actual lower bound can be obtained by taking a larger value in the two characterization variables. When n=7, the two lower bounds intersect and can be used as the judgment nodes for the selection of the two characterization variables. At the same time, considering the lower bound of r should be less than the value of its upper bound, the upper bound of n can be solved as follows combined with the previous formula:

$$n < 1 + \frac{2\pi}{\arccos\left(1 - \frac{2r_0^2}{(r_1 - r_0)^2}\right)}$$

Where n is a positive integer greater than 2 in order to ensure that there is at least one point in the peripheral support points, and the denominator of each type is not 0.

In summary, in the optimization problem created in this embodiment, the corresponding spatial constraint equation is as follows:

$$\max\left[2r_0, \sqrt{\frac{2r_0^2}{1 - \cos\left(\frac{2\pi}{n-1}\right)}}\right] < r < r_1 - r_0$$

The constraint equation corresponding to the quantity constraint of support points in the follow-up support head is as follows:

$$2 < n < 1 + \frac{2\pi}{\arccos\left(1 - \frac{2r_0^2}{(r_1 - r_0)^2}\right)}, n \in N^*$$

S4: In order to obtain the corresponding optimal support point layout under different working conditions, this embodiment uses n and r as design variables, a single-objective optimization model representing the current optimization problem is established combined with the coupled vibration model, objective function and constraint equation. In this embodiment, the expression of the established single-objective optimization model is as follows:

find: n,r $$\min f = \alpha_1 w_{max} + \alpha_2 \sqrt{\frac{\int_\Omega w^2 dxdydt}{Vol(\Omega)}}$$

$$s.t. \begin{cases} D\nabla^4 w + \rho h \frac{\partial^2 w}{\partial t^2} q(n, r) \\ 2 < n < 1 + \frac{2\pi}{\arccos\left(1 - \frac{2r_0^2}{(r_1 - r_0)^2}\right)} n \in z^+ \\ \max\left[2r_0, \sqrt{\frac{2r_0^2}{1 - \cos\left(\frac{2\pi}{n-1}\right)}}\right] < r < r_1 - r_0 \\ \Omega: x \in [x_0, x_1], y \in [y_0, y_1], t \in [t_0, t_1] \end{cases}$$

where Ω is the decision space. Where x0 and y0 are the lower limits of the movement range of the center point of the milling cutter; x1 and y1 are the upper limits of the movement range of the center point of the milling cutter; t0 and t1 are the start time and end time of milling.

S5: In the single-objective optimization model established in this embodiment, different values of n and r need to be substituted into the fourth-order partial differential formula for a solution, and the measurement index can be obtained after processing the plate vibration in the obtained space-time range. This problem belongs to the optimization problem under the constraint of partial differential formulas, and it is difficult to find the extreme point through direct mathematical analysis. At the same time, the inequality constraints and the continuous and discrete mixed variables further increase the difficulty of its solution.

In order to obtain the optimal solution of the single-objective optimization model, this embodiment uses the swarm intelligence optimization algorithm to find the solution of the single-objective optimization model and obtains the globally optimal quantity of support points n and the distribution circle radius r.

In particular, in order to improve the optimization efficiency of the swarm intelligence optimization algorithm, this embodiment establishes a composite solution-seeking strategy dominated by the swarm optimization algorithm, combined with parameter scanning and penalty function. The strategy is as follows:

(1) Particle Swarm Optimization Algorithm

Due to the complexity of solving the optimization problem in this embodiment, this embodiment chooses to use the swarm intelligence optimization algorithm to explore the solution space. Among them, the particle swarm optimization (PSO) algorithm is a classical and efficient method, it is an ideal choice to solve the problem of this embodiment because of its simple mathematical form and fast convergence performance.

PSO is an optimization algorithm inspired by the behavior of natural groups, its core idea is to simulate a group of particles to search in the solution space and to optimize and iterate through the information-sharing mechanism to find the optimal solution of an objective function. The quantity of particles and the variable dimension are known, the main process of the algorithm is as follows:

a. The position and velocity of each particle in different dimensions are follow-uply initialized.

b. The fitness value of each particle corresponding to the cutoff time is calculated according to the objective function, and the historical individual optimal position value and the group optimal position value of the particle are compared.

c. Based on the three concepts of particle habit, cognition, and society, the iterative update of its speed and position is carried out.

d. It is determined whether the maximum quantity of iterations is reached: if not, step b is returned for continuous iteration; if so, the optimal result is output.

(2) Parameter Scanning

Since the value of the variable n must be a positive integer to have practical value, thus forms a mixed integer optimization problem. Most of the common ideas are to start with the continuous relaxation problem of all variables in the algorithm retrieval and perform rounding or correction operations after the location update, but the search space is too large, which may also increase the risk of falling into the local optimal value.

According to the previous formula, the upper limit of the variable n is only related to the structural parameters r0 and r1, and the ratio between the two parameters is often not too large considering the practical experience and cost. If the ratio of the two parameters is not more than 5, that is, r1−r0≤4 r0, the formula is substituted into the quantity constraint equation of the support point, and combined with the increase and decrease of the inverse cosine function, the scaling can be obtained:

$$n < 1 + \frac{2\pi}{\arccos\left(1 - \frac{2r_0^2}{(r_1 - r_0)^2}\right)} \le 1 + \frac{2\pi}{\arccos\left(1 - \frac{2r_0^2}{16r_0^2}\right)} < 14$$

That is, the quantity of values m of n is often very limited in common cases. Therefore, this embodiment directly adopts the idea of parameter scanning: that is, at the same time, m independent particle swarms are opened for parallel operation, and the optimal index and corresponding r value under different n values are calculated. After the iteration is completed, the real global optimal value is obtained by unified comparison. In this way, not only the two-dimensional region of the particle search is directly reduced to a line group composed of multiple one-dimensional lines, but also its sub-problems can be solved, such as specifying n to find the optimal support radius r.

That is, the upper limit of the quantity of support points n can be calculated by using the parameter scanning according to the constraint equation established in S3, and then the m candidate values of the discrete design variable n can be determined. Then the bivariate optimization process of the iterative optimization process is transformed into the optimization process of the parallel processing of the single variable r in m different populations. Thus, the difficulty of solving the optimization problem is reduced.

(3) Penalty Function

After adopting the parameter scanning strategy, each population only needs to optimize r variables. However, in the iteration of the position, the value of r may exceed the range of the constraint, resulting in the invalidity of the solution. In order to overcome this problem, the embodiment further introduces the penalty function to modify the fitness function. The fitness function fit of the modified swarm intelligence optimization algorithm is as follows:

$$Fit = f + F.$$

The core idea of introducing a penalty function in this embodiment is to introduce an additional penalty term in the objective function to impose penalty points on solutions that do not meet the constraints. In this way, the iterative process of particle swarm optimization is guided to find the solution that satisfies the constraint conditions. The principle of the penalty function to guide the iterative process is as follows:

Specifically, assuming $\tilde{\chi}=[\chi_1, \chi_2, \ldots \chi_d]$ is the d-dimensional vector to be optimized, then all inequality constraints can be transformed into the following format:

$$g_k(\tilde{\chi}) \leq 0 \quad k=1,2,\ldots,m$$

where $g_k$ is a constraint equation containing k sorted inequality constraints, and the right side of the formula contains only 0 terms.

Then the following penalty term F is constructed:

$$F(\tilde{\chi}) = \sum_{k=1}^{m} \sigma_k \max\{0, g_k(\tilde{\chi})\}^{\lambda_k}$$

In the above formula, $\sigma_k$ and $\lambda_k$ denotes the penalty coefficient and the power coefficient, respectively.

That is, when the variable value satisfies the constraint, the penalty term is 0; when the variable value does not satisfy the constraint, when the degree of violation is higher, the penalty term is higher, which can guide the particle to find the solution under the constraint.

Figure 13:
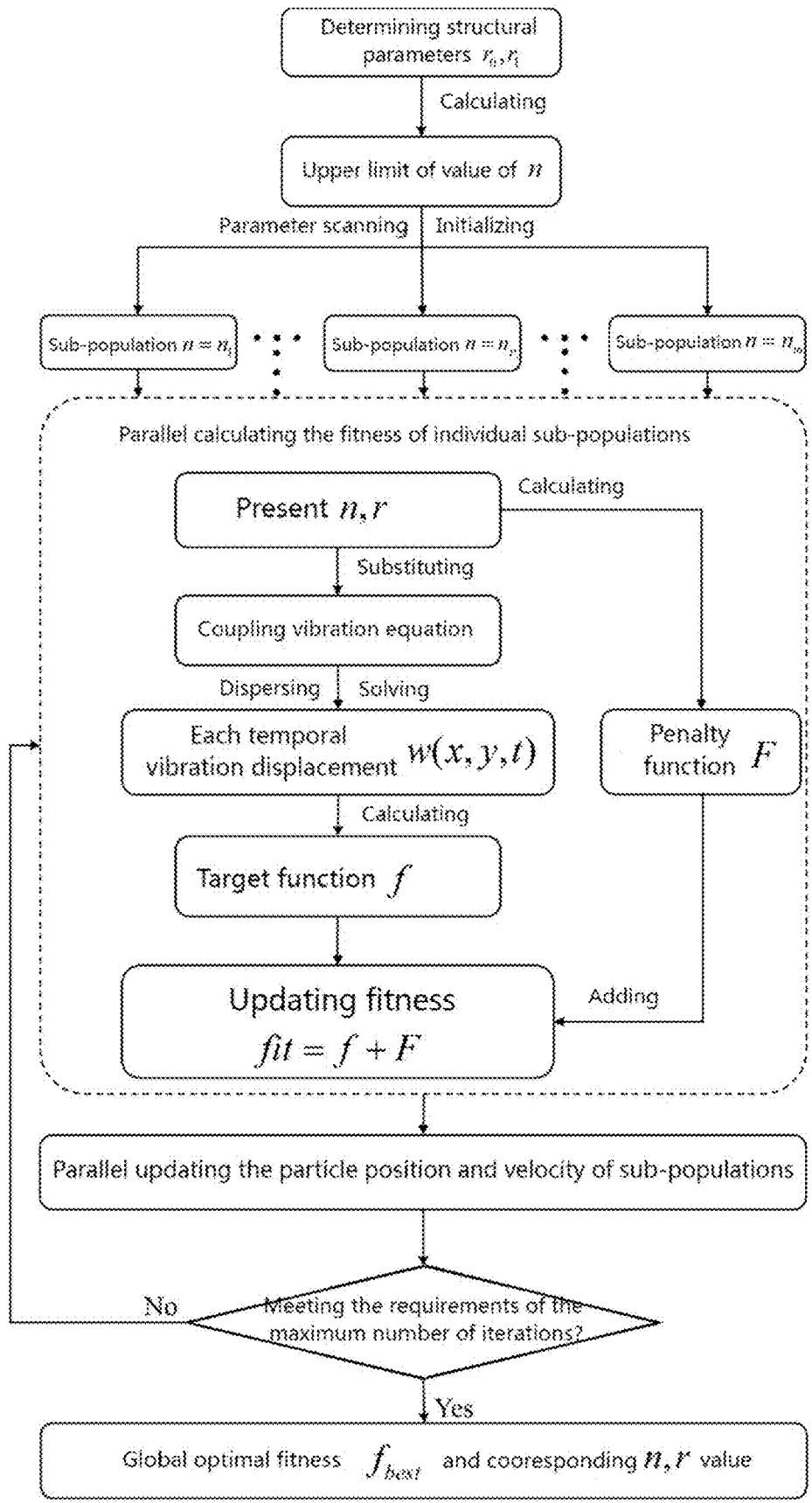
FIG. 13 is a step flow chart of the solution-seeking process based on the particle swarm optimization algorithm in the point layout optimization method in Embodiment 4 of the invention.

Specifically, as shown in FIG. 13, the particle swarm optimization algorithm is selected as the dominant algorithm in this embodiment, the solution process of the particle swarm optimization algorithm with penalty function and parameter scanning strategy is as follows:

S51: Firstly, the upper limit nmax of the positive integer n is calculated according to the given values of r0 and r1, and the quantity of values m of n and each candidate value n1–nm are determined.

S52: According to the quantity of values m of n, the corresponding quantity of particle swarms starts to perform parallel operations under parameter scanning.

S53: n1–nm are used as the fixed parameters of each subgroup, and the fitness calculation and iterative update of the particles are performed independently for each subgroup.

S54: After satisfying the iteration termination condition, the fitness results calculated in all channels of parallel processing are sorted in a unified manner to determine the global optimal fitness fbest.

S55: The optimal solutions of n and r corresponding to the global optimal fitness fbest are outputted.

S6: Finally, according to the preferred values of n and r, the quantity of support points in the follow-up support head and the distribution radius of the peripheral support points are adaptively adjusted.

Embodiment 5

This embodiment discloses a point layout optimization device for the follow-up support head in mirror milling, comprising a memory, a processor, and a computer program stored on the memory and running on the processor. When the processor executes the computer program, the processor performs steps of the point layout optimization method for the follow-up support head in mirror milling in Embodiment 4; then according to workpiece attribute parameters D、h、$\rho$、E、$\mu$; processing parameters Fm(t)、xm(t)、ym(t)、Fs(t); structural parameters of support head r1、r0; and the weight coefficients $\alpha_1$、$\alpha_2$; the characteristic parameters n and r of the point layout of the follow-up support head satisfying a minimum machining process vibration f are generated.

The point layout optimization device of the follow-up support head in mirror milling is essentially a computer device for data processing and instruction generation, which comprises memory, processor, and computer program stored in memory and running on the processor. The computer equipment provided in this embodiment can be an embedded model capable of executing a computer program, or an intelligent terminal capable of executing a program, such as a tablet computer, a notebook computer, a desktop computer, a rack server, a blade server, a tower server or a cabinet server (comprising an independent server, or a server cluster composed of multiple servers), etc. The computer equipment of this embodiment comprises at least but not limited to memory and processors that can communicate with each other through the system bus.

In this embodiment, the memory (readable storage medium) comprises flash memory, hard disk, multimedia card, card memory (for example, SD or DX memory, etc.), follow-up access memory (RAM), static follow-up access memory (SRAM), read-only memory (ROM), electrically erasable programmable read-only memory (EEPROM), programmable read-only memory (PROM), magnetic memory, disk, optical disk, etc. In some embodiments, the memory may be an internal storage unit of a computer device, such as a hard disk or memory of the computer device.

In other embodiments, the memory can also be an external storage device of a computer device, such as a plug-in hard disk, a Smart Media Card (SMC), a Secure Digital (SD) card, and a Flash Card equipped on the computer device. Of course, memory can also comprise both the internal storage unit of the computer device and its external storage device. In this embodiment, memory is usually used to store operating systems and various application software installed on computer equipment. In addition, the memory can also be used to temporarily store all kinds of data that have been output or will be output.

In some embodiments, the processor can be a central processing unit (CPU), an image processing unit (GPU), a controller, a microcontroller, a microprocessor, or other data processing chip. The processor is typically used to control the overall operation of the computer device. In this embodiment, the processor is used to run program code stored in memory or to process data.

Performance Test

In order to verify the effectiveness of the point layout optimization method for the follow-up support head in mirror milling provided by the invention, technicians also designed some simulation and test experiments such as the following.

1. Precision Test of Coupled Vibration Model

S1 of the invention constructs a mathematical model for evaluating the vibration state of the workpiece in the mirror milling process, namely the coupled vibration model, which is the basis for the subsequent optimization of the point layout. In this experiment, the accuracy of the coupled vibration model is evaluated by finite element simulation.

The pre-requirement of dealing with the optimization problem of the invention is to be able to solve the vibration of each point of the plate under external excitation. In this experiment, the solvedpde function of Matlab is used to solve the coupled vibration model under the finite element method. The general format supported by the function model is as follows:

$$m\frac{\partial^2 u}{\partial t^2} + d\frac{\partial u}{\partial t} - \nabla \cdot (c \otimes \nabla u) + au = f$$

Where $\otimes$ denotes a tensor product; m denotes a coefficient matrix of the second-order partial derivative of the independent variable to time; d denotes a coefficient matrix of the first-order partial derivative of the independent variable to time; a denotes a coefficient matrix with a linear relationship with the independent variable; u denotes an independent variable to be solved, it is in vector form; c denotes a coupling coefficient matrix between the gradient of the independent variable and the tensor product; f denotes the coefficient matrix without independent variables.

Assuming $\nabla^2 w = v$, then the original formula of the coupled vibration model is reduced from the fourth-order partial differential formula to the following second-order partial differential formula:

$$\begin{cases} D\left(\frac{\partial^2 v}{\partial x^2} + \frac{\partial^2 v}{\partial y^2}\right) + \rho h \frac{\partial^2 w}{\partial t^2} = q(x, y, t) \\ \frac{\partial^2 w}{\partial x^2} + \frac{\partial^2 w}{\partial y^2} - v = 0 \end{cases}$$

$u = [w \ v]^T$ and u is compared with the transformed model, the coefficient matrix required for programming can be obtained:

$$m = \begin{bmatrix} \rho h & 0 \\ 0 & 0 \end{bmatrix},$$
$$d = 0_{2 \times 2},$$
$$c = \begin{bmatrix} 0_{2 \times 2} & -D \cdot I_{2 \times 2} \\ -I_{2 \times 2} & 0_{2 \times 2} \end{bmatrix},$$
$$a = \begin{bmatrix} 0 & 0 \\ 0 & -1 \end{bmatrix},$$
$$f = \begin{bmatrix} q(x, y, t) \\ 0 \end{bmatrix}$$

Now a case is taken to verify the formula: assuming that the physical parameters of a thin-walled workpiece are shown in Table 1, assuming the workpiece center point is the origin of the coordinate axis, and 100 N constant force is applied here to represent the usual milling force amplitude. The boundary condition is fixed on four sides, and the initial condition is that the displacement and velocity of each point on the workpiece are 0 at the initial time.

TABLE 1

Physical parameters of thin-walled workpiece

| Parameter type | Value |
| --- | --- |
| Geometrical dimension | 1000 × 1000 × 5 mm |
| Elastic modulus | 70 GPa |

TABLE 1-continued

Physical parameters of thin-walled workpiece

| Parameter type | Value |
| --- | --- |
| Density | 2700 kg/m³ |
| Poisson's ratio | 0.3 |

Figure 14:
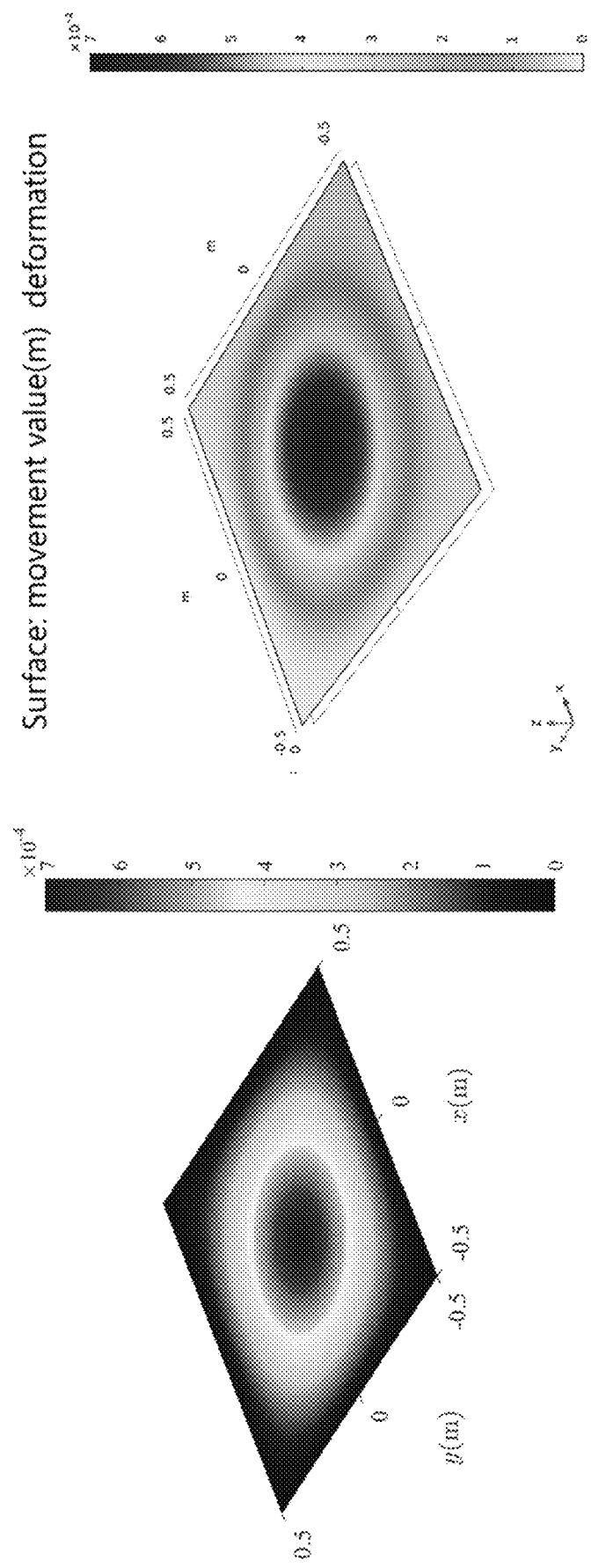
FIG. 14 is a static displacement value and distribution law of each point obtained by solving the solvepde function in the simulation experiment and the analysis of the professional finite element simulation software COMSOL.

Finally, the static displacement value and distribution law of each point obtained by the solution of the solvepde function and the analysis of professional finite element simulation software COMSOL are shown in FIG. 14. By comparing the left and right parts of FIG. 14, it can be seen that the results of the modeling solution of this embodiment are consistent with the results of the finite element analysis, which proves that the construction of the previous coupled vibration model is correct with the real solution process.

2. Analysis of the Distribution of Solutions

After completing the pre-preparation work, continue to optimize the case analysis. Assuming that the physical parameters, initial conditions, and boundary conditions of the component are the same as before, the structural parameters r0 and r1 are taken as 0.017 m and 0.080 m respectively. In order to better fit the periodicity of the change of the axial force of the milling cutter, the following harmonic function is used to simplify the description:

$$F_m(t) = F_0 \sin(\omega t + \varphi_0).$$

where F0, $\omega$ and $\varphi_0$ are the amplitude, angular frequency, and initial phase of the axial milling force, respectively. In this experiment, the values of the three parameters are 100, 500π, and 0, respectively.

The total support force reversed to the milling force at the same frequency is taken, and each support point is kept evenly divided. The sum of the weight indexes is 0.5, and the vibration state of the system from the initial time to 0.16 s is investigated.

Figure 15:
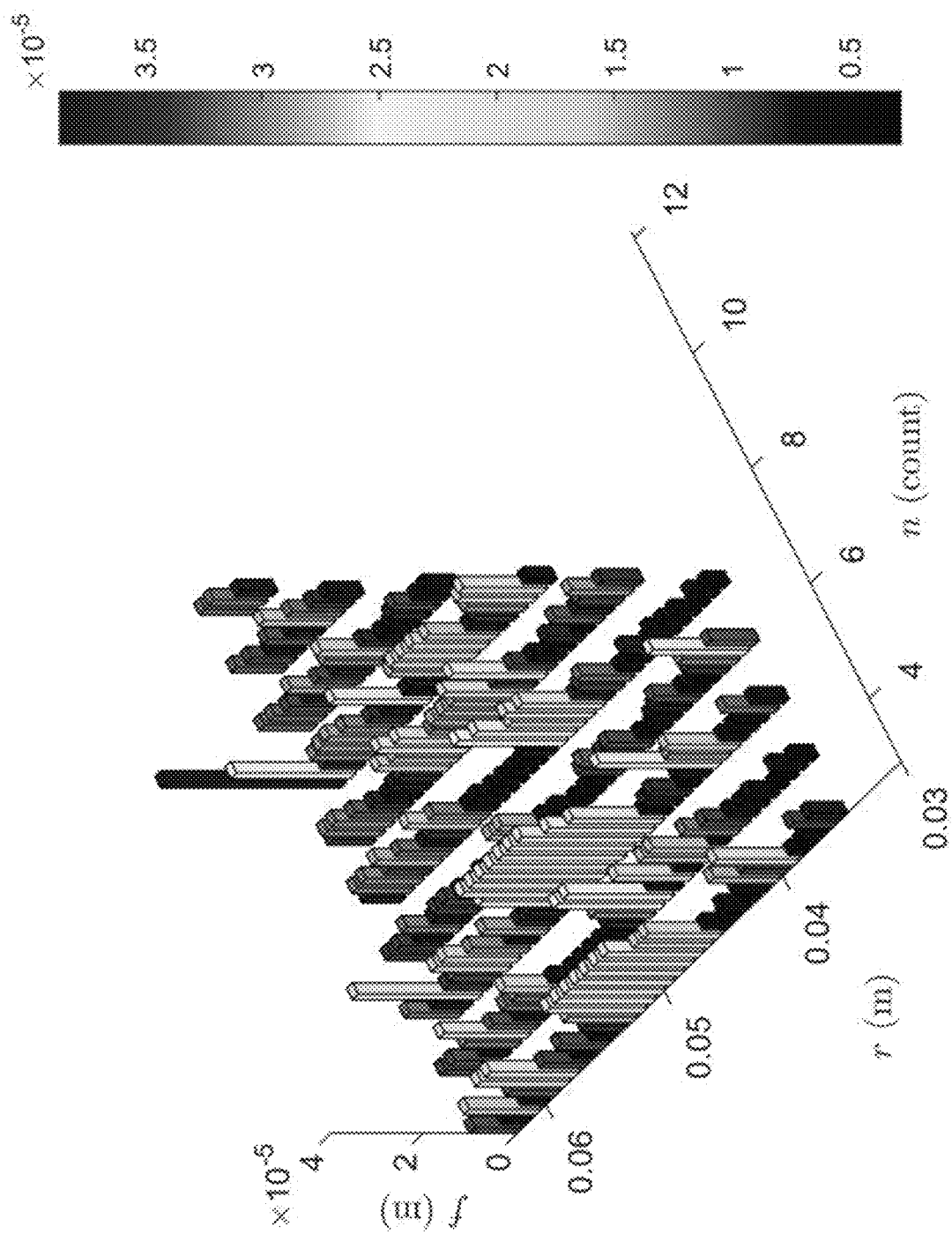
FIG. 15 is a relationship between the fitness to be investigated and two variables according to the discrete points in the simulation experiment.

The relationship between the fitness to be investigated and the two variables is drawn by discrete points, and the distribution map is obtained as shown in FIG. 15. It can be seen from FIG. 15 that the missing corner of the image corresponds to the previous structural constraints, and the value of n is 7 as the dividing line. At the same time, for the same quantity of support points, different support radius values will have a huge impact on the vibration suppression effect, so the selection of this parameter needs to be more rigorous and detailed. Furthermore, for the fitness distribution of the whole image, there is no obvious regularity in the increase and decrease, which further proves the necessity of using a particle swarm optimization algorithm to solve the optimization problem.

In this experiment, the parallel optimization of particle swarm optimization algorithm with penalty function and parameter scanning strategy is adopted. The quantity of retrieved particles under different n values is set to 3, and the algorithm is iterated for 100 generations. The learning factor c1=c2=1.5 in the iterative formula, and the inertia weight $\omega$ adopts the following linear decreasing method to realize the smooth transition from the early emphasis on global exploration to the later emphasis on local exploration:

$$\omega = \omega_{max} - \frac{\omega_{max} - \omega_{min}}{100} i$$

Where $\omega_{max}$ and $\omega_{min}$ are the initial value and the end value of the inertia weight respectively; in this experiment, the values are 0.9 and 0.5, respectively, i is the iteration algebra.

Figure 16:
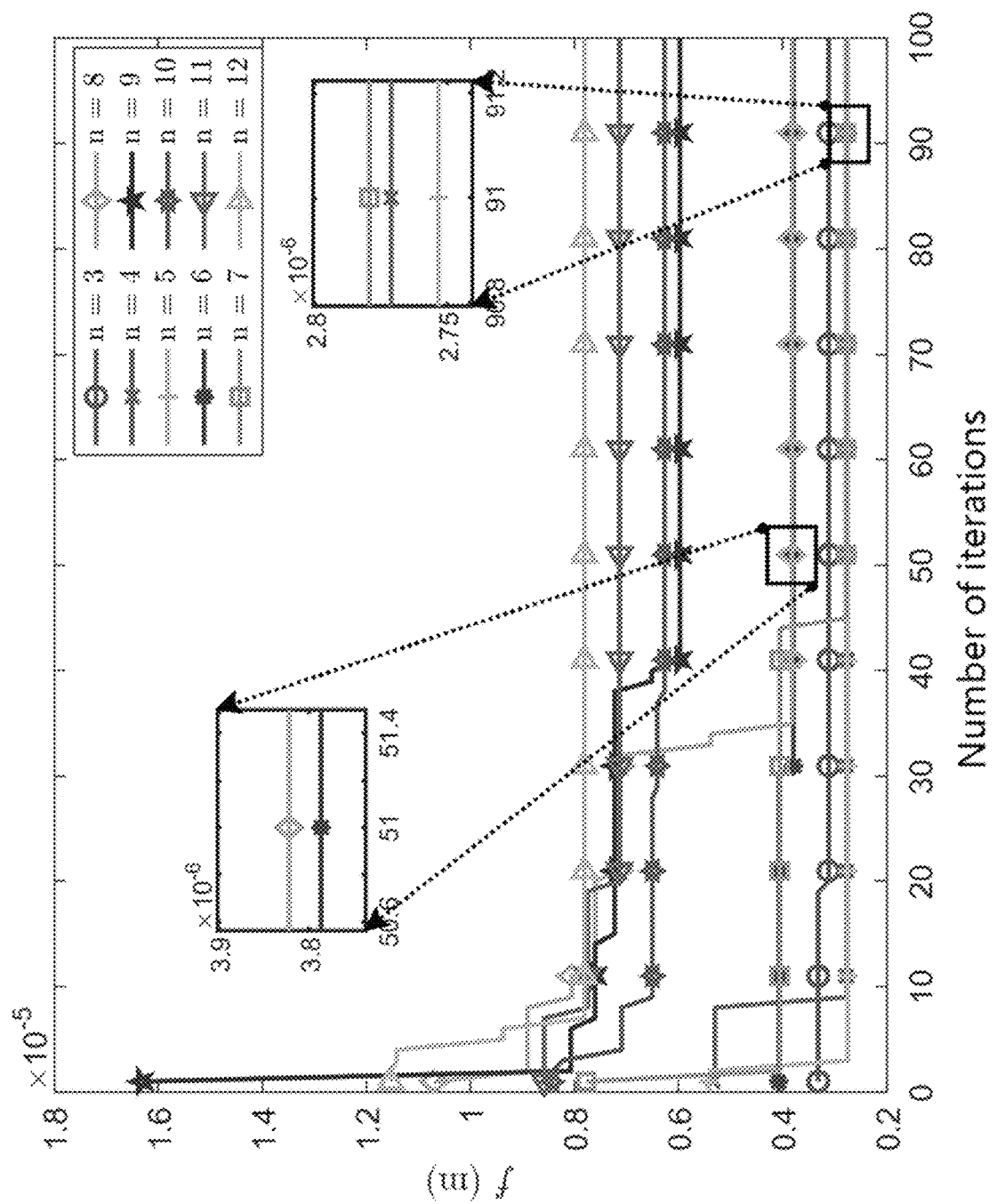
FIG. 16 is a curve of the fitness function in an iterative process of particle swarm optimization algorithm with different initialization parameters in a simulation experiment.

Finally, when the value of n is 3-12 in the simulation experiment, the curves of the fitness function of the particle swarm optimization algorithm in the iterative process are shown in FIG. 16. Analysis of the data in FIG. 16 shows that under different n values, it can basically converge to a stable value within 50 generations. Therefore, the optimal solution can be determined by the global optimal fitness value under different n values, which proves the effectiveness of the solution-seeking strategy.

Figure 17:
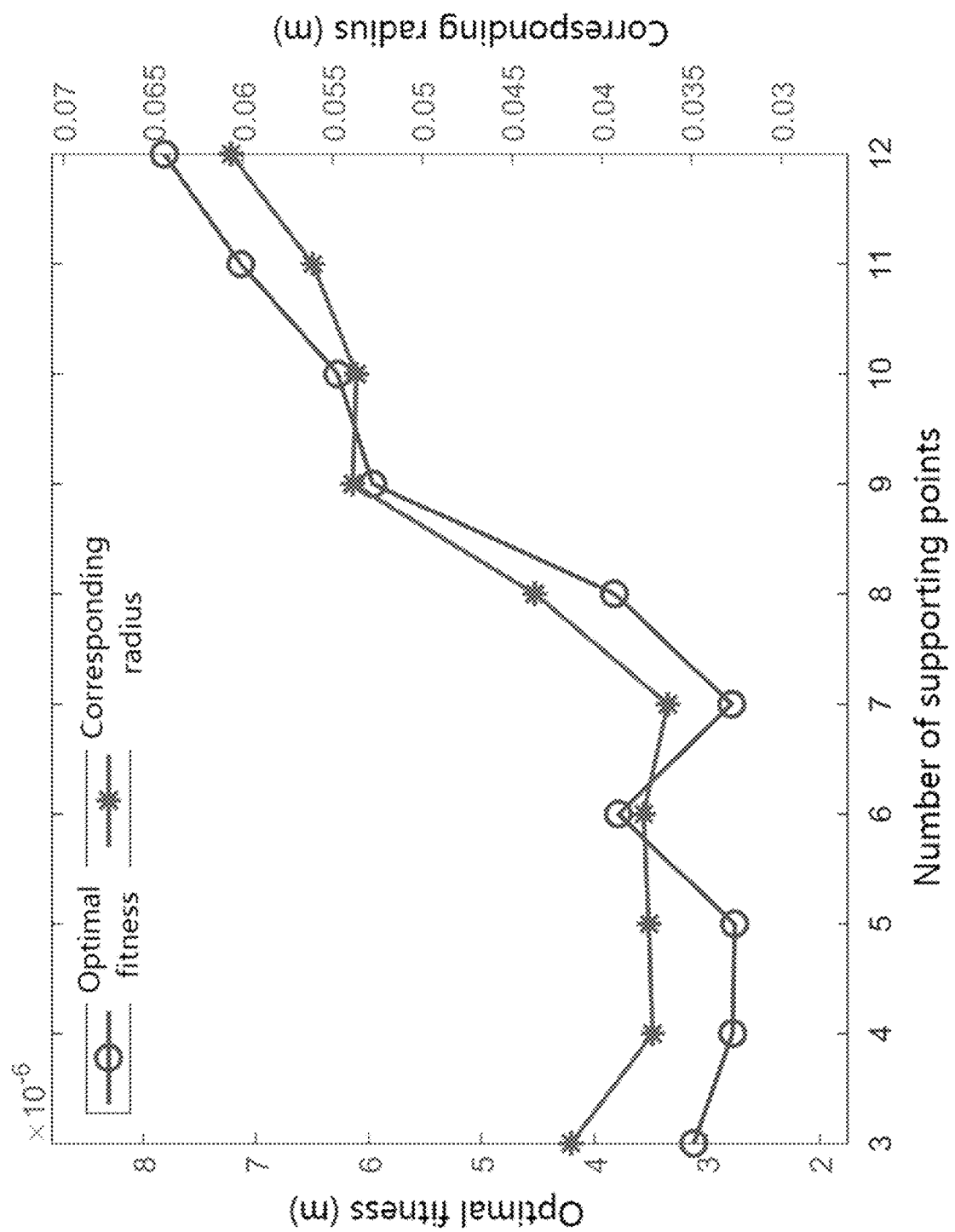
FIG. 17 is a distribution of the optimal fitness and the corresponding support radius under different quantities of support points in the simulation results.
Figure 18A:
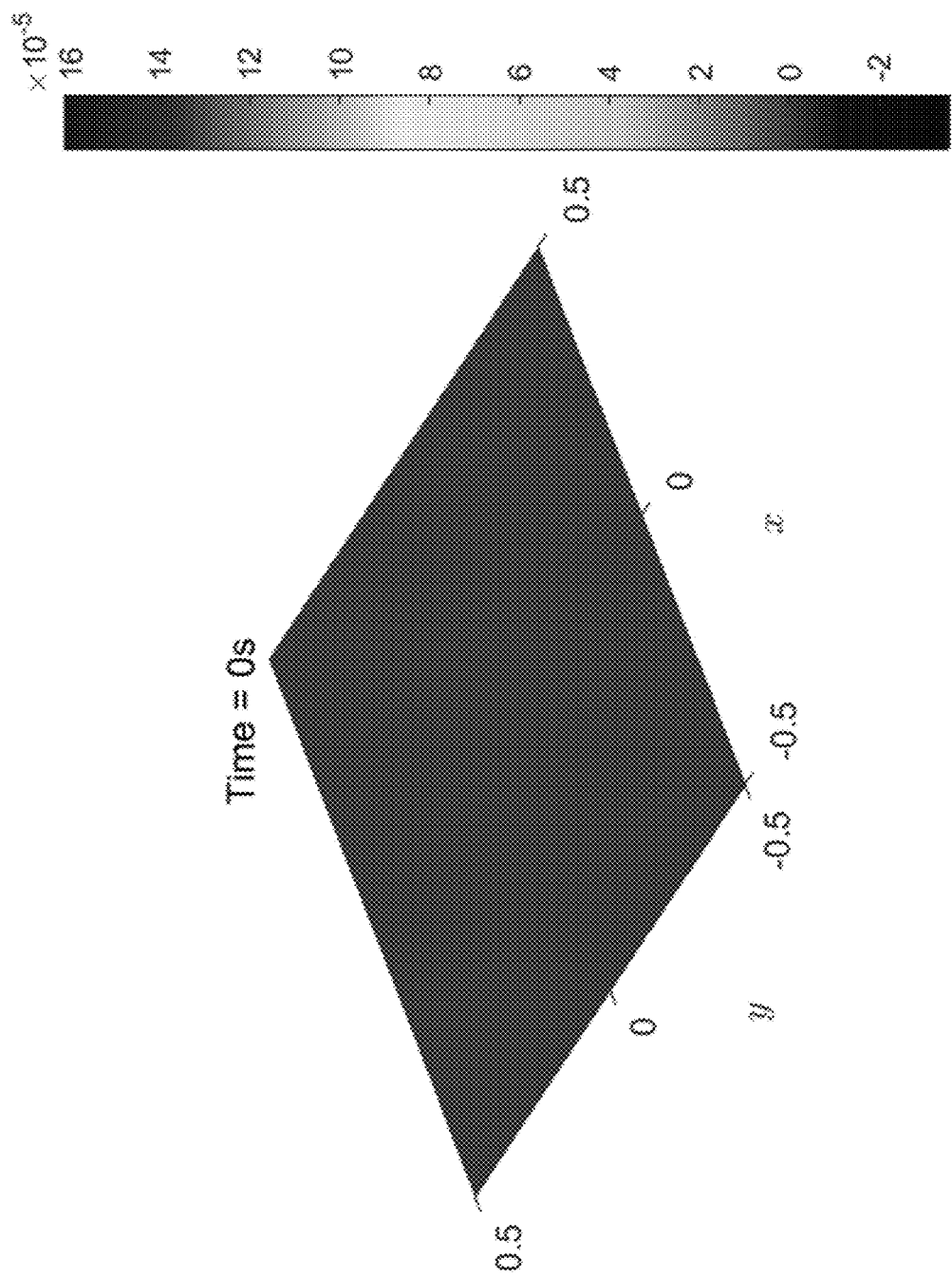
FIG. 18a is a vibration distribution of the workpiece in the unsupported milling process in the simulation experiment when time=0 s.
Figure 18B:
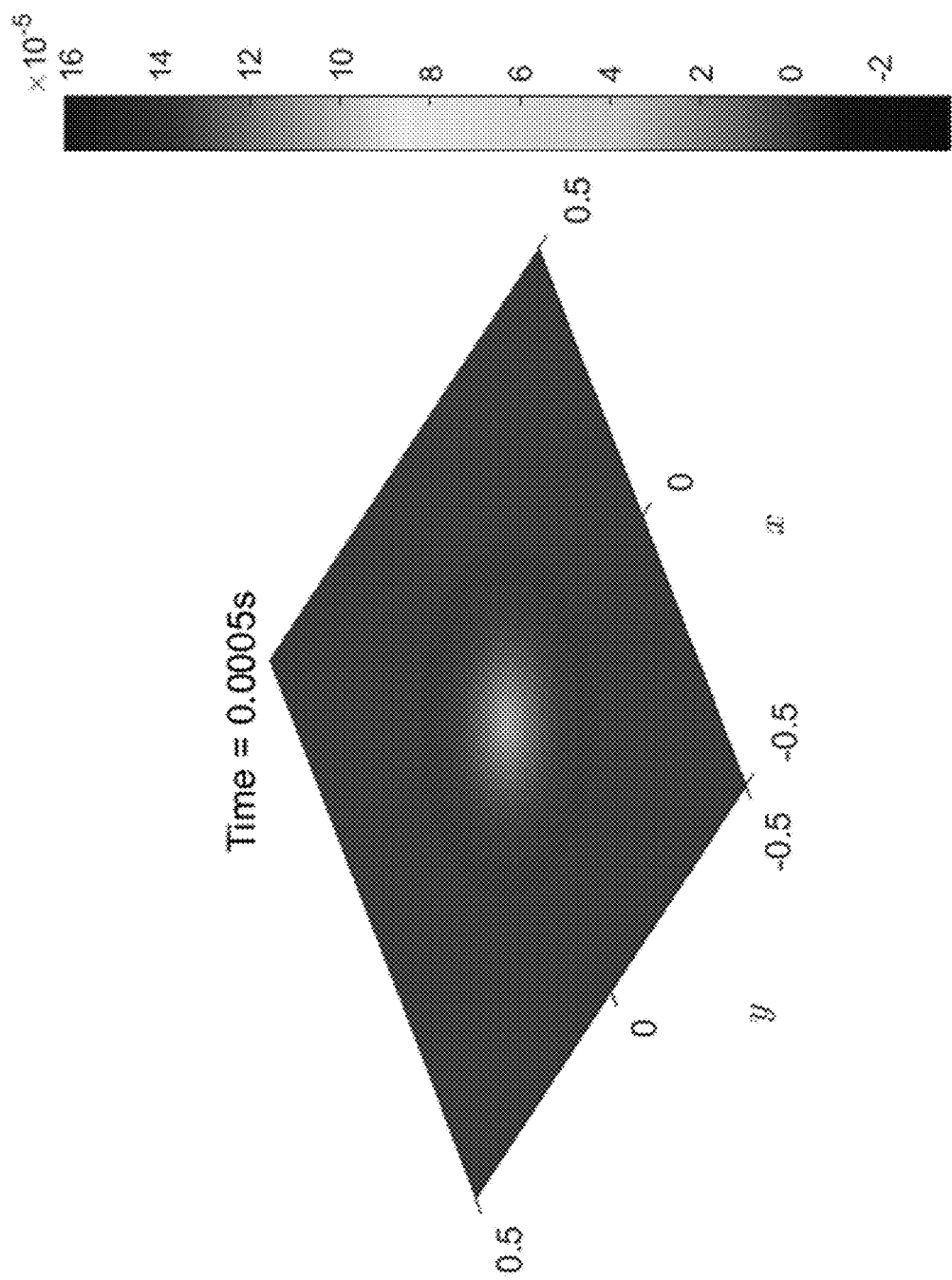
FIG. 18b is a vibration distribution of the workpiece in the unsupported milling process in the simulation experiment when time=0.0005 s.
Figure 18C:
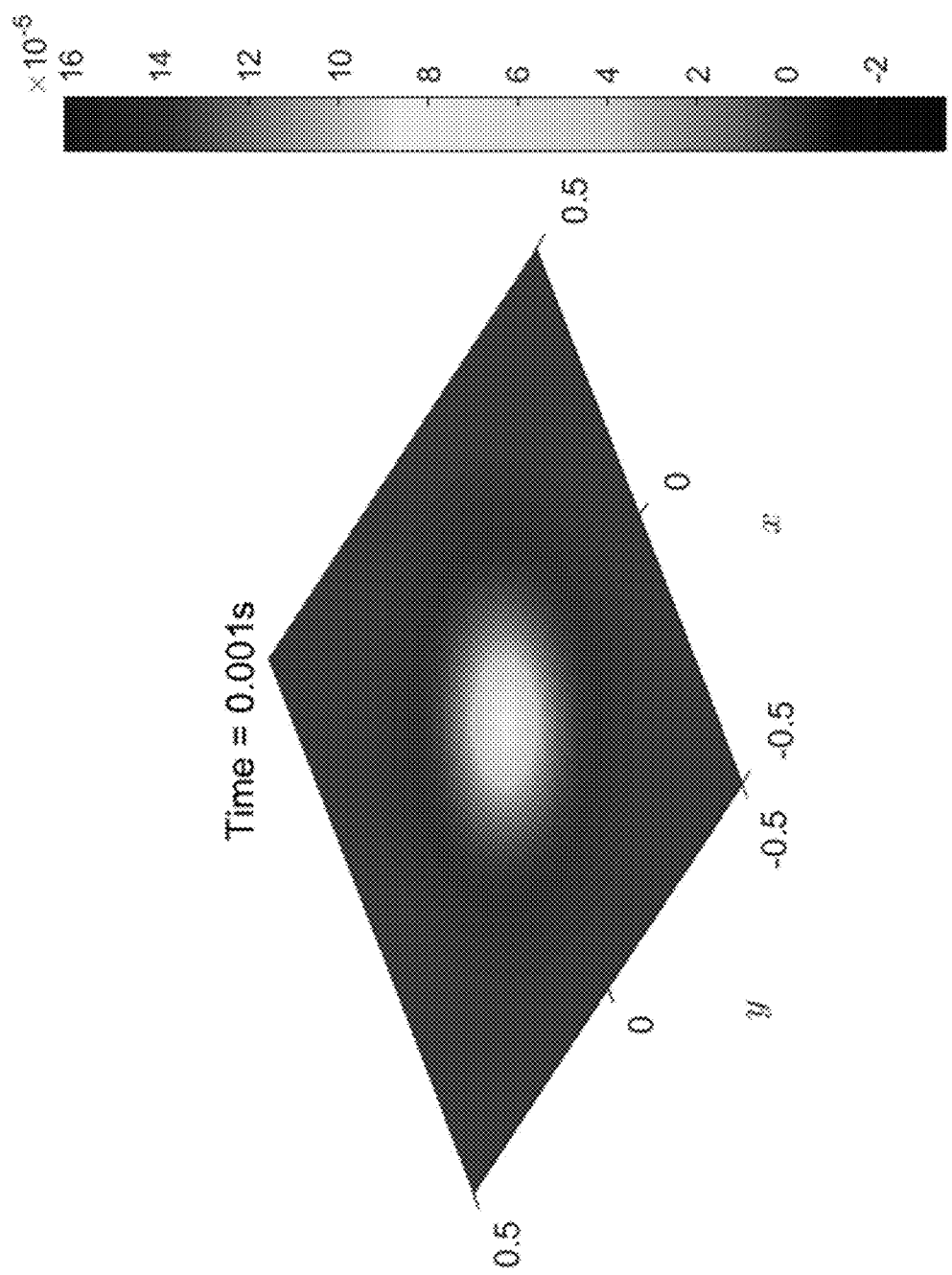
FIG. 18c is a vibration distribution of the workpiece in the unsupported milling process in the simulation experiment when time=0.001 s.
Figure 18D:
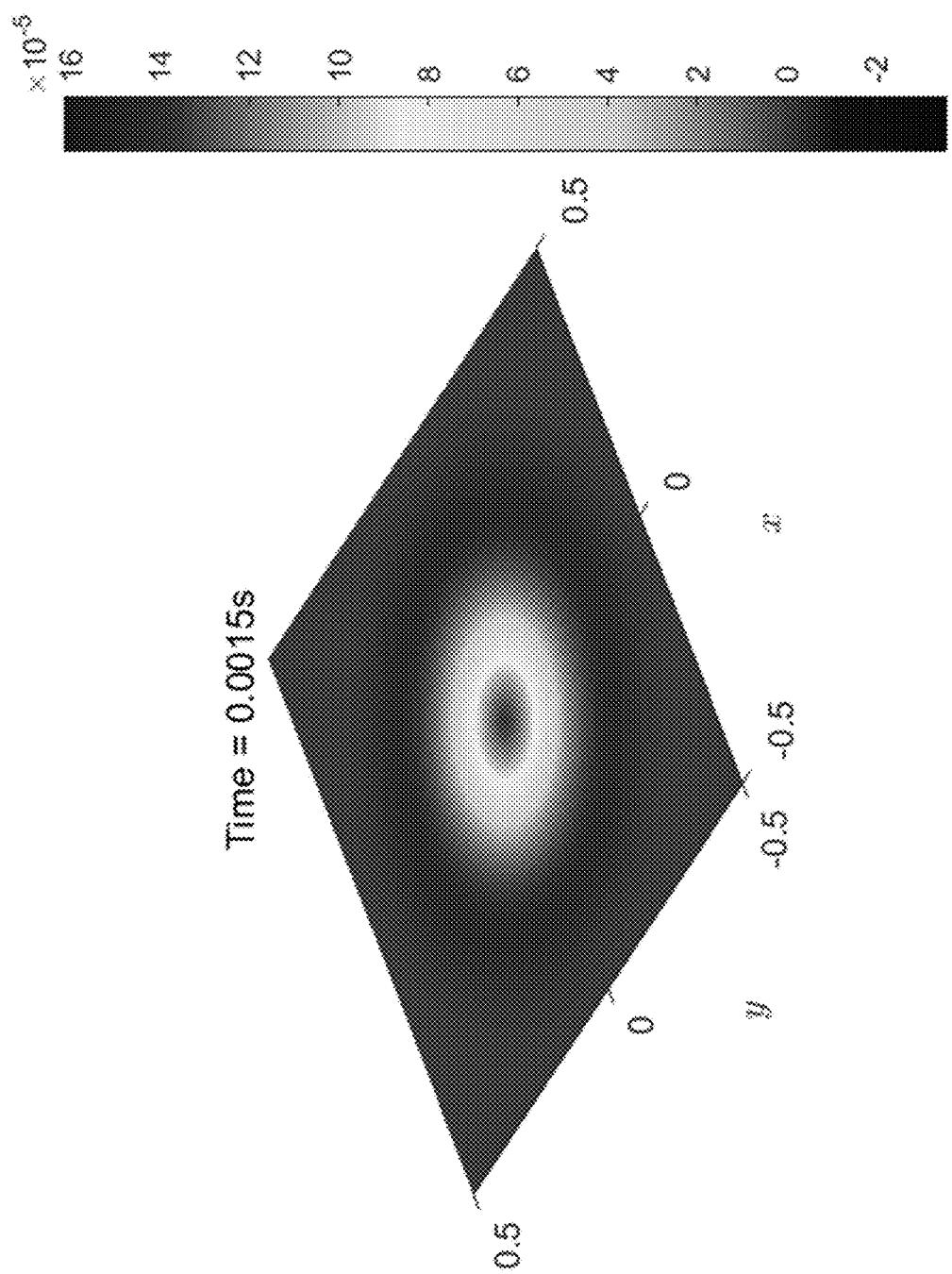
FIG. 18d is a vibration distribution of the workpiece in the unsupported milling process in the simulation experiment when time=0.0015 s.
Figure 18E:
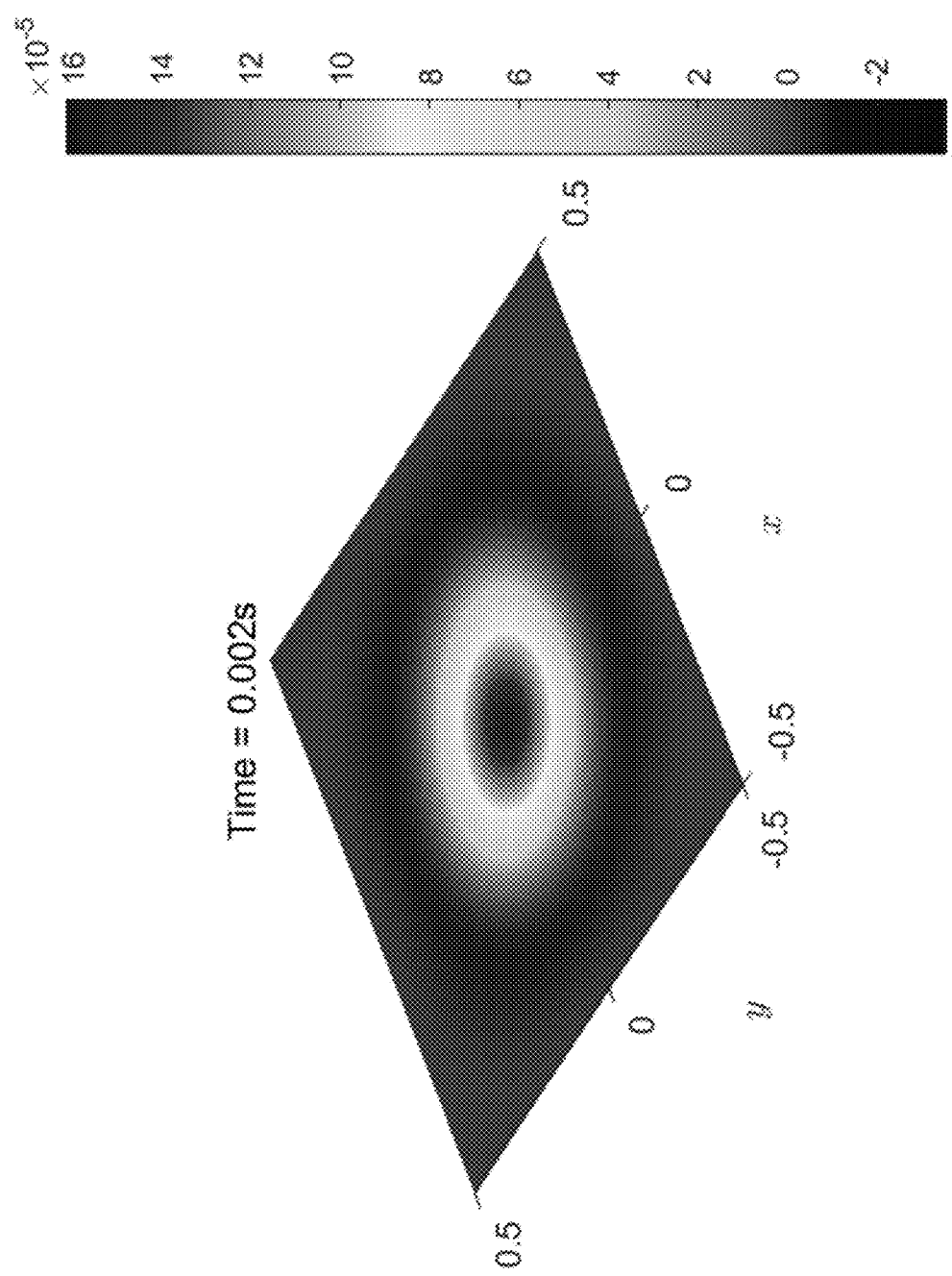
FIG. 18e is a vibration distribution of the workpiece in the unsupported milling process in the simulation experiment when time=0.002 s.
Figure 18F:
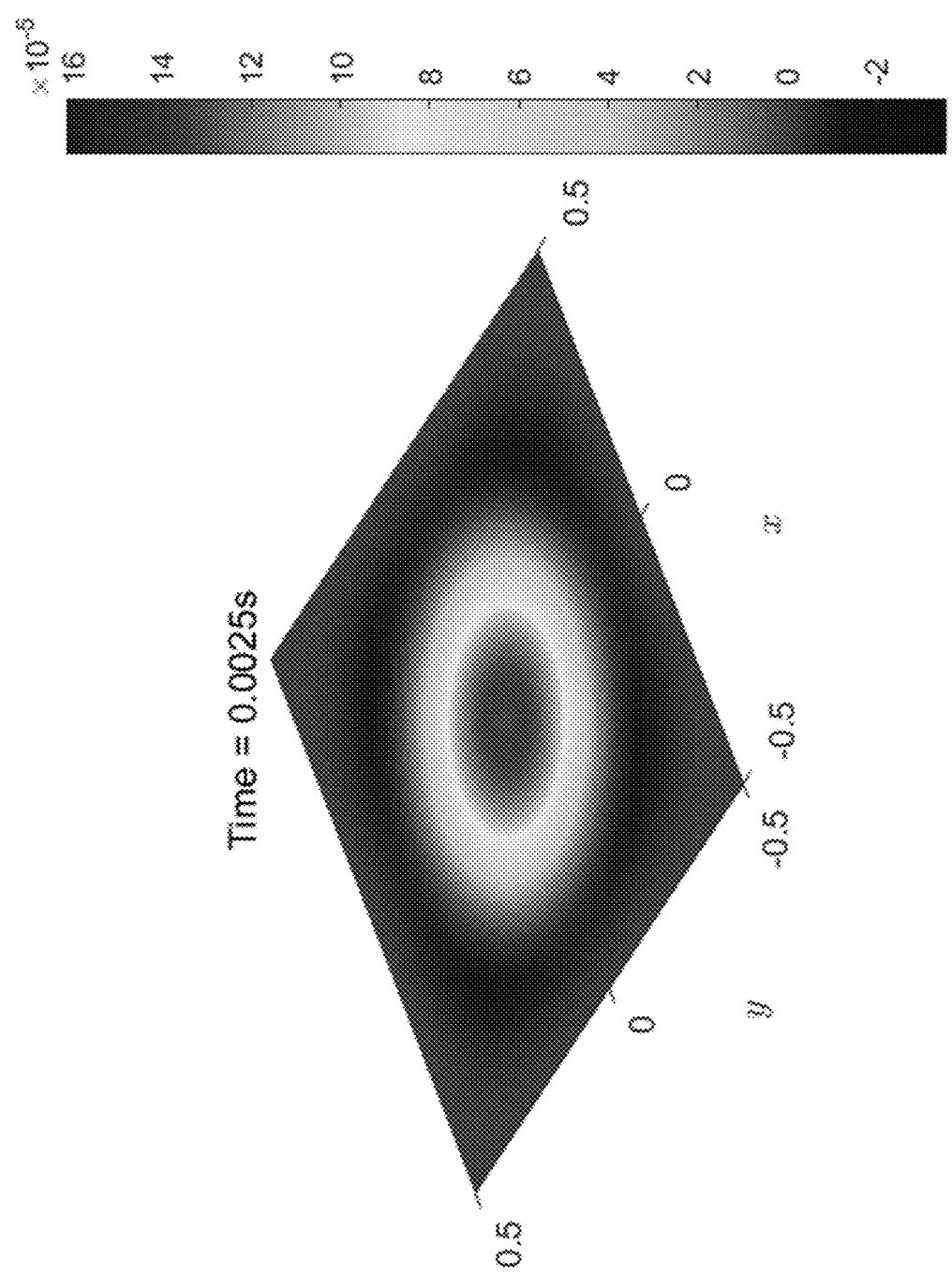
FIG. 18f is a vibration distribution of the workpiece in the unsupported milling process in the simulation experiment when time=0.0025 s.
Figure 18G:
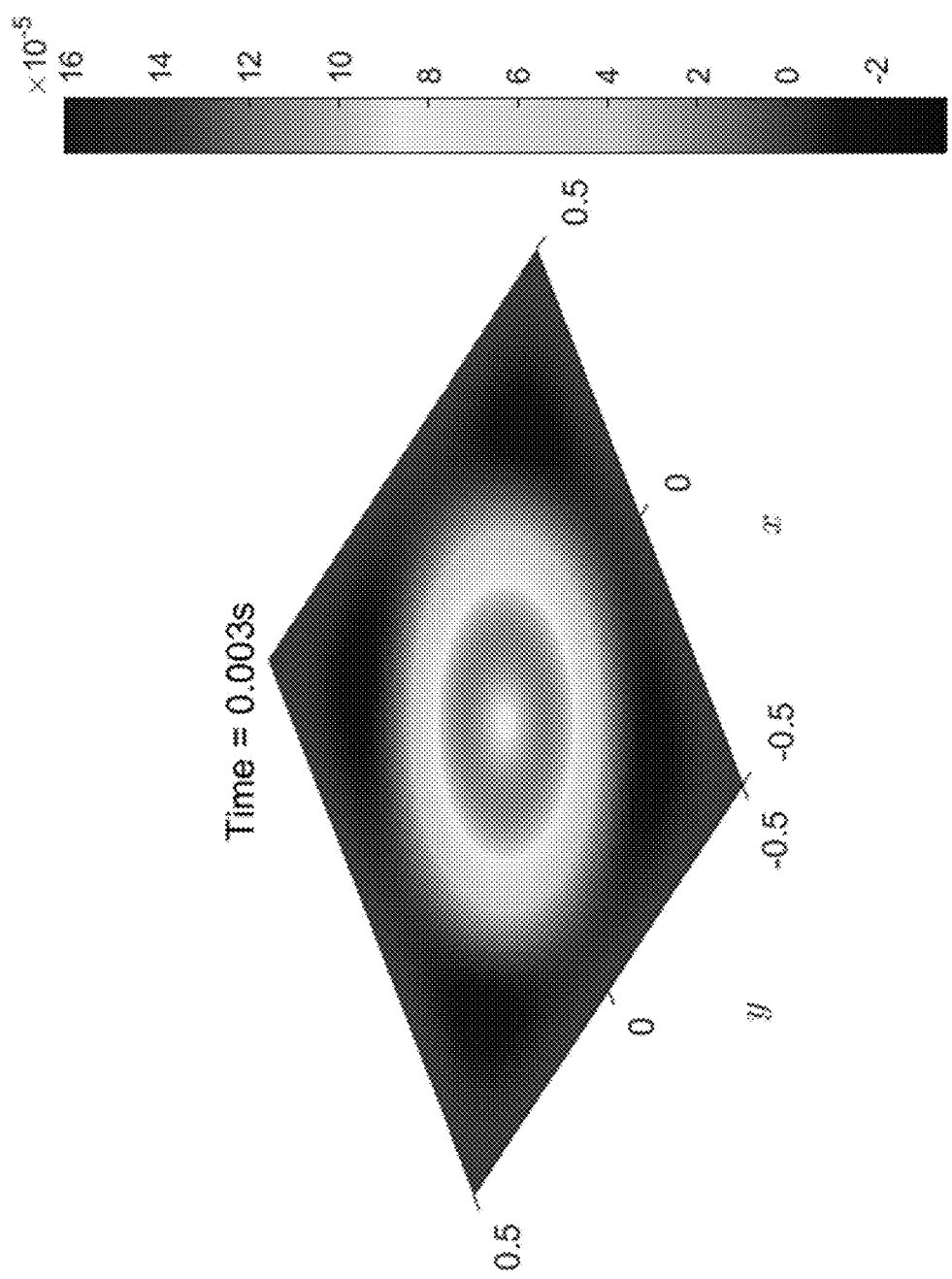
FIG. 18g is a vibration distribution of the workpiece in the unsupported milling process in the simulation experiment when time=0.003 s.
Figure 18H:
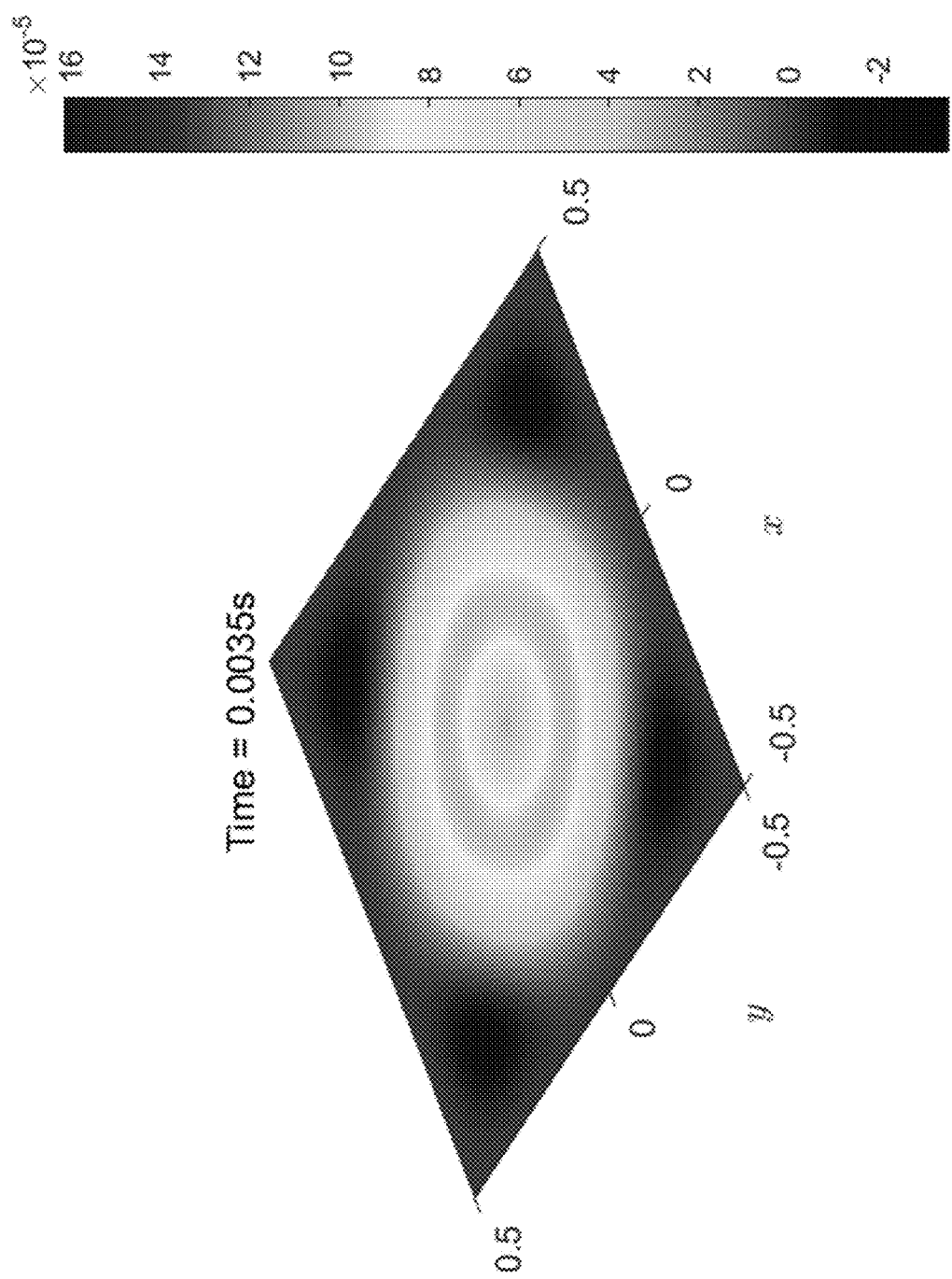
FIG. 18h is a vibration distribution of the workpiece in the unsupported milling process in the simulation experiment when time=0.0035 s.
Figure 18I:
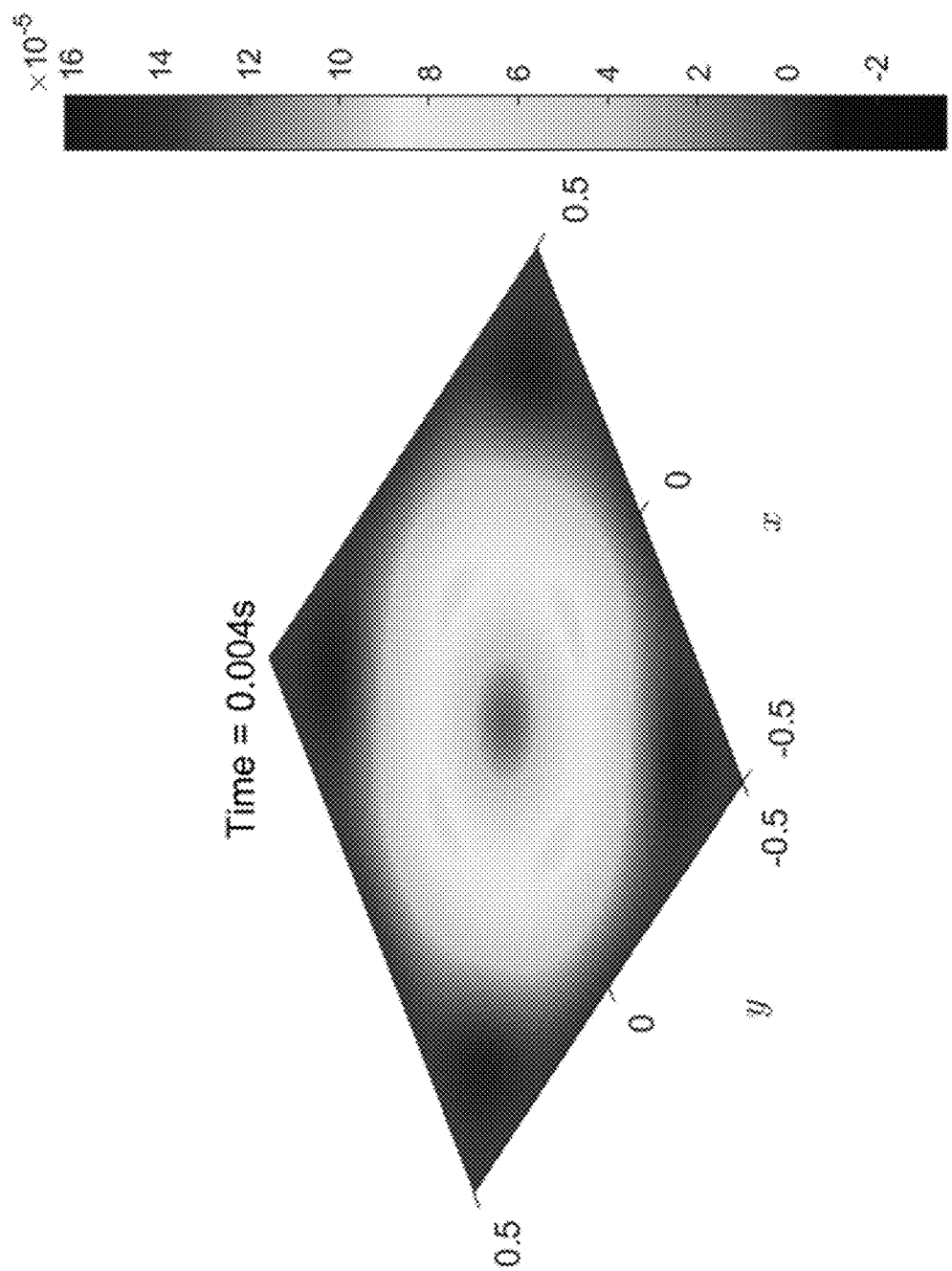
FIG. 18i is a vibration distribution of the workpiece in the unsupported milling process in the simulation experiment when time=0.004 s.
Figure 18J:
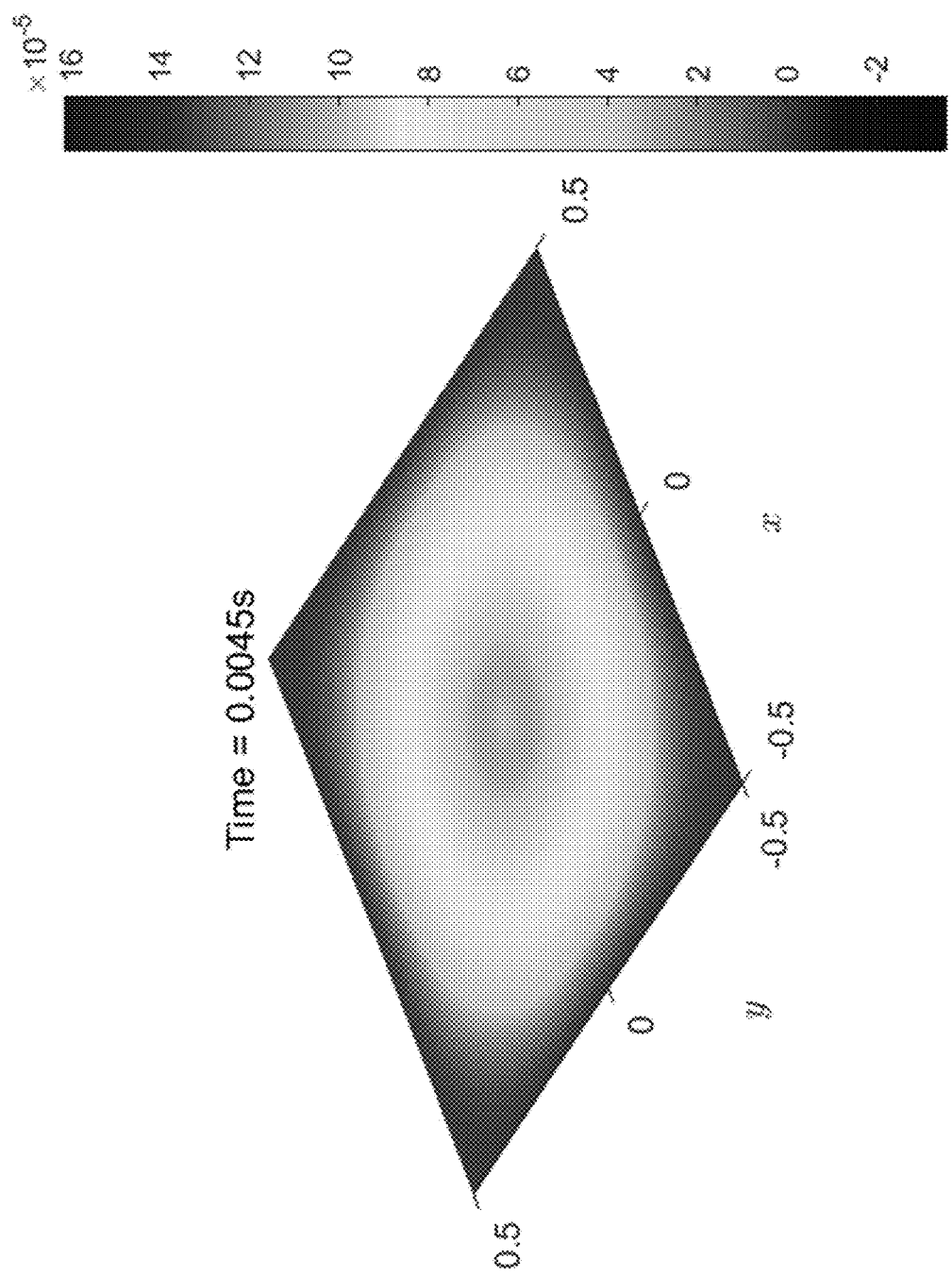
FIG. 18j is a vibration distribution of the workpiece in the unsupported milling process in the simulation experiment when time=0.0045 s.
Figure 18K:
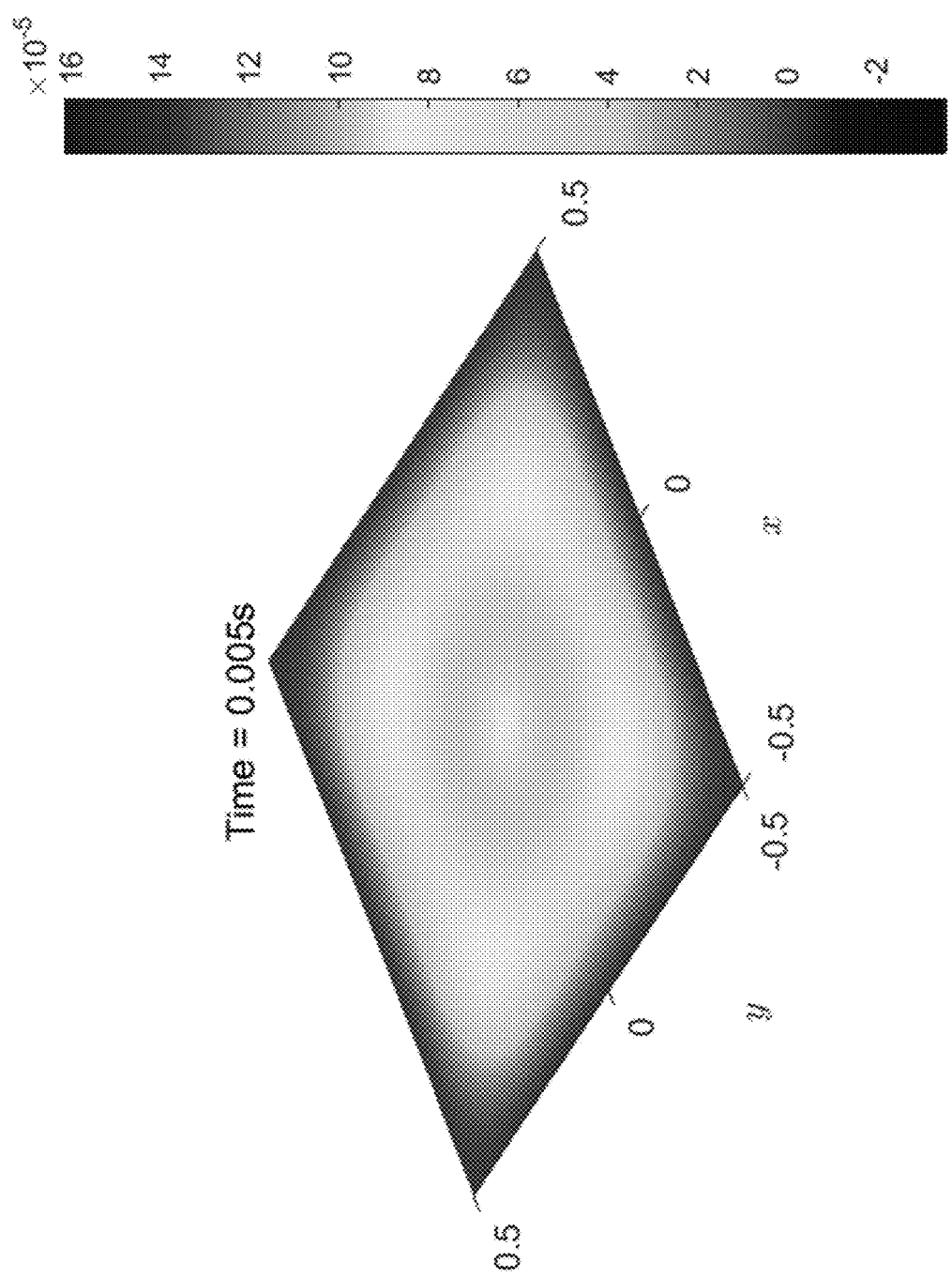
FIG. 18k is a vibration distribution of the workpiece in the unsupported milling process in the simulation experiment when time=0.005 s.
Figure 18I:
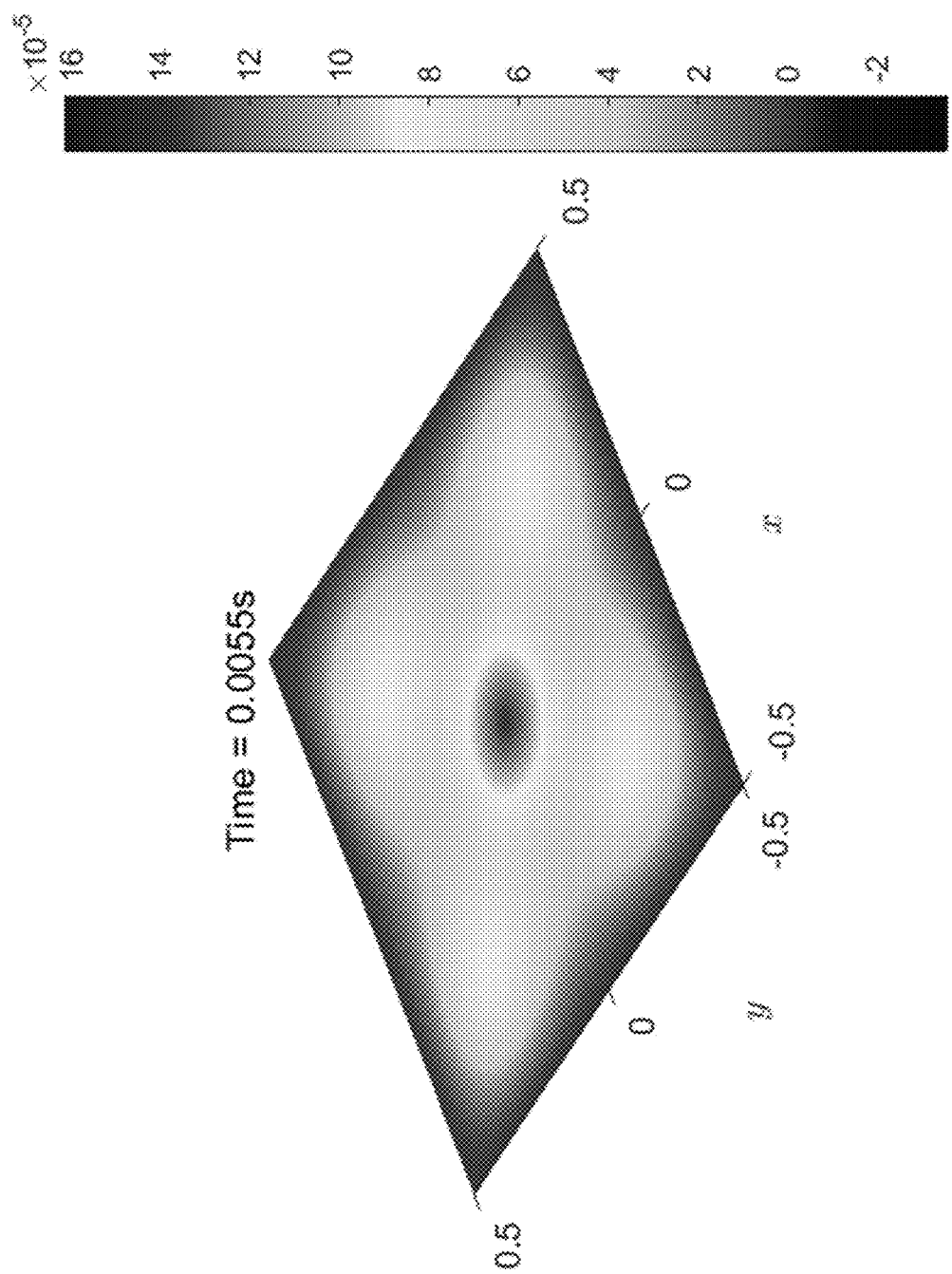
Figure 18M:
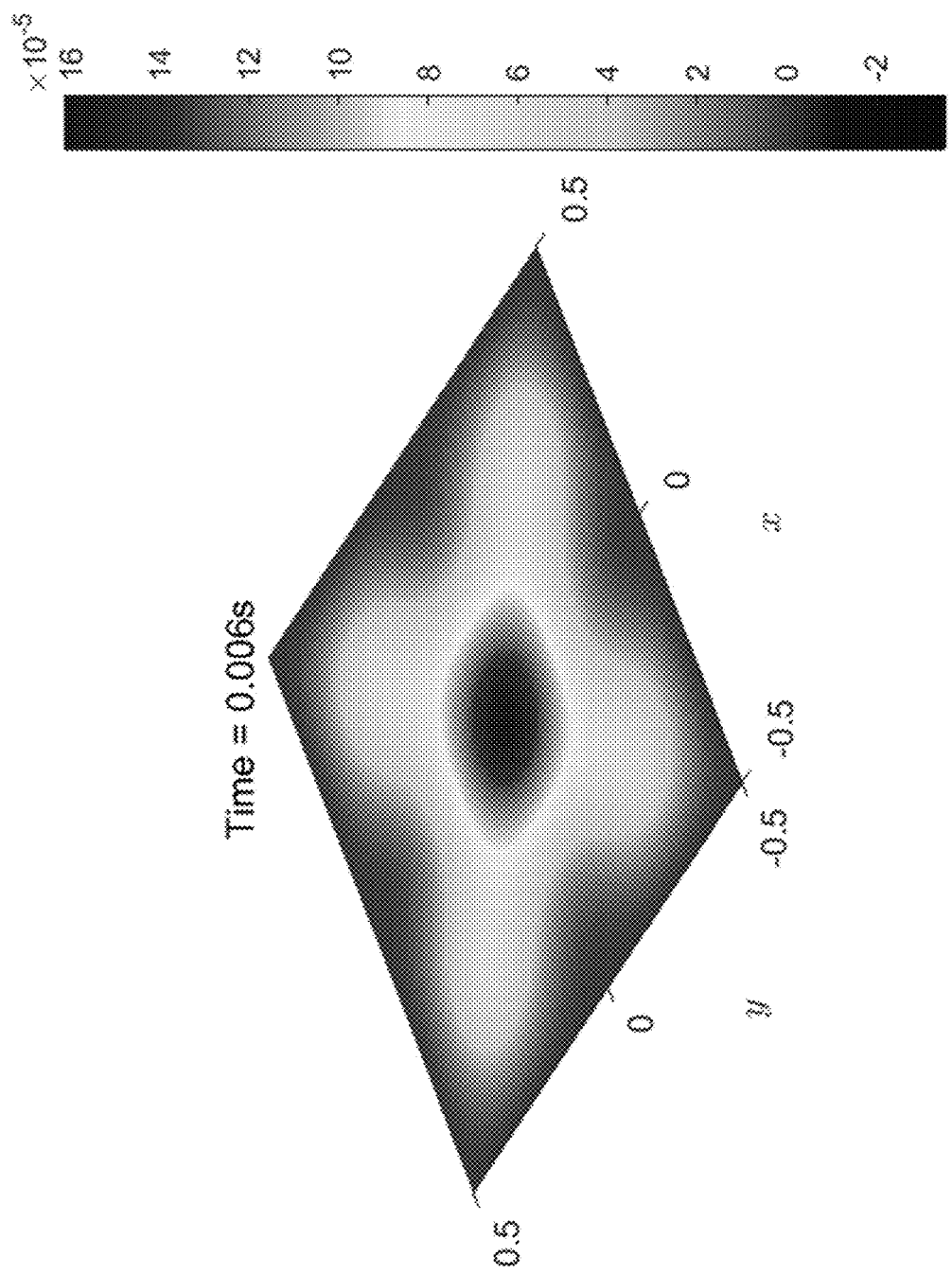
FIG. 18m is a vibration distribution of the workpiece in the unsupported milling process in the simulation experiment when time=0.006 s.
Figure 18N:
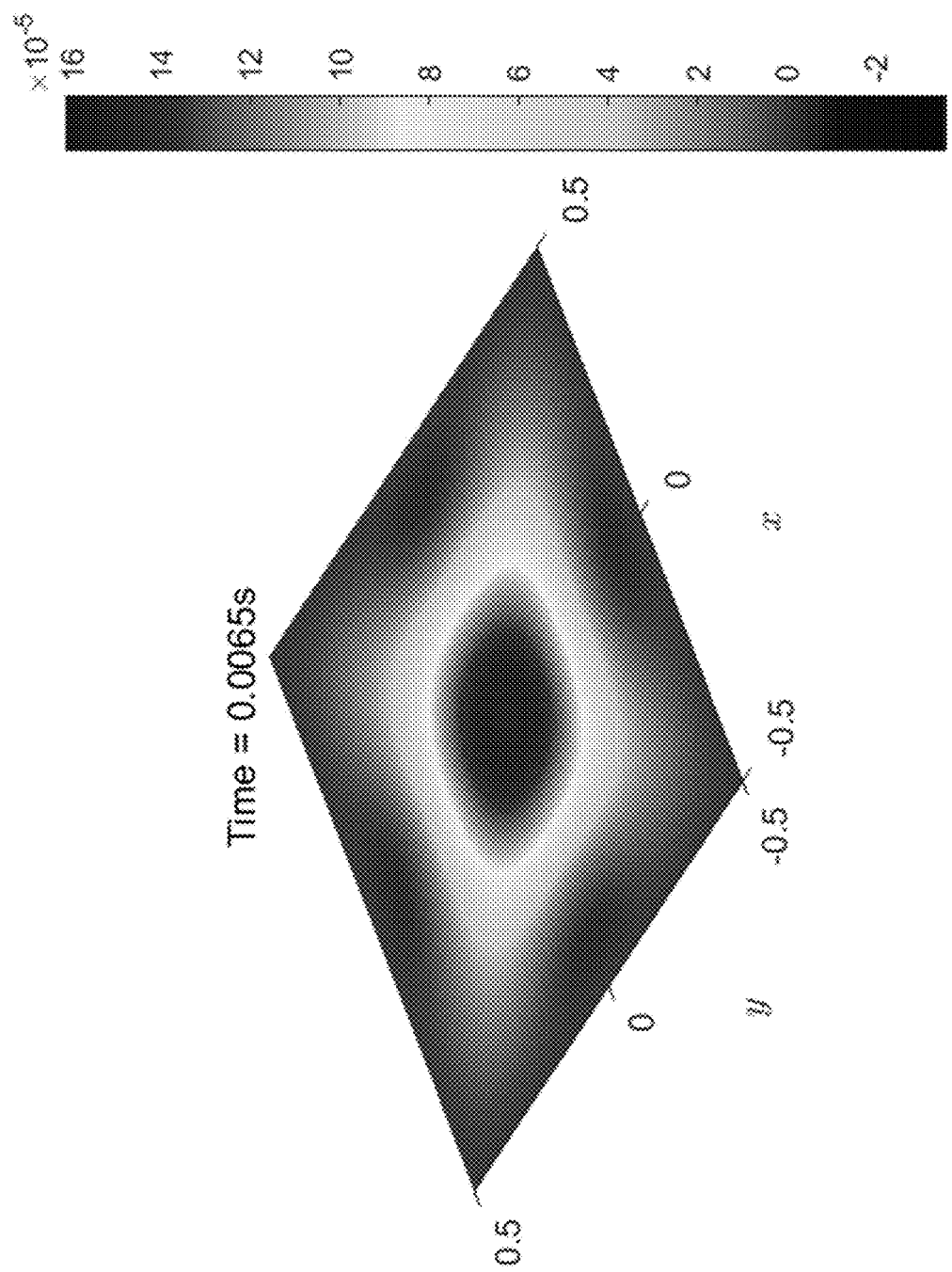
FIG. 18n is a vibration distribution of the workpiece in the unsupported milling process in the simulation experiment when time=0.0065 s.
Figure 18O:
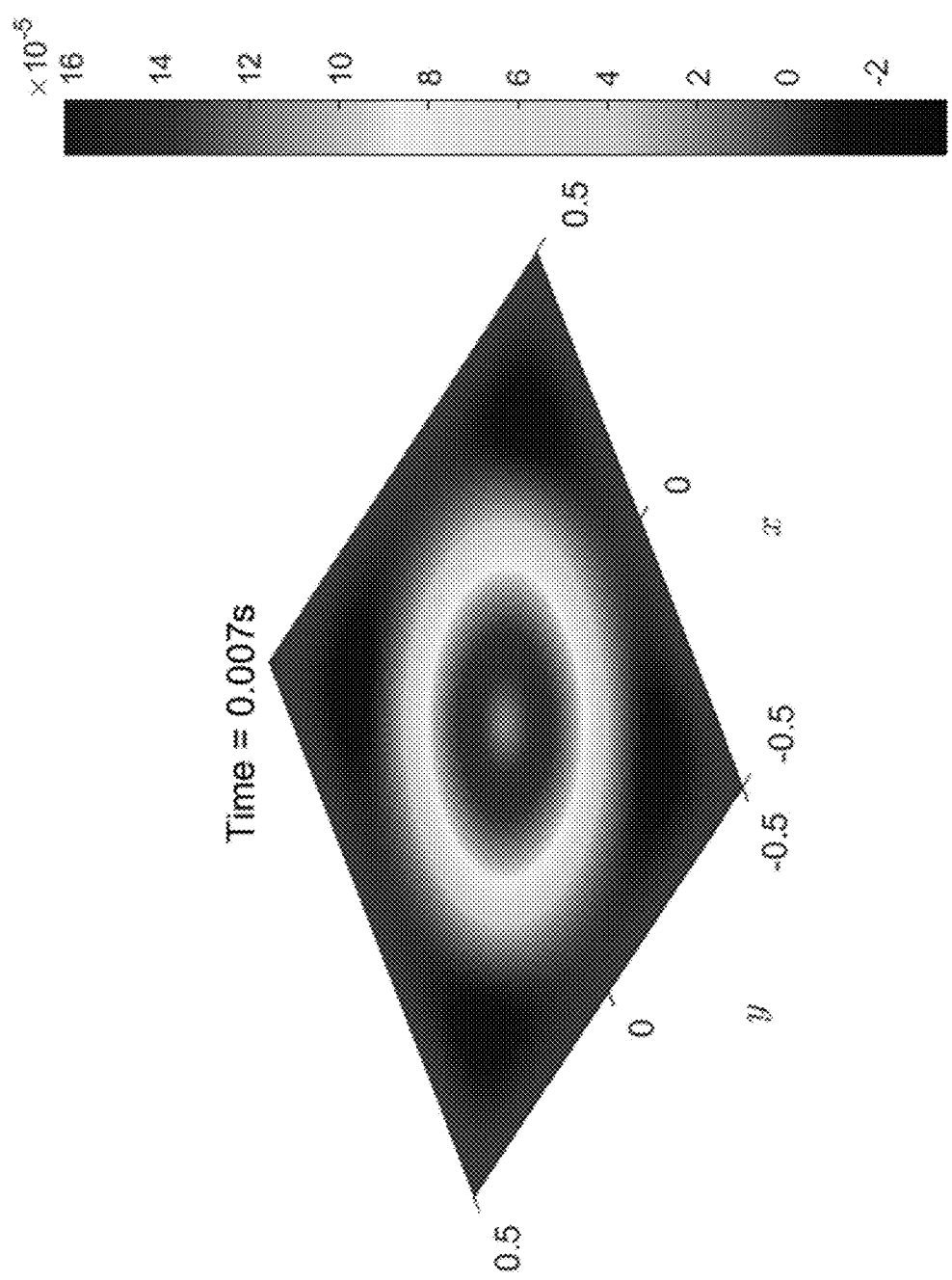
FIG. 18o is a vibration distribution of the workpiece in the unsupported milling process in the simulation experiment when time=0.007 s.
Figure 18P:
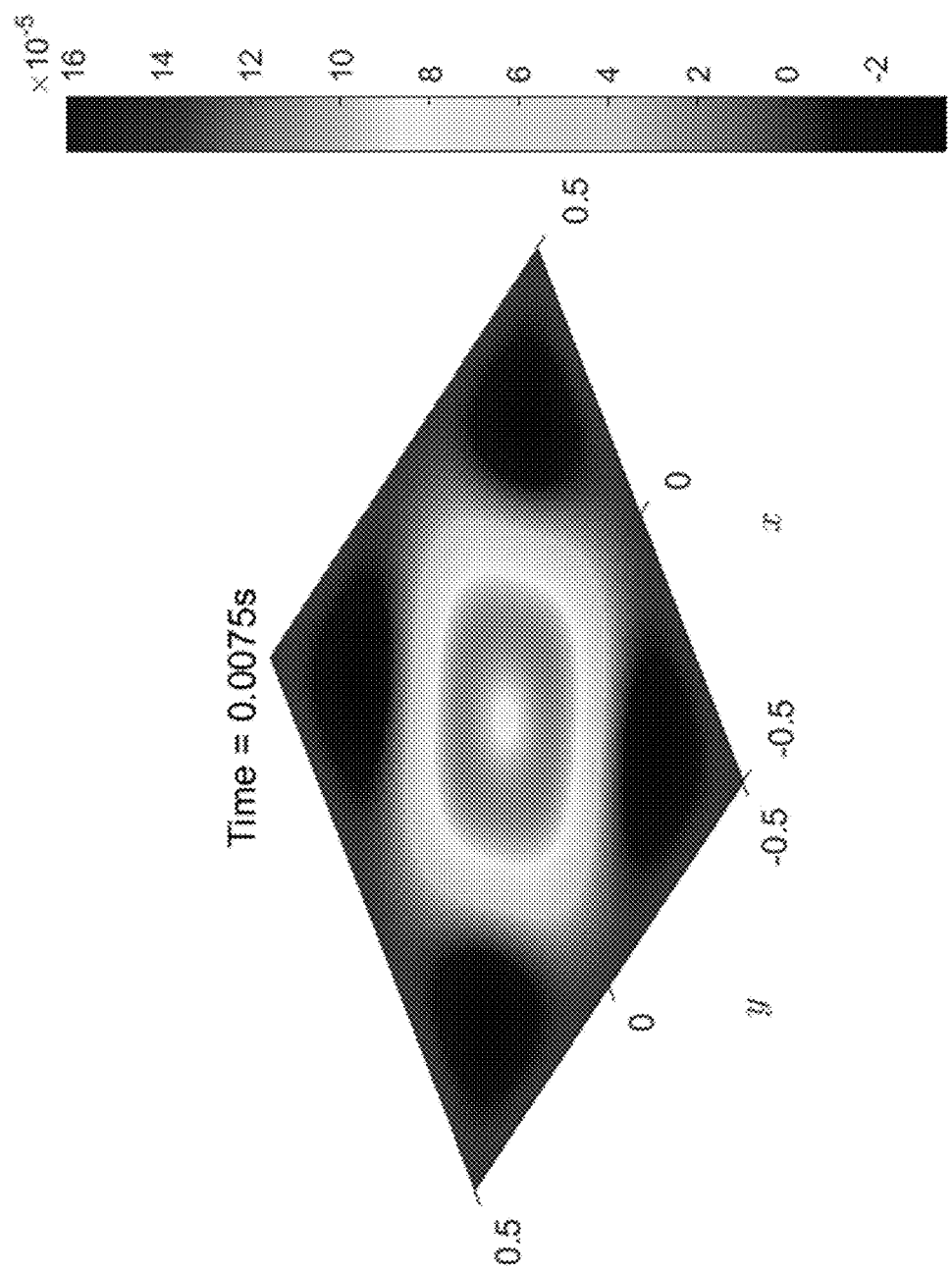
FIG. 18p is a vibration distribution of the workpiece in the unsupported milling process in the simulation experiment when time=0.0075 s.
Figure 19A:
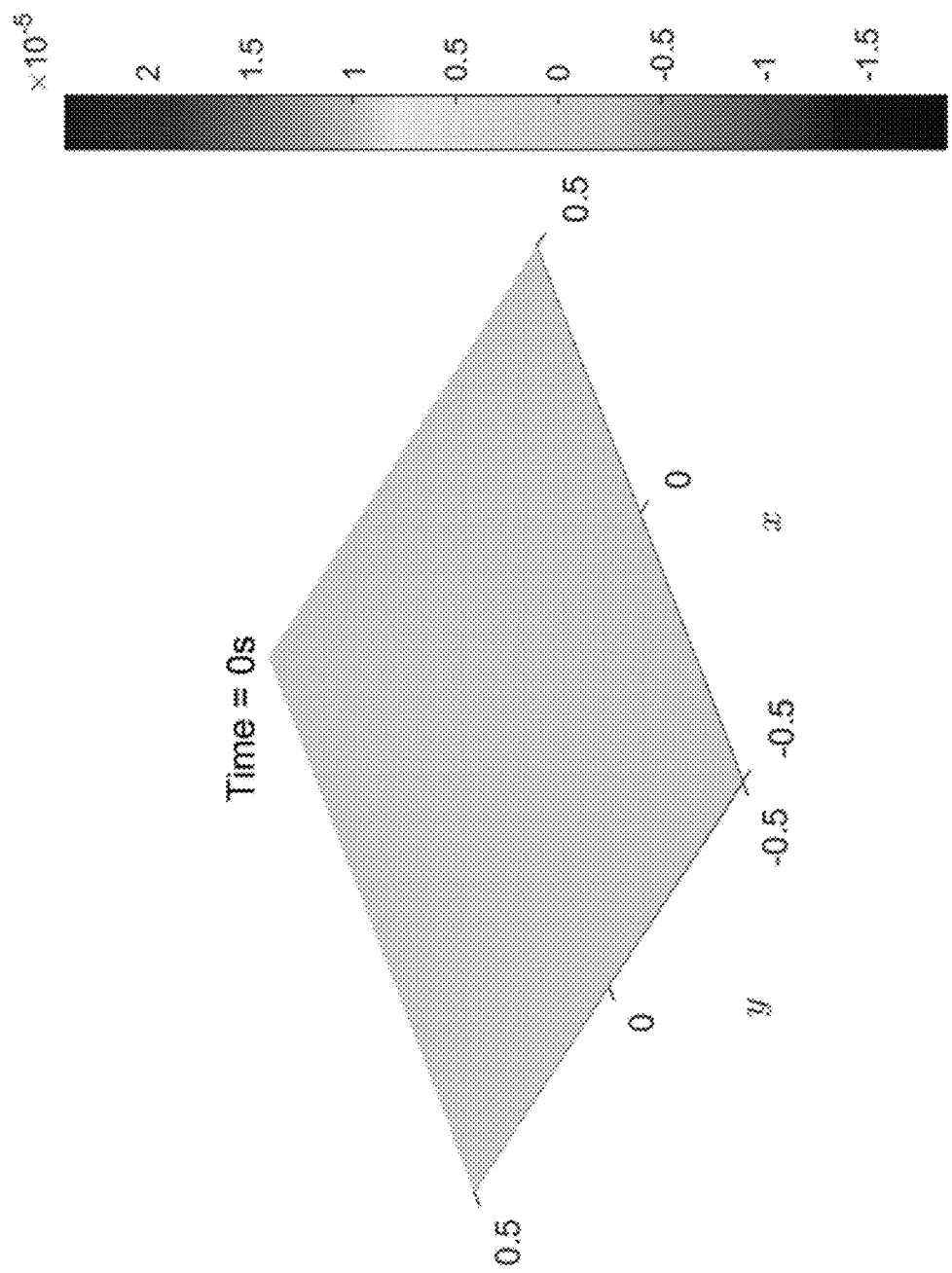
FIG. 19a is a vibration distribution of the workpiece in mirror milling of the follow-up support in the simulation experiment when time=0 s.
Figure 19B:
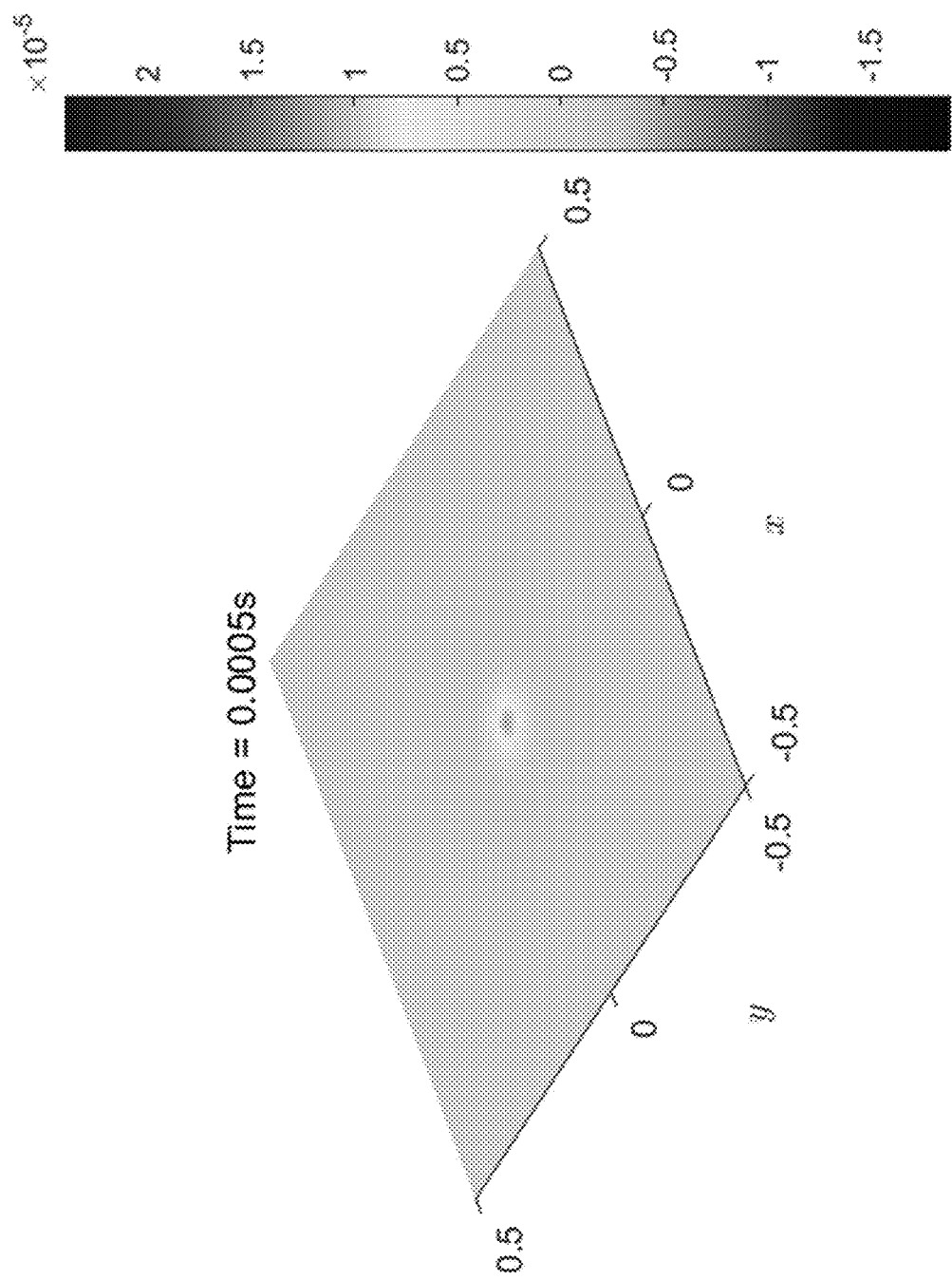
FIG. 19b is a vibration distribution of the workpiece in mirror milling of the follow-up support in the simulation experiment when time=0.0005 s.
Figure 19C:
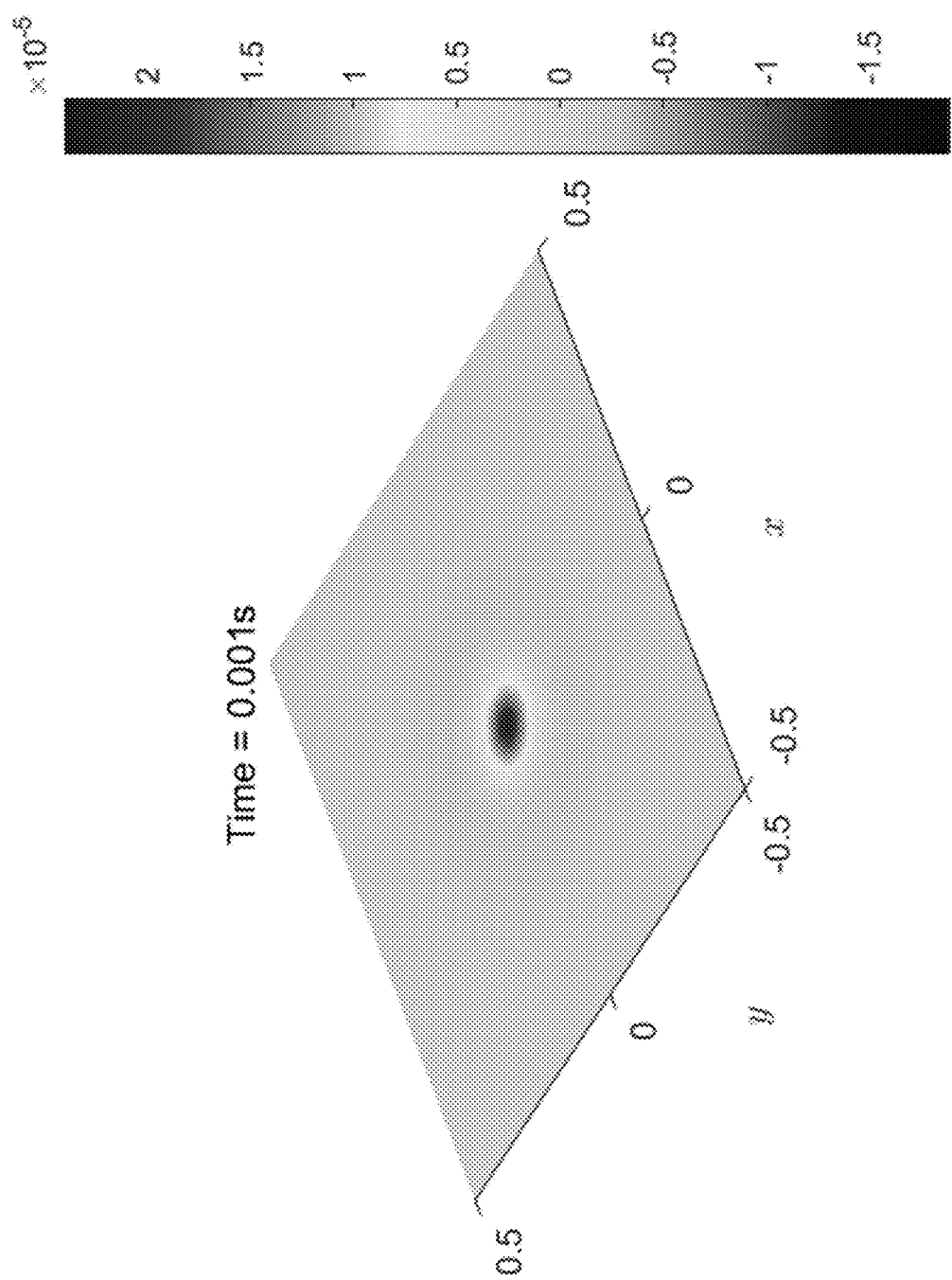
FIG. 19c is a vibration distribution of the workpiece in mirror milling of the follow-up support in the simulation experiment when time=0.001 s.
Figure 19D:
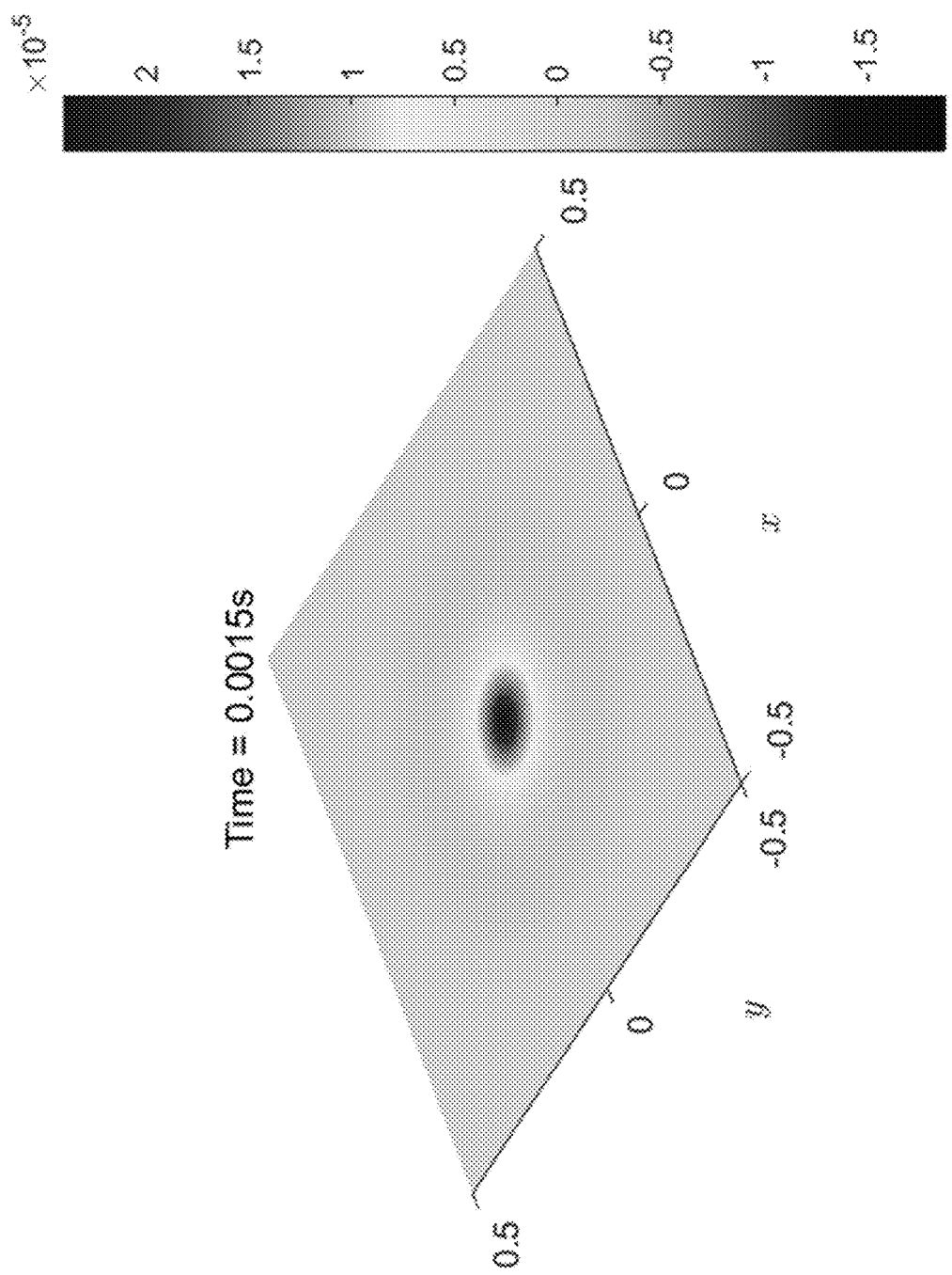
FIG. 19d is a vibration distribution of the workpiece in mirror milling of the follow-up support in the simulation experiment when time=0.0015 s.
Figure 19E:
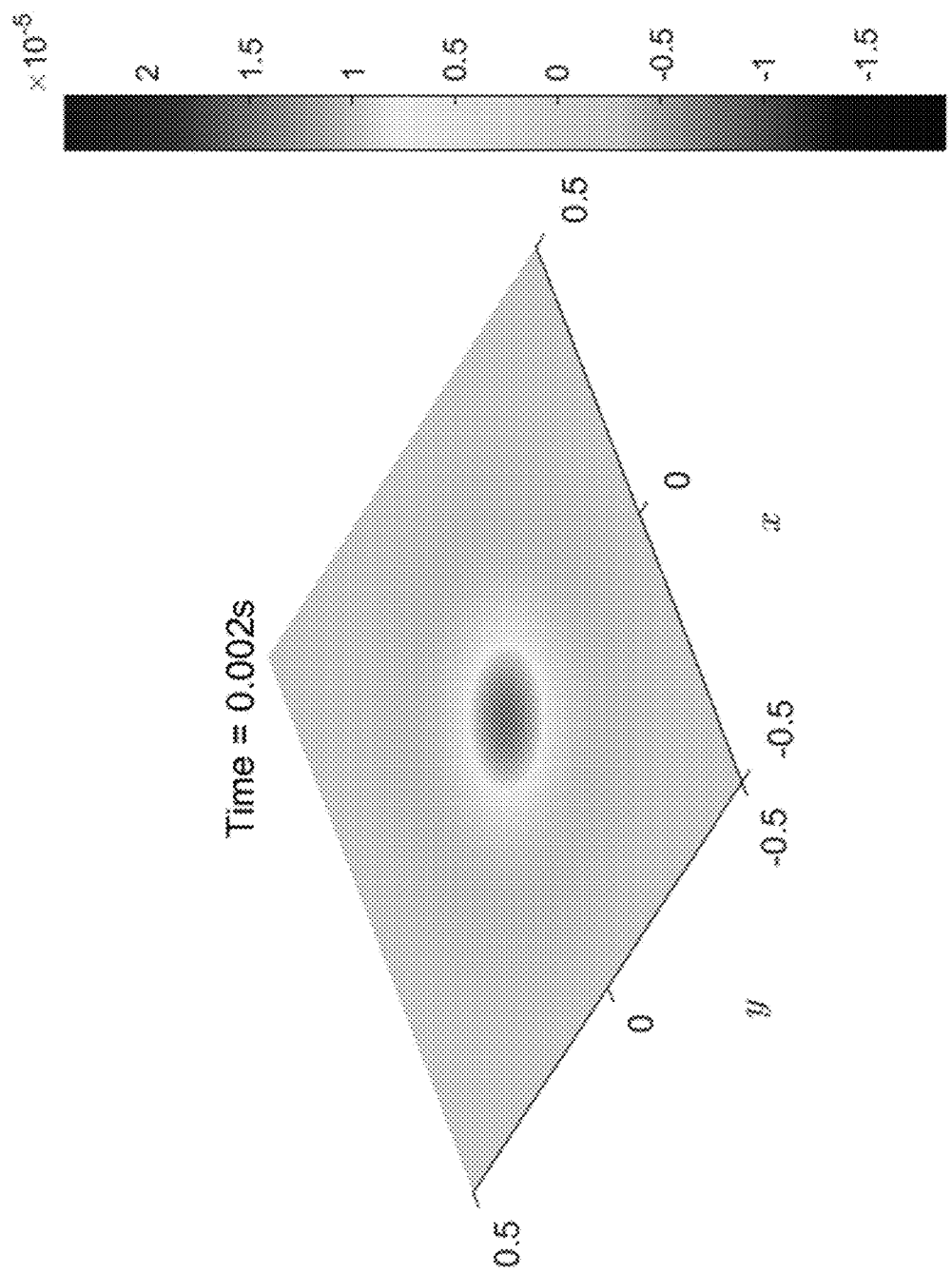
FIG. 19e is a vibration distribution of the workpiece in mirror milling of the follow-up support in the simulation experiment when time=0.002 s.
Figure 19F:
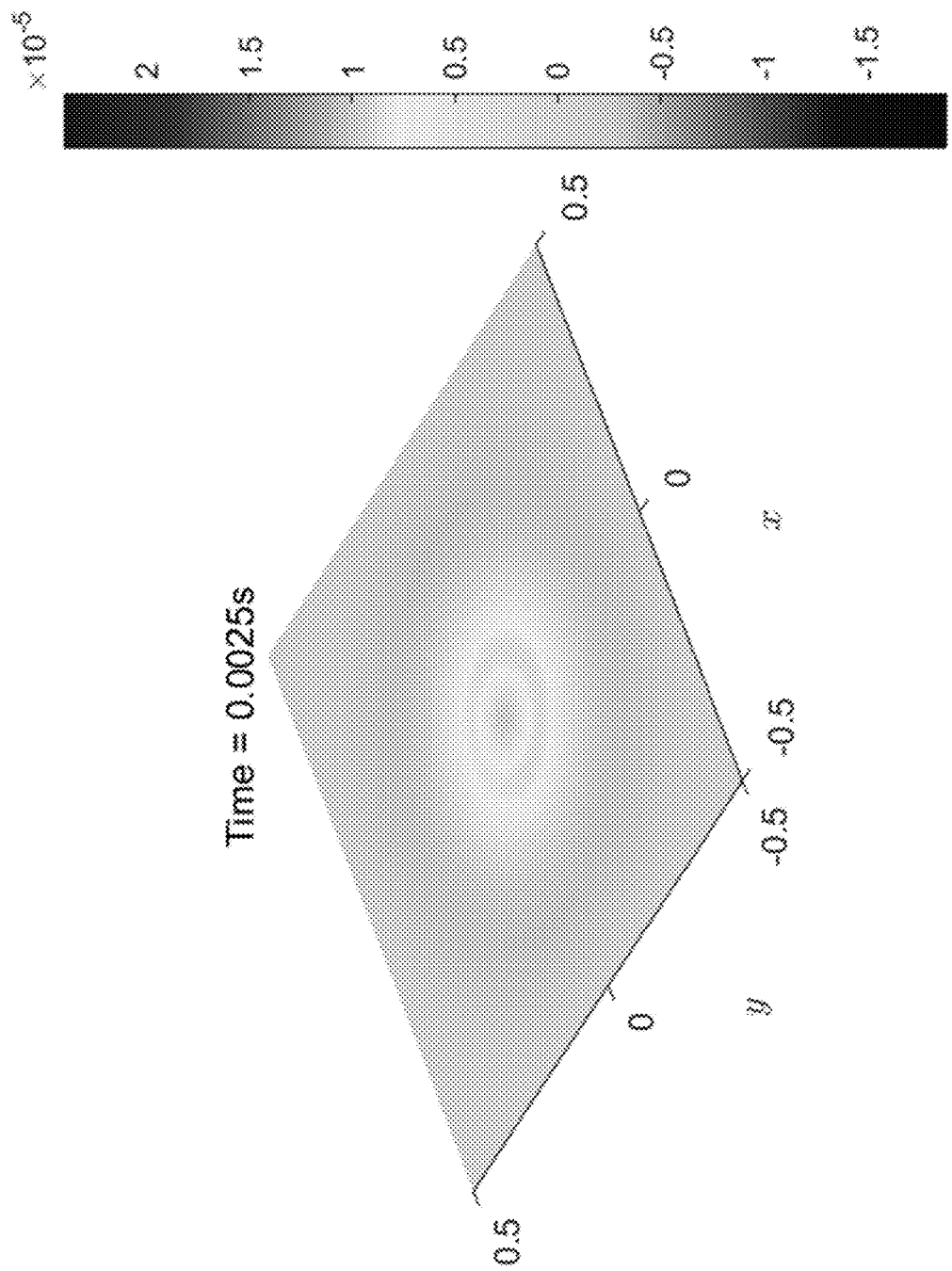
FIG. 19f is a vibration distribution of the workpiece in mirror milling of the follow-up support in the simulation experiment when time=0.0025 s.
Figure 19G:
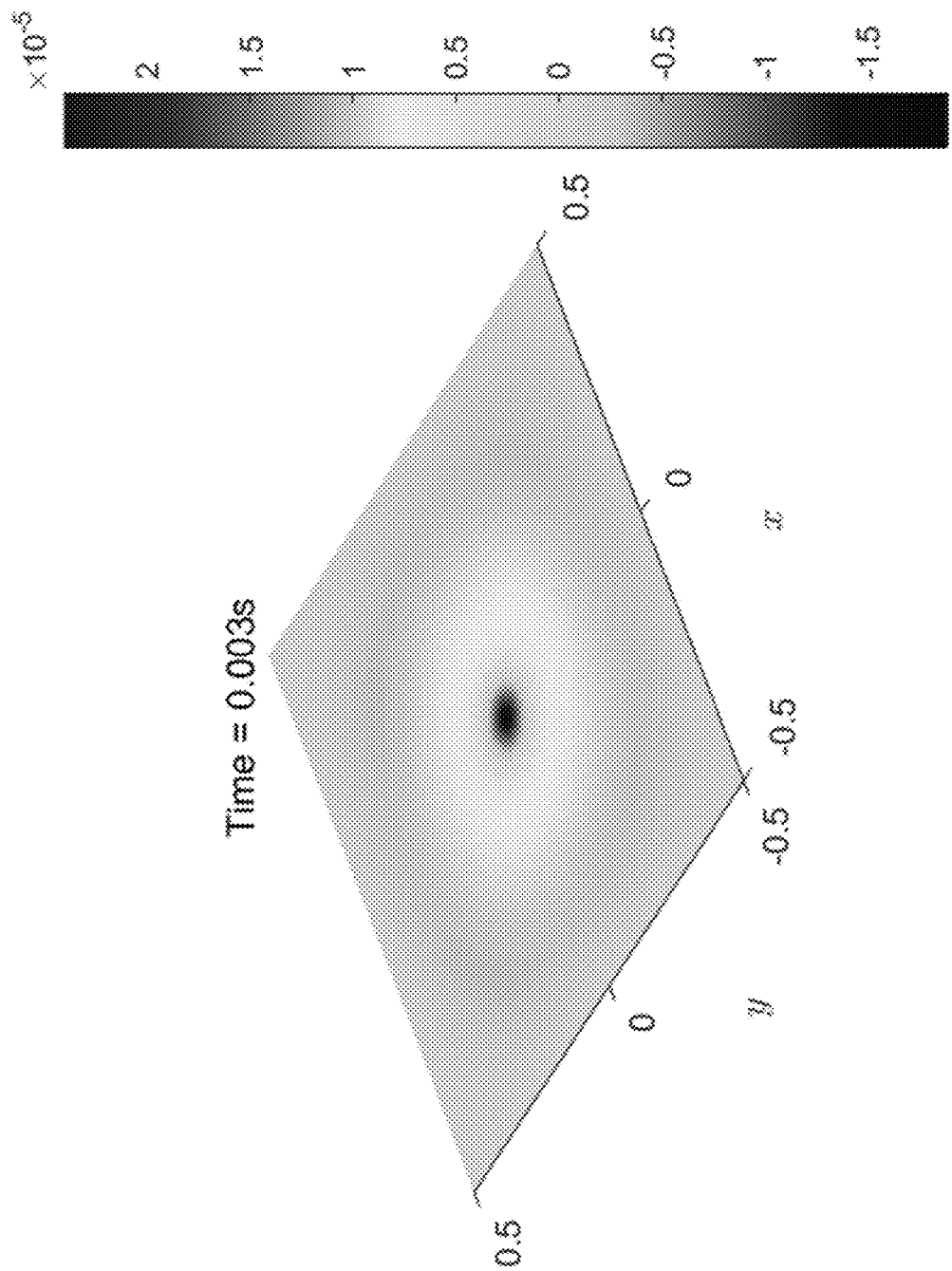
FIG. 19g is a vibration distribution of the workpiece in mirror milling of the follow-up support in the simulation experiment when time=0.003 s.
Figure 19H:
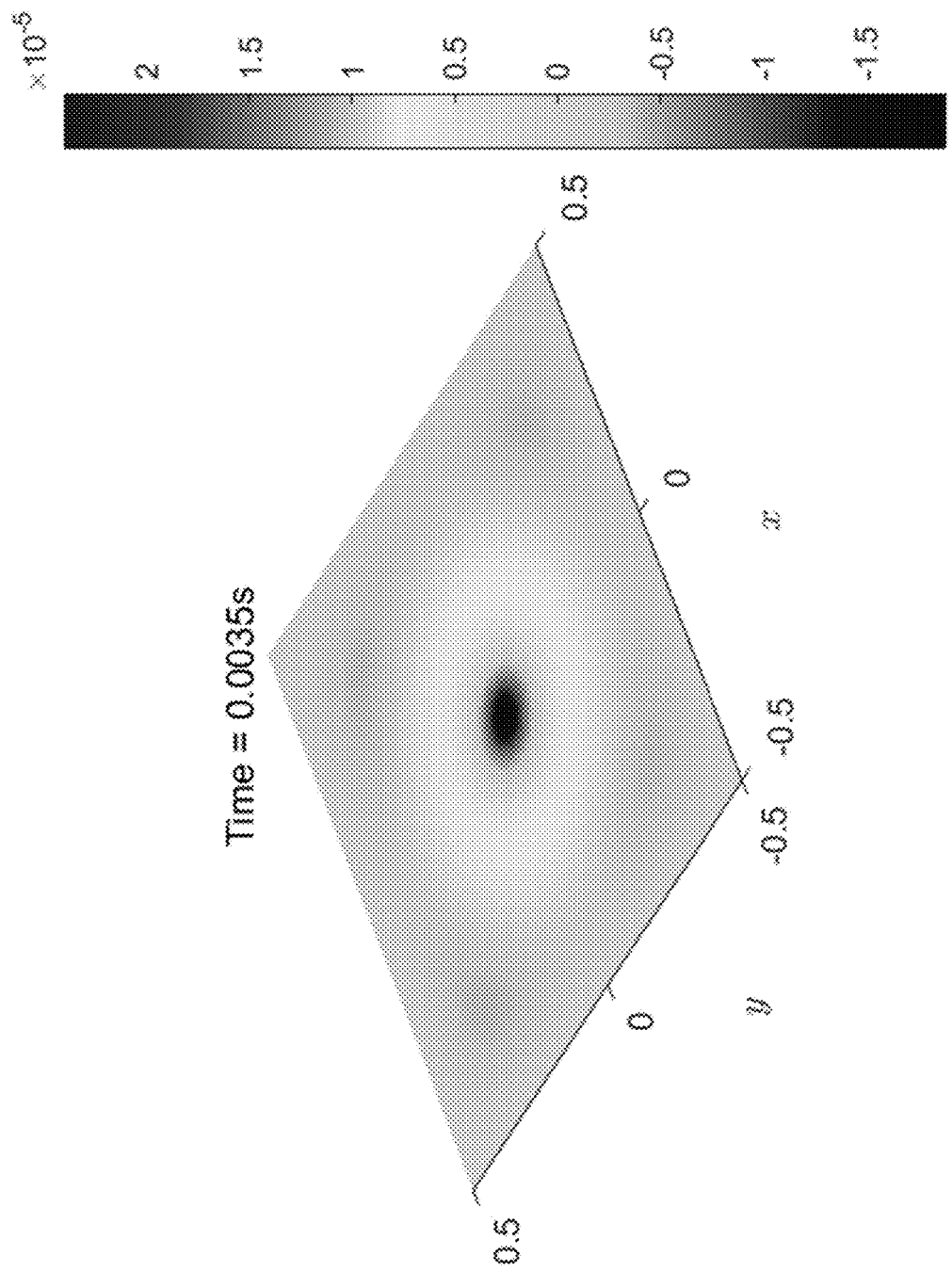
FIG. 19h is a vibration distribution of the workpiece in mirror milling of the follow-up support in the simulation experiment when time=0.0035 s.
Figure 19I:
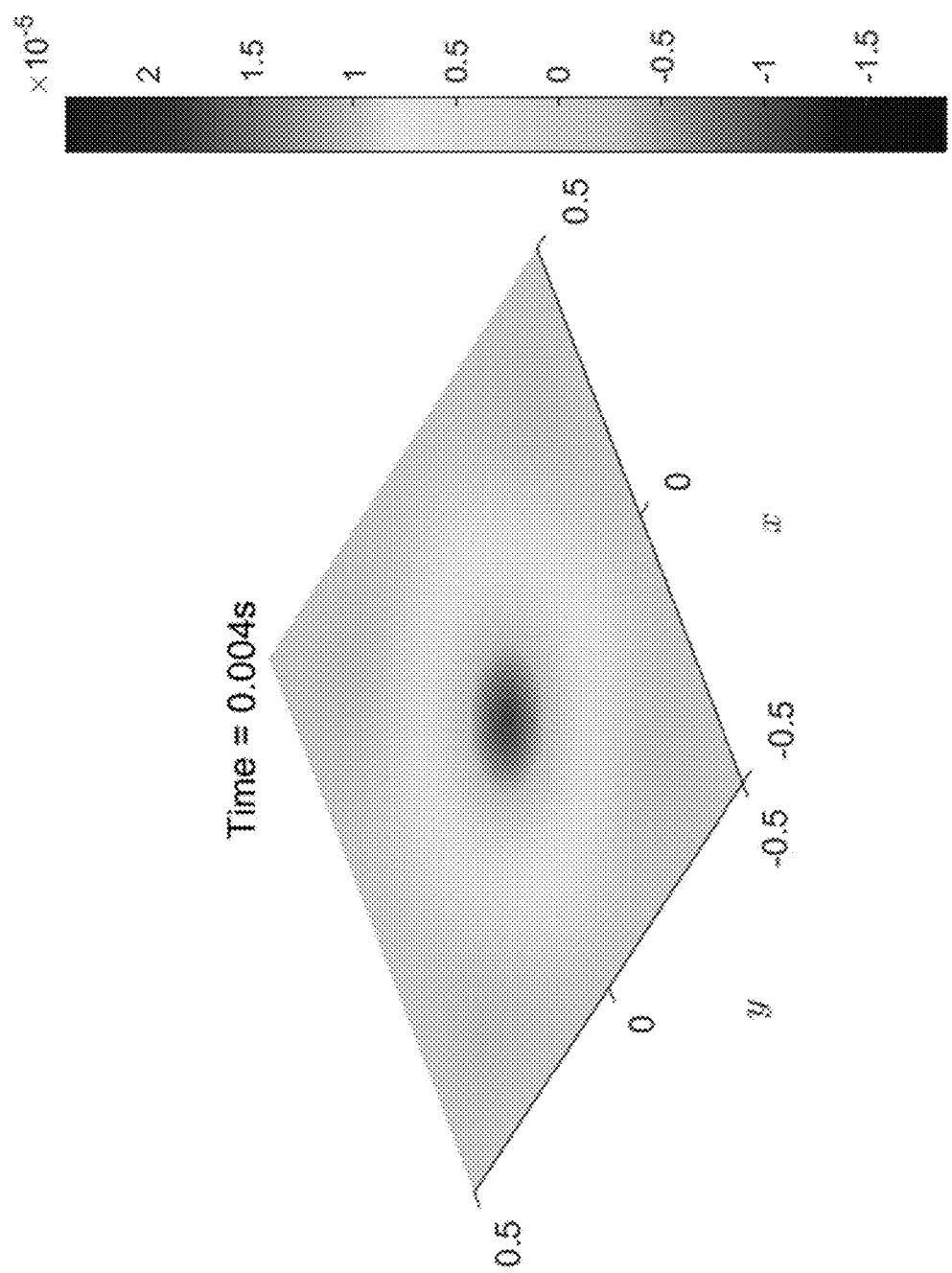
FIG. 19i is a vibration distribution of the workpiece in mirror milling of the follow-up support in the simulation experiment when time=0.004 s.
Figure 19J:
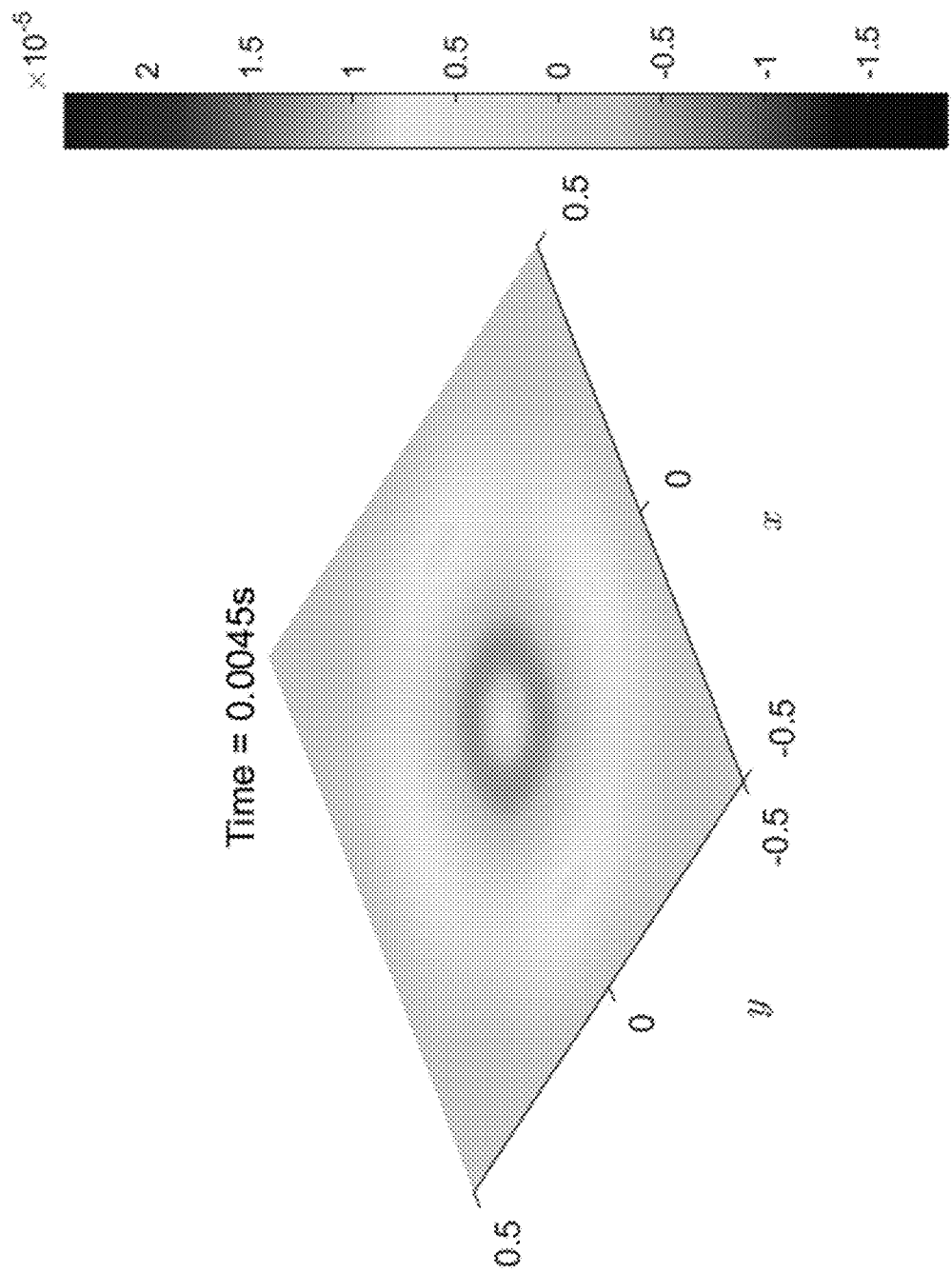
FIG. 19*j* is a vibration distribution of the workpiece in mirror milling of the follow-up support in the simulation experiment when time=0.0045 s.
Figure 19K:
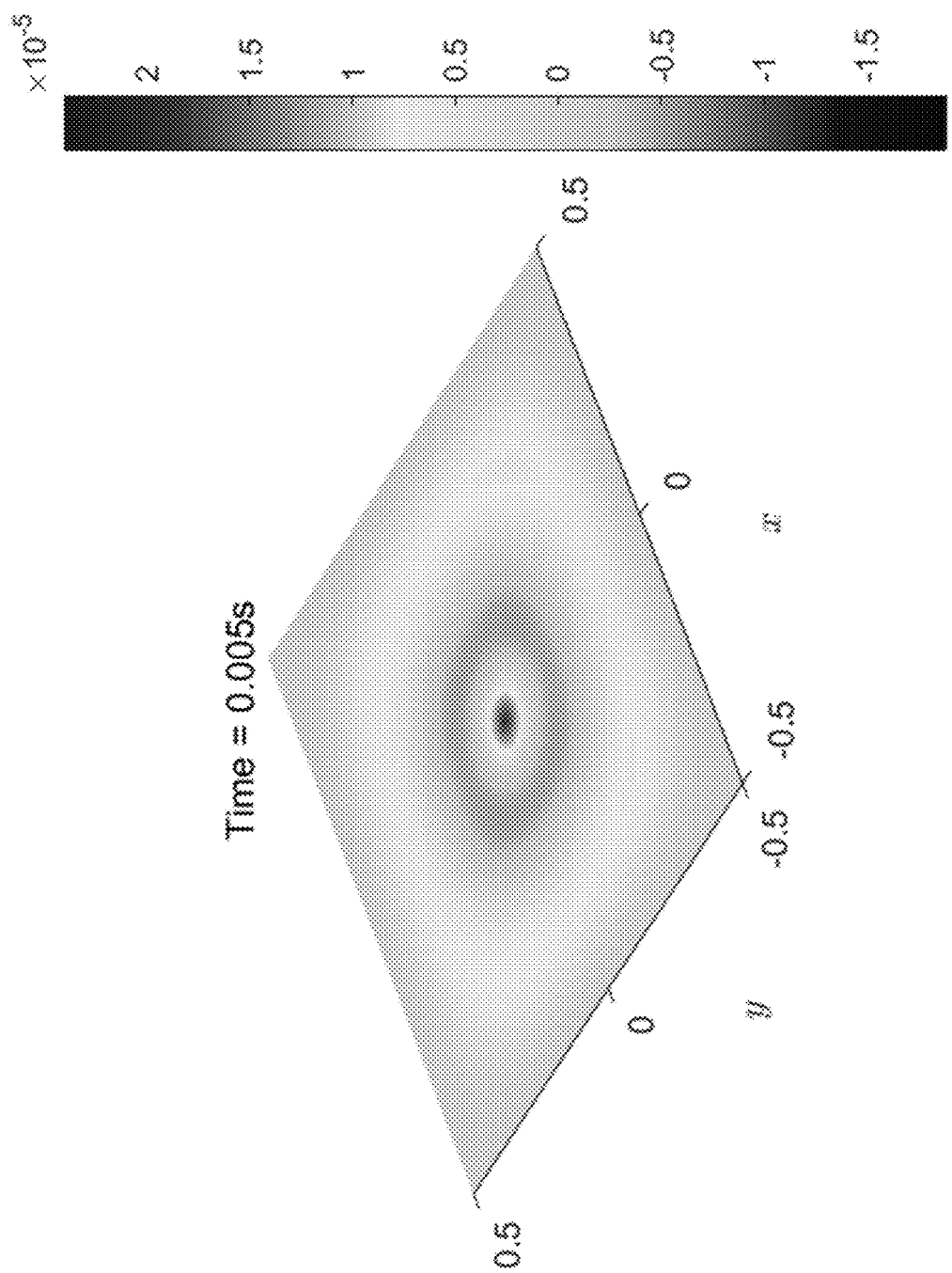
FIG. 19*k* is a vibration distribution of the workpiece in mirror milling of the follow-up support in the simulation experiment when time=0.005 s.
Figure 19I:
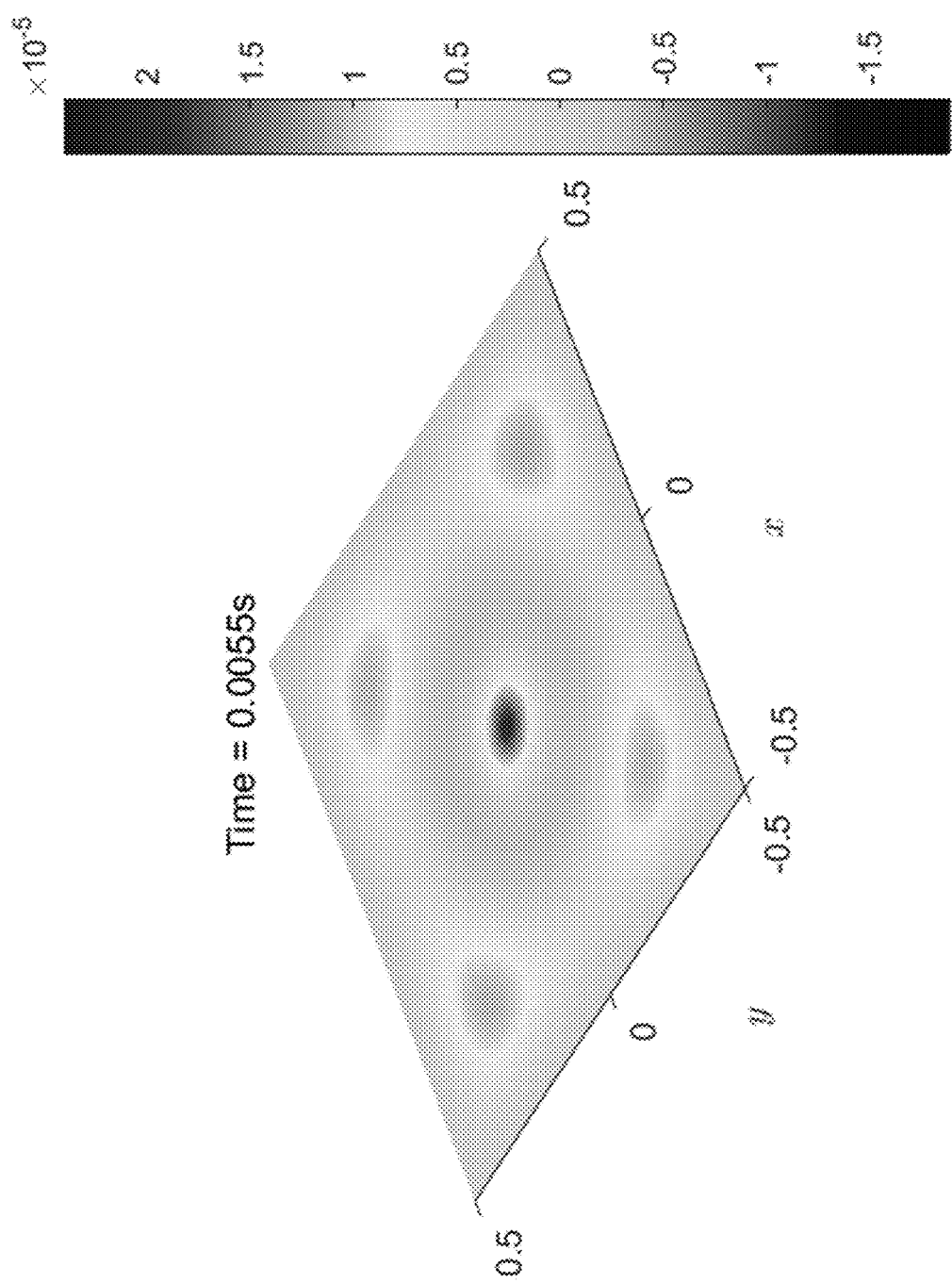
Figure 19M:
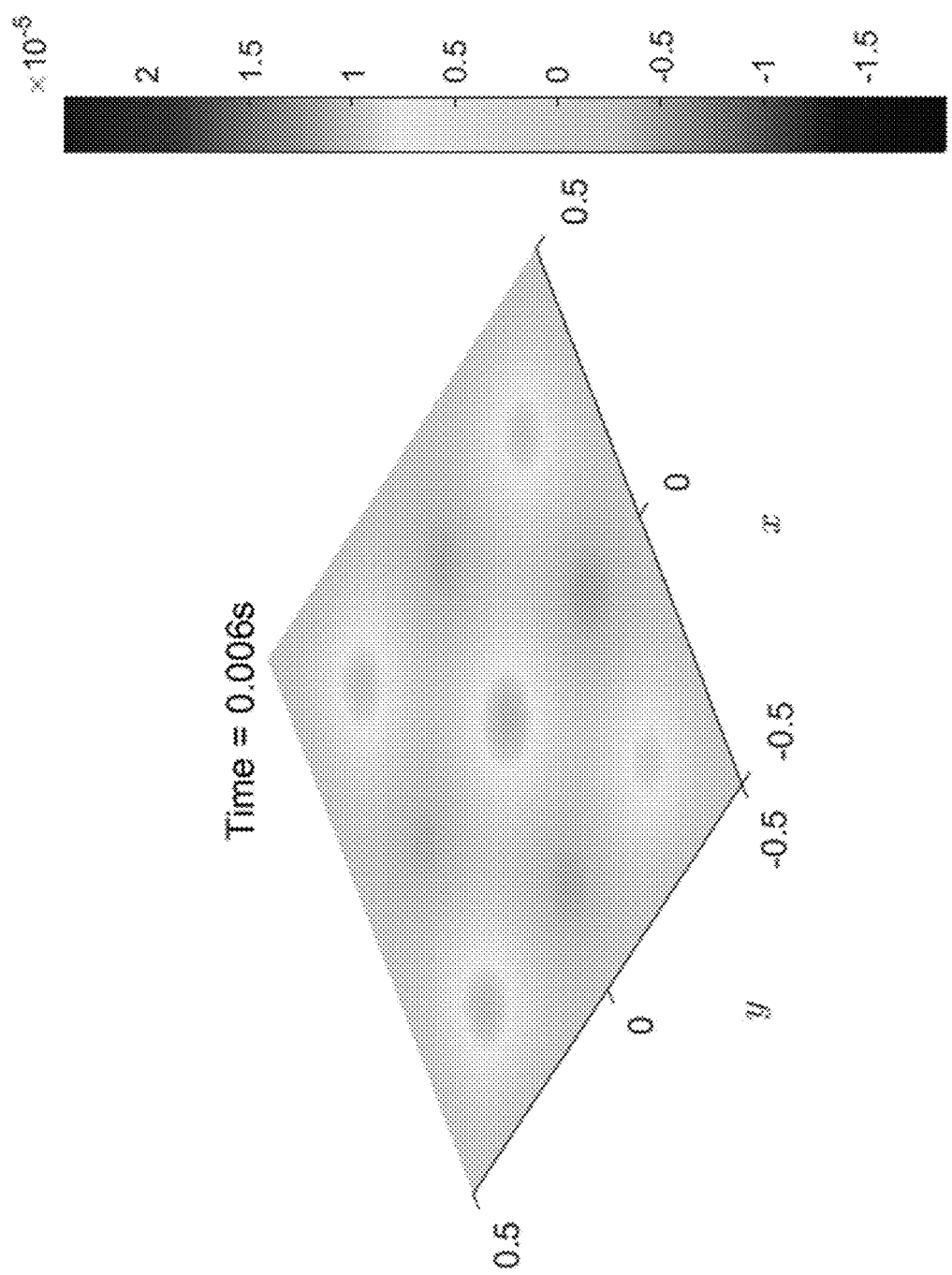
FIG. 19*m* is a vibration distribution of the workpiece in mirror milling of the follow-up support in the simulation experiment when time=0.006 s.
Figure 19N:
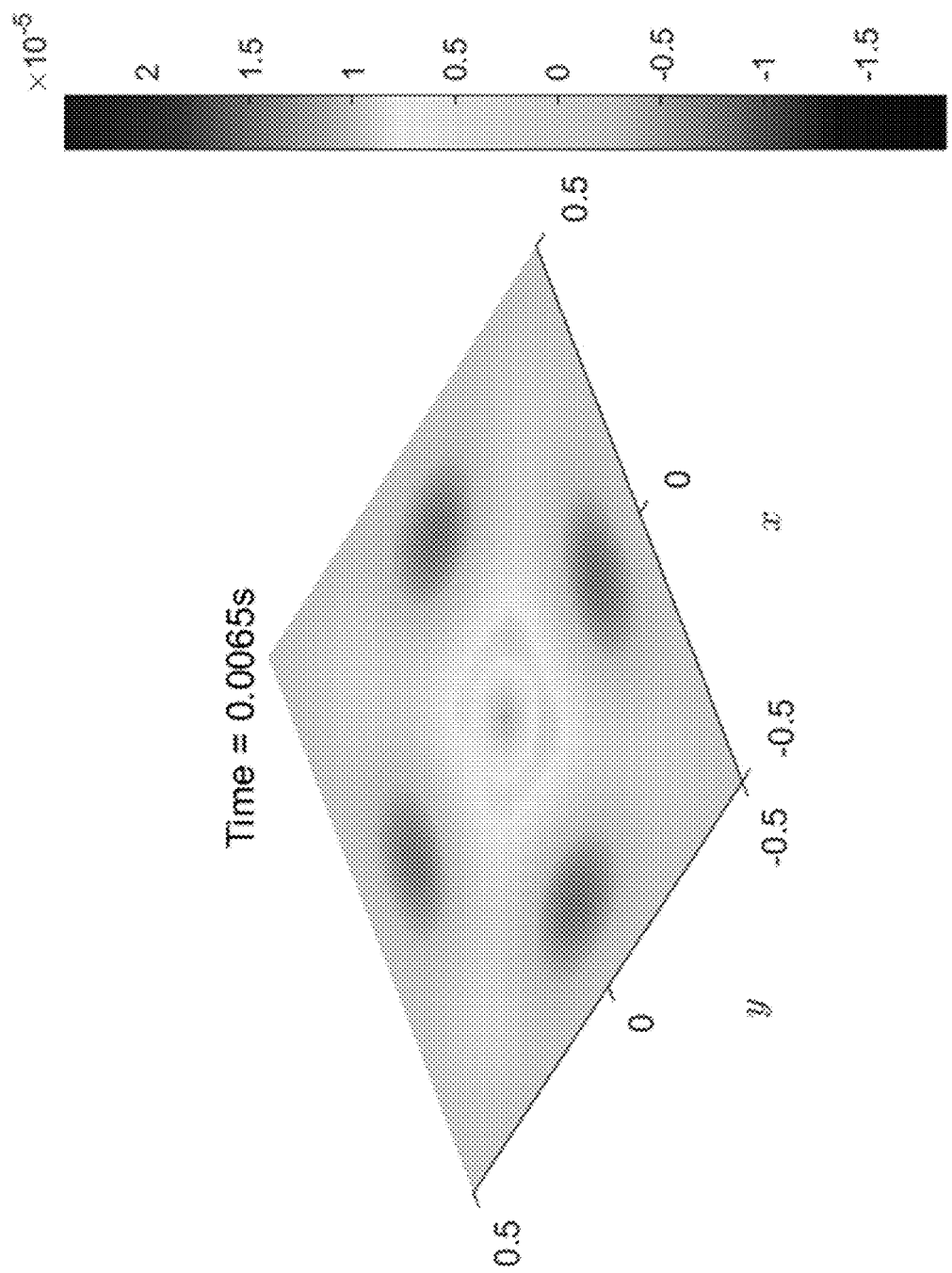
FIG. 19*n* is a vibration distribution of the workpiece in mirror milling of the follow-up support in the simulation experiment when time=0.0065 s.
Figure 19O:
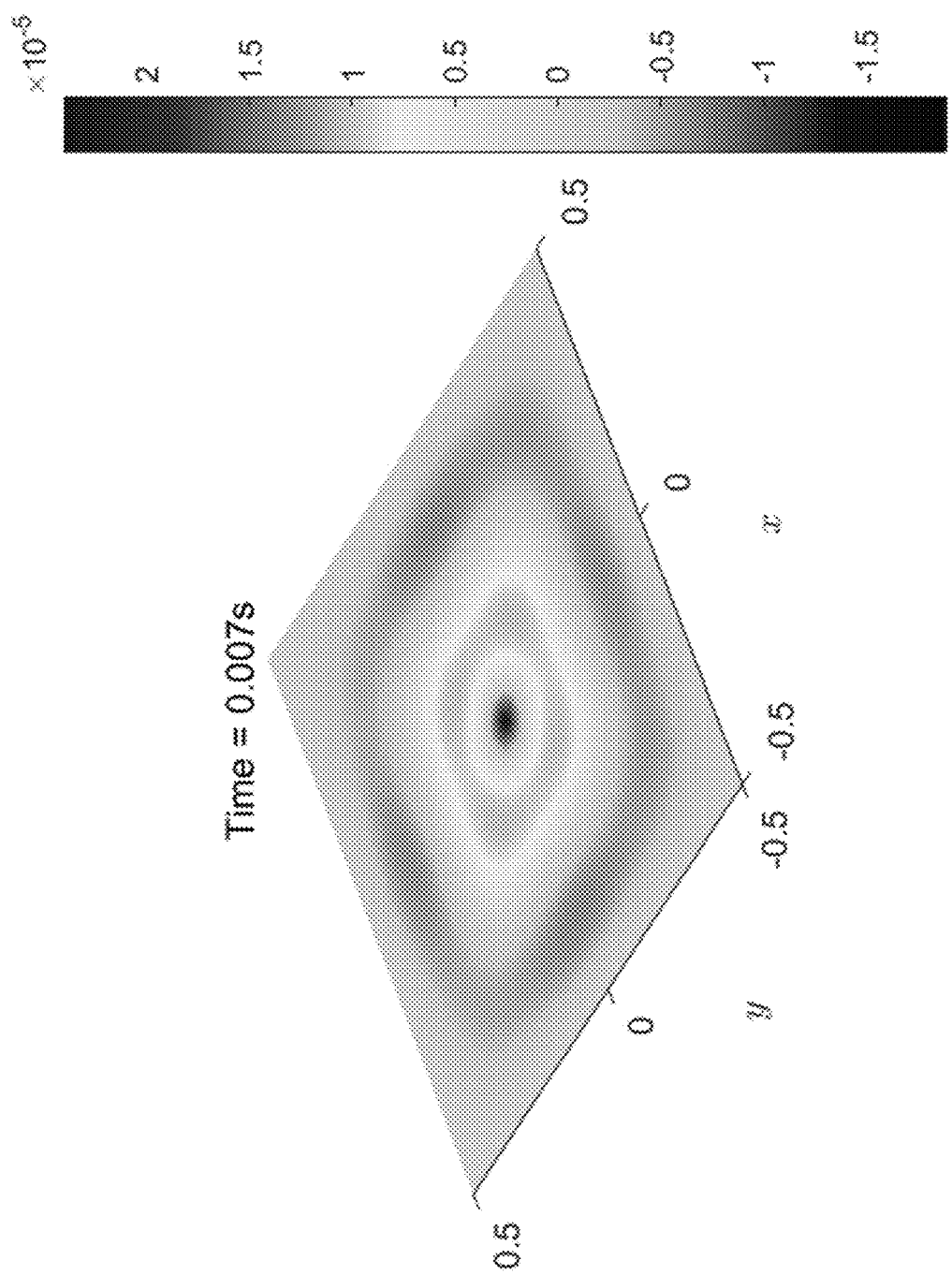
FIG. 19*o* is a vibration distribution of the workpiece in mirror milling of the follow-up support in the simulation experiment when time=0.007 s.
Figure 19P:
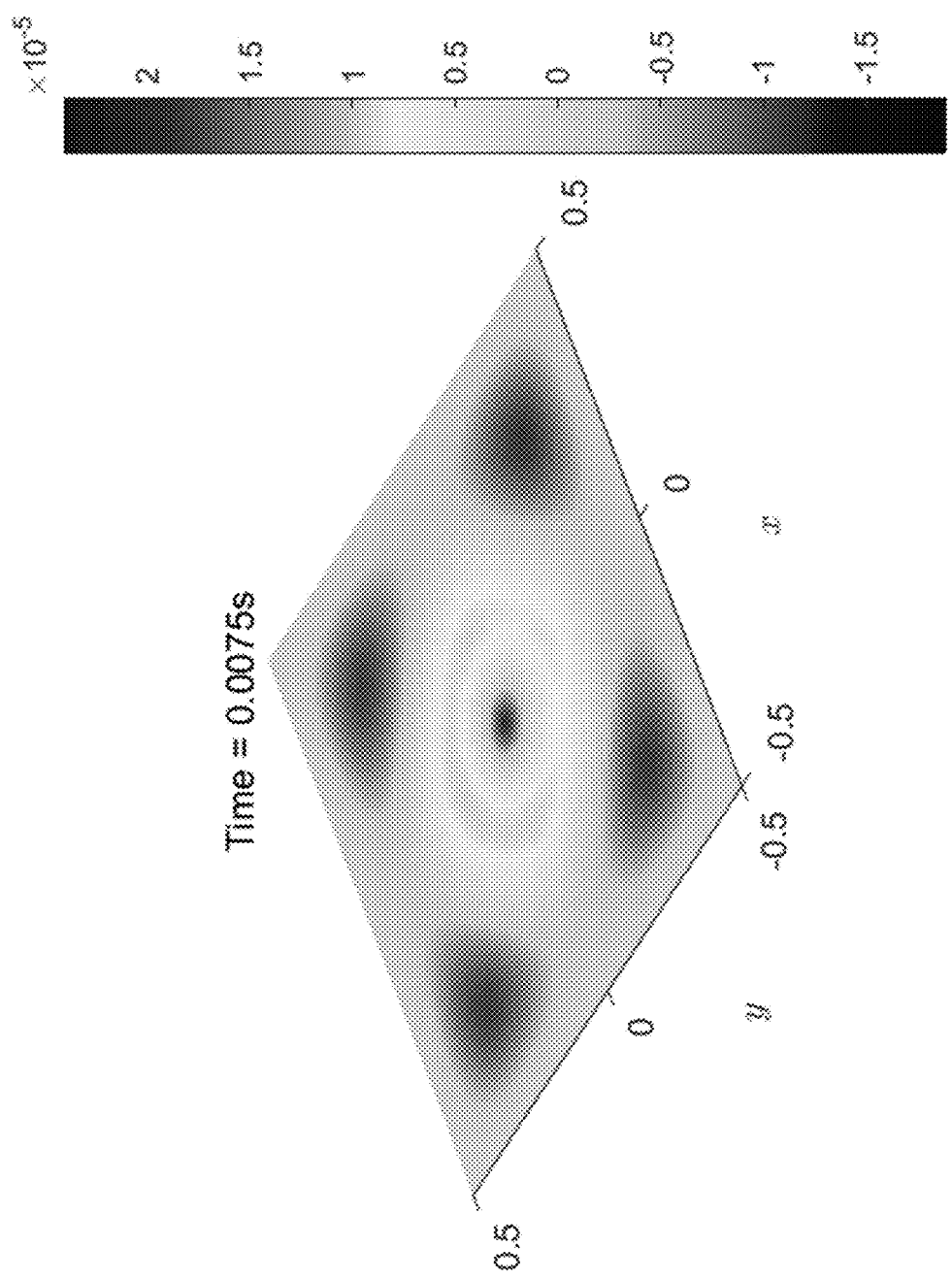
FIG. 19*p* is a vibration distribution of the workpiece in mirror milling of the follow-up support in the simulation experiment when time=0.0075 s.

Furthermore, the optimal fitness and corresponding support radius under different quantities of support points in the simulation experiment are shown in FIG. 17. Analysis of the data in FIG. 17 shows that in the case of balancing the amplitude and root mean square of vibration, the optimal quantity of support points is 5, that is, except for the 1 point in the center, the 4 points evenly distributed on the peripheral ring constitute the standard square. In addition, when n is 4 and 7, the optimal fitness is also very close to the global optimum, and the relative deviation is not more than 1%. At this time, the distribution of the support points on the outer ring just constitutes a regular triangle and a regular hexagon, which is also consistent with the most widely used support point layout in common sense. This confirms the rationality of the optimization method proposed by the invention from an empirical point of view. The method in the invention actually extends the empirical conclusion to the level of model-based optimization problem solving and has more universal scientific value.

In addition, Analysis of the data in FIG. 17 also shows that when the value of n is greater than 7, with the increase in the quantity of points, the optimal fitness that can be achieved is on the rise, which proves that the more the quantity of supporting points, the better the vibration suppression effect. At the same time, it can be observed in the figure that the overall change trend of the value radius is generally consistent with the optimal fitness. Under the above three high-quality n values, the corresponding value radius is between 2.1r0 and 2.2r0, which can provide some design reference for the point layout of the support points in the follow-up support head.

4. Comparison of the Workpiece Quality of the Support after Adding the Point Layout Optimization In this experiment, the workpiece quality of conventional milling without the follow-up support robot and mirror milling with follow-up robot 100 in the invention is compared. Specifically, the finite element software is used to visualize the change of workpiece vibration with time during the processing of two different processing methods. The results are shown in FIG. 18 and FIG. 19.

By comparing the data in FIG. 18 and FIG. 19, it can be seen that the deformation caused by the forced vibration of the center of the workpiece is very obvious in the conventional unsupported milling state, while the maximum amplitude of the workpiece is reduced by about one order of magnitude under the processing method of the follower support of the invention. At the same time, the distribution of vibration is more uniform (see color distribution). it shows that the mirror milling method for the follow-up support provided by the invention has a very obvious effect on improving the milling quality of the workpiece.

The above content is only the better embodiments of the invention, and those embodiments are not used to restrict the invention. Any modification, equivalent replacement, and improvement made within the spirit and principle of the invention shall be comprised in the protection scope of the invention.

What is claimed is:

1. A point layout optimization method for a follow-up support head in mirror milling, the method is used to optimize and adjust the point layout of the follow-up support head in mirror milling in combination with specific working conditions, support points in the follow-up support head comprise a central support point and peripheral support points arranged circularly around the central support point, wherein the point layout optimization method comprises the following steps:

S1: establishing a coupling vibration model of cutter, workpiece, and support head in mirror milling, comprising the following process:

S11: defining a milling force acting on an axial direction of the workpiece as $F_m(t)$, moving paths of a center point of a milling cutter are $x_m(t)$、$y_m(t)$, and generating a milling excitation $q_m(x,y,t)$ by combining a Dirac function $\delta$;

S12: defining a total quantity of support points of the support head as n, where 1 support point is located at a center of the support head, and remaining n−1 support points are evenly distributed on a circle with a radius of r; n and r are characteristic parameters that characterize the point layout of the follow-up support head;

S13: defining moving paths of the central support point as $x_{s1}(t)$、$y_{s1}(t)$, and generating moving paths of each peripheral support point as $x_{si}(t)$、$y_{si}(t)$, where i=2, 3 . . . n;

S14: defining a total support force provided by the support head as $F_s(t)$, and generating a support excitation $q_s(x,y,t)$ by combining the moving paths of each peripheral support point $x_{si}(t)$、$y_{si}(t)$ and the Dirac function $\delta$; and S15: defining a transverse deflection perpendicular to a machining surface in mirror milling as $w(x,y,t)$, based on a Kirchhoff-Love hypothesis, establishing a coupled vibration model of an equal-thickness plate component under external excitation as follows:

$$D\left(\frac{\partial^4 w}{\partial x^4} + 2\frac{\partial^4 w}{\partial x^2 \partial y^2} + \frac{\partial^4 w}{\partial y^4}\right) + \rho h \frac{\partial^2 w}{\partial t^2} = q(x, y, t)$$

where $q(x,y,t)$ denotes an additional excitation on a unit area of the workpiece, the additional excitation is composed of the milling excitation $q_m(x,y,t)$ and the support excitation $q_s(x,y,t)$; D denotes a bending stiffness of the workpiece, h denotes the wall thickness of the workpiece; $\rho$ denotes a density of the workpiece;

S2: weighting a vibration peak $f_1$ of points at different positions on a coupling contact area at different times and a root mean square $f_2$ of a vibration of each point in an investigation period as an objective function $f$ to evaluate a vibration of a machining process, an optimization goal is as follows:

min $f=\alpha_1 f_1+\alpha_2 f_2$ where $\alpha_1$ and $\alpha_2$ are weight coefficients of the vibration peak $f_1$ and the root mean square $f_2$ of each point vibration, and satisfy $\alpha_1+\alpha_2=1$;

S3: combining spatial layouts and moving paths of the center support point and the peripheral support points of the follow-up support head, establishing a spatial constraint equation and a quantity constraint equation of the support points in the follow-up support head;

S4: taking n and r as design variables, establishing a single-objective optimization model representing a current optimization problem combined with the coupled vibration model, objective function, and constraint equation;

S5: solving the single-objective optimization model by a swarm intelligence optimization algorithm to obtain a globally optimal quantity of support points n and a radius of the distribution circle r; a solution strategy is as follows:
  (1) choosing any one of the swarm intelligence optimization algorithms as a dominant algorithm of the solution process;
  (2) according to the constraint equation established in S3, calculating an upper limit the quantity of support points n, and then determining m candidate values of discrete design variable n, then transforming a bivariate optimization process of an iterative optimization process into an optimization process of a parallel processing of a single variable r in m different populations; and
  (3) introducing a penalty function F to modify a fitness function fit of the swarm intelligence optimization algorithm when it is updated iteratively: fit=f+F; and S6: according to preferred values of n and r, adjusting the quantity of support points in the follow-up support head and a distribution radius of the peripheral support points.

2. The point layout optimization method for the follow-up support head in mirror milling according to claim 1, wherein:
in S11, an expression of the milling excitation $q_m(x,y,t)$ is as follows:

$$q_m(x,y,t)=F_m(t)\, \delta(x-x_m(t))\, \delta(y-y_m(t));$$

in S13, an expression of the support excitation $q_s(x,y,t)$ is as follows:

$$q_s(x,y,t) = \sum_{i=1}^{n} \frac{F_s(t)}{n} \delta(x - x_{si}(t)) \cdot \delta(y - y_{si}(t));$$

in S14, the moving paths $x_{si}(t)$, $y_{si}(t)$ of the peripheral support point satisfy the following formula:

$$\begin{cases} x_{si}(t) = x_{s1}(t) + r\cos\dfrac{2\pi(i-1)}{n-1} \\ y_{si}(t) = y_{s1}(t) + r\sin\dfrac{2\pi(i-1)}{n-1} \end{cases} i = 2, 3 \ldots n;$$

and
in S15, a bending stiffness D of the workpiece satisfies the following formula:

$$D=Eh^3/[12(1-\mu)^2]$$

where E and $\mu$ denote an elastic modulus and a Poisson's ratio of the workpiece, respectively.

3. The point layout optimization method for the follow-up support head in mirror milling according to claim 2, wherein in S2, a vibration peak $f_1$ is a peak value of a transverse deflection w(x,y,t) of the workpiece during a machining process, a calculation formula is as follows:

$$f_1=w(x,y,t)_{max}$$

a root mean square $f_2$ of the vibration at each point is a square root of an average value of a sum of squares of a vibration signal in a specified time and space range, the calculation formula is as follows:

$$f_2 = \sqrt{\frac{\int_{t_0}^{t_1} \int_{y_0}^{y_1} \int_{x_0}^{x_1} w^2(x, y, t)\,dxdydt}{(x_1 - x_0)(y_1 - y_0)(t_1 - t_0)}}$$

where $x_0$ and $y_0$ are lower limits of a movement range of a center point of a milling cutter; $x_1$ and $y_1$ are upper limits of the movement range of the center point of the milling cutter; $t_0$ and $t_1$ are a start time and an end time of milling.

4. The point layout optimization method for the follow-up support head in mirror milling according to claim 3, wherein in S3, spatial constraints that each support point in the follow-up support head needs to satisfy comprise:
  (1) a center support point does not interfere with the peripheral support points;
  (2) an outer contour of the peripheral support point does not exceed an outer diameter of the follow-up support head;
  (3) no interference between the peripheral support points, wherein a corresponding spatial constraint equation is as follows:

$$\max\left[2r_0, \sqrt{\frac{2r_0^2}{1-\cos\left(\frac{2\pi}{n-1}\right)}}\right] < r < r_1 - r_0$$

a constraint equation corresponding to the quantity constraint of support points in the follow-up support head is as follows:

$$2 < n < 1 + \frac{2\pi}{\arccos\left(1 - \frac{2r_0^2}{(r_1 - r_0)^2}\right)}\, n \in N^*$$

where $r_0$ denotes an interference radius of a support structure adopted by each support point;

$r_1$ represents an outermost radius of the support head.

5. The point layout optimization method for the follow-up support head in mirror milling according to claim 4, wherein in S4, an expression of an established single-objective optimization model is as follows:

find: n,r $$\min f = \alpha_1 w_{max} + \alpha_2 \sqrt{\frac{\int_\Omega w^2 dxdydt}{Vol(\Omega)}}$$

-continued $$\text{s.t.} \begin{cases} D\nabla^4 w + \rho h \dfrac{\partial^2 w}{\partial t^2} q(n, r) \\ 2 < n < 1 + \dfrac{2\pi}{\arccos\left(1 - \dfrac{2r_0^2}{(r_1 - r_0)^2}\right)} n \in z^+ \\ \max\left[2r_0, \sqrt{\dfrac{2r_0^2}{1 - \cos\left(\dfrac{2\pi}{n-1}\right)}}\right] < r < r_1 - r_0 \\ \Omega: x \in [x_0, x_1], y \in [y_0, y_1], t \in [t_0, t_1] \end{cases}$$

where $\Omega$ is a decision space.

6. The point layout optimization method for the follow-up support head in mirror milling according to claim 1, wherein in S5, selecting a particle swarm optimization algorithm as a dominant algorithm, a solution process of the particle swarm optimization algorithm with penalty function and parameter scanning strategy is as follows:
   S51: firstly, calculating an upper limit $n_{max}$ of a positive integer n according to given values of $r_0$ and $r_1$, and determining a quantity of values m of n and each candidate value $n_1-n_m$;
   S52: according to the quantity of values m of n, starting a corresponding quantity of particle swarms to perform parallel operations under parameter scanning;
   S53: $n_1-n_m$ are fixed parameters of each subgroup, and preforming a fitness calculation and iterative update of particles independently for each subgroup;
   S54: after satisfying an iteration termination condition, sorting the fitness results calculated in all channels of parallel processing in a unified manner to determine a global optimal fitness $f_{best}$; and
   S55: outputting optimal solutions of n and r corresponding to the global optimal fitness $f_{best}$.

7. A point layout optimization device for the follow-up support head in mirror milling, comprising a memory, a processor and a computer program stored on the memory and running on the processor, wherein when the processor executes the computer program, performing steps of the point layout optimization method for the follow-up support head in mirror milling according to claim 1, then according to workpiece attribute parameters $D$, $h$, $\rho$, $E$, $\mu$; processing parameters $F_m(t)$, $x_m(t)$; structural parameters of support head $r_1$, $r_0$; and the weight coefficients $\alpha_i$; generating the characteristic parameters n and r of the point layout of the follow-up support head satisfying a minimum machining process vibration $f$.

8. A follow-up support head with an adjustable point layout, the follow-up support head has a Whiffletree structure, the follow-up support head supports and adopts the point layout optimization method for the follow-up support head in mirror milling according to claim 1, each support module in the Whiffletree structure can be adjusted according to actual working conditions, the follow-up support head with the adjustable point layout comprises:
   a base, an annular sliding module, linear sliding modules, support modules, and several sets of locking devices;
   a base;
   a back of the base is provided with an installation flange for fixed connection with a manipulator, a center position of a front of the base is provided with a convex platform;
   an annular sliding module wherein the annular sliding module comprises an annular guide rail and first sliders clamped on the annular guide rail and the annular guide rail is installed at the outer edge of the front side of the base and is concentric with the convex platform; the first sliders can slide freely along a circumferential direction of the annular guide rail;
   linear sliding modules, wherein each linear sliding module is fixedly connected to the corresponding first slider through a first adapter plate, wherein each linear sliding module comprises a linear sliding platform and a second slider, wherein the linear sliding platform is used to drive the second slider to move bi-directionally along a radial direction of the annular guide rail;
   support modules, wherein one of the support modules is fixedly connected to the convex platform, and the remaining support modules are fixedly connected to each second slider through a second adapter plate, each support module comprises a needle cylinder, a stud, and a universal ball, wherein one end of the stud is fixedly connected to the needle cylinder, and the other end of the stud is fixedly connected to the universal ball, wherein the needle cylinder is used to drive the universal ball to move up and down in a direction perpendicular to a base plane through the stud; and
   locking devices, wherein the sets of locking devices are used to fix each first slider on the annular guide rail.

9. The follow-up support head with an adjustable point layout according to claim 8, wherein the annular sliding module adopts a THK arc guide rail module, and the circular guide rail adopts a V-shaped slide rail, the first slider is equipped with a matching center roller, and an eccentric roller for easy adjustment and pre-tightening.

10. The follow-up support head with an adjustable point layout according to claim 8, wherein the linear sliding platform in the linear sliding module adopts a sliding platform with an LWX type hand-shaking dovetail groove; the slider is clamped in the sliding platform with the LWX type hand-shaking dovetail groove, and a manual knob for locking is set on a side of the slider.

* * * * *